US 8,555,745 B2

(12) United States Patent
Inoue

(10) Patent No.: US 8,555,745 B2
(45) Date of Patent: Oct. 15, 2013

(54) POSITION ADJUSTMENT DEVICE FOR STEERING WHEEL

(75) Inventor: Koji Inoue, Maebashi (JP)

(73) Assignee: NSK Ltd., Tokyo (JP)

( * ) Notice: Subject to any disclaimer, the term of this patent is extended or adjusted under 35 U.S.C. 154(b) by 206 days.

(21) Appl. No.: 13/058,222

(22) PCT Filed: Apr. 16, 2010

(86) PCT No.: PCT/JP2010/056844
§ 371 (c)(1),
(2), (4) Date: Apr. 13, 2011

(87) PCT Pub. No.: WO2010/122958
PCT Pub. Date: Oct. 28, 2010

(65) Prior Publication Data
US 2011/0185839 A1    Aug. 4, 2011

(30) Foreign Application Priority Data

Apr. 20, 2009 (JP) ................................. 2009-102289
Apr. 27, 2009 (JP) ................................. 2009-107364
Apr. 28, 2009 (JP) ................................. 2009-108669

(51) Int. Cl.
*B62D 1/18* (2006.01)
(52) U.S. Cl.
USPC ............................................ 74/493; 280/775
(58) Field of Classification Search
USPC ................................ 74/492, 493; 280/775, 777
See application file for complete search history.

(56) References Cited

U.S. PATENT DOCUMENTS

| | | | | |
|---|---|---|---|---|
| 5,409,261 A | * | 4/1995 | Yamaguchi | 280/775 |
| 5,524,927 A | * | 6/1996 | Toussaint | 280/777 |
| 5,562,307 A | * | 10/1996 | Connor | 280/777 |
| 5,566,585 A | * | 10/1996 | Snell et al. | 74/493 |
| 5,769,455 A | * | 6/1998 | Duval et al. | 280/777 |
| 5,787,759 A | * | 8/1998 | Olgren | 74/493 |
| 5,823,062 A | * | 10/1998 | Snell et al. | 74/493 |
| 6,039,350 A | * | 3/2000 | Patzelt et al. | 280/775 |
| 7,021,660 B2 | | 4/2006 | D'Agostino et al. | |

(Continued)

FOREIGN PATENT DOCUMENTS

| | | |
|---|---|---|
| EP | 2 105 369 | 9/2009 |
| JP | 2001322552 | 11/2001 |

(Continued)

OTHER PUBLICATIONS

European Search Report dated Sep. 11, 2012, from corresponding European Application No. 10767015.0-1264.
International Search Report and Written Opinion dated Jul. 6, 2010 from the corresponding PCT/JP2010/56844.

*Primary Examiner* — David M Fenstermacher
(74) *Attorney, Agent, or Firm* — Katten Muchin Rosenman LLP

(57) ABSTRACT

A structure for a tilt-telescopic steering device, without requiring particularly high accuracy effectively prevents a steering wheel from being positionally displaced in a secondary collision. When an adjustment lever 18a is turned, tilt-locking serrated sections 54 of a pair of tilt-locking eccentric cams 23a and 23b are pressed against curved edges 53 of support plates 40. Moreover, a telescoping locking serrated section 62 of a telescoping locking eccentric cam 58 is pressed against the lower surface of an inner column. In a secondary collision, each of the serrated sections 54 and 62 engage with a mating surface thereof, to thereby prevent a steering wheel 1 from being displaced and moved.

13 Claims, 34 Drawing Sheets

(56) References Cited

U.S. PATENT DOCUMENTS

| | | | |
|---|---|---|---|
| 7,213,484 B2* | 5/2007 | Sawada | 74/493 |
| 7,607,696 B2* | 10/2009 | Graf | 280/775 |
| 7,914,043 B2* | 3/2011 | Olgren et al. | 280/775 |
| 8,047,096 B2* | 11/2011 | Ridgway et al. | 74/493 |

FOREIGN PATENT DOCUMENTS

| | | |
|---|---|---|
| JP | 2005138758 | 6/2005 |
| JP | 3783524 | 3/2006 |
| JP | 2007168708 | 7/2007 |
| JP | 2008296786 | 12/2008 |

* cited by examiner (A)

(B)

(A)

(B)

(A)

(B)

(A)

(B)

POSITION ADJUSTMENT DEVICE FOR STEERING WHEEL

TECHNICAL FIELD

The present invention relates to improvements in a position adjustment device for a steering wheel for adjusting the up/down position and front/rear position of a steering wheel. Specifically, the invention is to realize, at low cost, a structure which prevents inadvertent changes in the up/down position and front/rear position of the steering wheel in a secondary collision, and which facilitates driver protection.

BACKGROUND ART

A steering device for a motor vehicle is configured as shown in FIG. 33 in which rotation of a steering wheel 1 is transmitted to an input shaft 3 of a steering gear unit 2, and a pair of left-right tie rods 4 are pushed and pulled in response to the rotation of this input shaft 3, thereby giving a steering angle to front wheels. The steering wheel 1 is supported and fixed on a rear end section of a steering shaft 5, and this steering shaft 5 in a state of being inserted in the axial direction of a cylindrical steering column 6, is rotatably supported on this steering column 6. Moreover, a front end section of the steering shaft 5 is connected, via a universal joint 7, to a rear end section of an intermediate shaft 8, and a front end section of this intermediate shaft 8 is connected, via another universal joint 9, to the input shaft 3.

Heretofore, there have been known, in this type of steering device, a tilt mechanism for adjusting the up/down position and a telescopic mechanism for adjusting the front/rear position of the steering wheel 1 according to the physique and driving posture of the driver.

In order to configure the tilt mechanism capable of up/down direction displacement, the steering column 6 is supported so as to be capable of swing displacement about a pivot shaft 11 which is installed in the widthwise direction on a vehicle body 10. Moreover, a displacement bracket fixed on a portion closer to the rear end of the steering column 6, is supported so as to be capable of displacement in the up/down and front/rear direction with respect to a support bracket 12 supported on the vehicle body 10. The widthwise direction here refers to the widthwise direction of the vehicle body, corresponding to the left-right direction, and the front/rear direction refers to the front/rear direction of the vehicle body.

Furthermore, in order to configure the telescopic mechanism capable of front/rear direction displacement, the steering column 6 is of a structure which telescopically combines an outer column 13 and an inner column 14, and the steering shaft 5 is of a structure which combines an outer shaft 15 and an inner shaft 16 in spline engagement, allowing free torque transmission and free telescopic motion. In the example shown in the diagram, there is also incorporated an electrically-operated power steering device which reduces the amount of force required for operating the steering wheel 1, using an electric motor 17 as an auxiliary power source.

In the case of the tilt mechanism and telescopic mechanism, excluding those of an electric type, the position of the steering wheel 1 is brought to an adjustable state or it can be fixed at a post-adjustment position, based on the operation of an adjustment lever. For example, Patent Document 1 discloses a structure shown in FIG. 34 and FIG. 35 in which the axial dimension of a cam device 20 is expanded and contracted and a cam member 21 is swing-displaced at the same time, based on rotation of a rod-shaped member 19 based on an adjustment lever 18. In the case of this conventional structure, based on expansion and contraction of the cam device 20, a movable side bracket 22 fixed on an outer column 13a is engaged with and disengaged from a support bracket 12a. Moreover, whether or not an inner column 14a is allowed to slide with respect to an outer column 13a is switched based on swing displacement of the cam member 21.

In the case of this type of conventional structure disclosed in Patent Document 1, compared to structures therebefore (prior structures), the number of friction engagement sections in fixing the front/rear position of the steering wheel 1 is increased to thereby increase the level of strength and rigidity associated with this front/rear position fixation. However, there is room for improvement in order to further enhance driver protection by not letting the position of the steering wheel 1 change regardless of a large impact load applied to the steering wheel 1 in the event of a collision accident. This point is described below.

In the event of a collision accident, following a so-called primary collision in which a motor vehicle collides with another motor vehicle, there occurs a so-called secondary collision in which the driver's body collides with the steering wheel 1. When this secondary collision occurs, a large diagonally forward-upward impact load is applied to the steering wheel 1. On the other hand, in the case of the conventional structure shown in FIG. 34 and FIG. 35, the force which fixes this steering wheel 1 at a post-adjustment position is obtained only by frictional force, and therefore, there is a possibility that this position may be displaced based on a large impact load. Specifically, there is a possibility that the position of the steering wheel 1 may be displaced forward or upward. As a result of this, the positional relationship between this steering wheel 1 and the driver's body is displaced from the post-adjustment position, which is an optimum position. In this state, an airbag expanded and deployed in the rear of the steering wheel 1 becomes unable to effectively catch the driver's body, and it serves adversely in terms of driver protection.

As a structure for preventing displacement of a steering wheel at the time of a secondary collision, heretofore, there are known structures disclosed in Patent Documents 2 and 3. In the case of the conventional structure disclosed in Patent Document 2, a pair of retention arms are arranged on both sides of a plate piece fixed on the outer circumferential surface of a steering column, and at the time of a secondary collision, this plate piece is firmly clamped by both of these retention arms to prevent forward displacement of the steering column. In this type of conventional structure disclosed in Patent Document 2, unless the accuracy of each constituent is sufficiently ensured, there is a possibility that the force for preventing forward displacement of the steering column may become uneven, consequently making this displacement prevention unreliable. Furthermore, in a structure which prevents forward displacement (in the telescopic direction), upward displacement (in the tilt direction) cannot be prevented.

Moreover, Patent Document 3 discloses a structure as shown in FIG. 36 in which an eccentric cam 23 is provided on a movable side bracket 22a fixed on a steering column 6a, and in a case where this steering column 6a tends to be displaced upward, a serrated section 24 provided on the outer periphery of this eccentric cam 23 is interlocked with the rear end edge of a support bracket 12b provided on the vehicle body side, to thereby prevent upward displacement of the steering column 6a. This type of conventional structure disclosed in Patent Document 3 has a superior function of preventing this upward displacement, however, it does not have a function of preventing forward displacement. An application of the structure disclosed in Patent Document 3 to a structure which prevents forward displacement of an inner column may be considered. However, if the application is made with no change, there is a possibility that a smooth adjustment of the front/rear position of the steering wheel may not be possible in normal operation.

That is to say, in order to perform a smooth adjustment of the front/rear position of the steering wheel without creating excessive resistance and abnormal noise, the serrated section of the eccentric cam and the outer circumferential surface of the inner column need to be reliably separated from each other in a state where an adjustment lever has been turned to a lower position for this front/rear position adjustment. On the other hand, in recent years, it has been considered that respective constituent members for position adjustment of a steering wheel are to be installed above a steering column in order to minimize the size of a portion which projects downward from the steering column for protecting the knee part of the driver in the event of a collision accident. If, with this type of structure, the forward prevention structure for the inner column with the eccentric cam described above is practiced, even in a state where the adjustment lever has been turned to adjust the front/rear position of the steering wheel, the eccentric cam is turned downward by its own weight, and the serrated section of this eccentric cam and the outer circumferential surface of the inner column are likely to stay in contact with each other. In this type of state, an up/down position adjustment of the steering wheel cannot be smoothly performed.

As mentioned above, by combining the conventional structure disclosed in Patent Document 2 and the conventional structure disclosed in Patent Document 3, forward displacement as well as upward displacement of the steering wheel in the event of a secondary collision can be suppressed. However, in addition to the problems mentioned above, problems in the conventional structure disclosed in Patent Documents 2 and 3 still remain, and the structure becomes highly complex. As a result, the cost inevitably becomes high.

PRIOR DOCUMENTS

Patent Documents

[Patent Document 1] Japanese Patent Publication No. 3,783,524
[Patent Document 2] U.S. Pat. No. 6,039,350
[Patent Document 3] U.S. Pat. No. 7,021,660

DISCLOSURE OF THE INVENTION

Problems to be Solved by the Invention

The present invention takes into consideration the above various circumstances, with an object of realizing a structure for a so-called tilt-telescopic steering device, which is capable of adjusting the up/down position and front/rear position of a steering wheel, and capable of effectively preventing positional displacement of the steering wheel in the event of a secondary collision without requiring a particularly high level of accuracy.

Means for Solving the Problem

A position adjustment device for a steering wheel according to a first aspect of the present invention, as with the conventionally known position adjustment device for a steering wheel, is provided with an outer column, an inner column, a steering shaft, a pair of support plates, a rod-shaped member, and an adjustment lever.

The outer column is of a cylindrical shape, and a front section thereof is supported directly or via another member on a portion to be fixed on a vehicle body so as to be capable of swing displacement about a pivot shaft installed in the widthwise direction. Furthermore, at least the inner diameter of a part of the outer column in the axial direction can be expanded and contracted.

The inner column is of a cylindrical shape, and is fitted and supported on the inner diameter side of the outer column, so as to be capable of displacement in the axial direction.

The steering shaft is rotatably supported on the inner diameter side of the inner column, and the steering wheel is fixed on a rear end section thereof projecting to the rear side of a rear end opening section of this inner column. This type of steering shaft is extendably and retractably configured by means of serration-engagement of an outer shaft and an inner shaft for example. However, the steering shaft may be made with a non-extendable and non-retractable structure, by making an intermediate shaft extendable and retractable instead. In this case, the projection amount of the front end section of the steering shaft from the front end opening section of the steering column changes in response to a front/rear position adjustment of the steering wheel.

Both of the support plates are supported on the vehicle body in a state of sandwiching, from widthwise both sides, the above part of the outer column where the inner diameter can be expanded and contracted.

The rod-shaped member is inserted through first through holes formed in positions of both of the support plates where align with each other, and through second through holes formed in portions of the outer column which do not interfere with the inner column. In response to rotation thereof, the distance between the mutually opposing surfaces of both of the support plates is expanded and contracted.

A base end section of the adjustment lever is joined to and fixed on this rod-shaped member in order to rotate the rod-shaped member.

In particular, the position adjustment device for a steering wheel of the present invention is provided with a support shaft supported, while in a state of being arranged parallel to the rod-shaped member, on a part of the outer column, and a telescoping locking eccentric cam with its base section supported at an intermediate section of this support shaft.

A portion of this telescoping locking eccentric cam which opposes to the outer circumferential surface of the inner column or to the surface of a member fixed on the inner column, is of a telescoping locking convex arc edge such that the distance from the center of the support shaft becomes greater with approach to the rear side, and a telescoping locking serrated section is formed in this telescoping locking convex arc edge. The shape of this telescoping locking serrated section is a sawtooth shape or triangular wave shape.

Moreover, a spring is provided between the adjustment lever and the support shaft, and when the adjustment lever is swing-displaced from a state of adjusting the position of the steering wheel to a state of fixing it, with this spring, it is possible to give the support shaft an elastic force in a direction of pressing the telescoping locking serrated section provided in the telescoping locking eccentric cam, against the outer circumferential surface of the inner column or the surface of a member fixed on the inner column.

The position adjustment device for a steering wheel of the present invention may be applied to both a tilt-telescopic steering device, which is a structure for adjusting the up/down position and front/rear position of the steering wheel, and a telescopic steering device which does not have a tilt mechanism and adjusts only the front/rear position.

Moreover, the present invention may be applied either to a structure in which a rod-shaped member and a support shaft are arranged below an outer column, and a telescoping locking serrated section is engaged with the lower surface of an inner column, or to a structure in which a rod-shaped member and a support shaft are arranged above an outer column, and a telescoping locking serrated section is engaged with the upper surface of an inner column.

As a structure for supporting the telescoping locking eccentric cam with respect to the support shaft, for example, there may be employed either; a structure in which, with a fixing structure involving screw clamping or using connection between non-circular members, this telescoping locking eccentric cam rotates in synchronization with the support shaft, or a structure for biasing the telescoping locking eccentric cam, with an elastic structure such as spring, towards the outer circumferential surface of an inner column or towards a member fixed on this inner column while swing-displacement of a predetermined angle of the telescoping locking eccentric cam is enabled.

A position adjustment device for a steering wheel according to a second aspect of the present invention, as with the first aspect of the invention, is also provided with an outer column, an inner column, a steering shaft, a pair of support plates, a rod-shaped member, and an adjustment lever.

In the position adjustment device for a steering wheel of this aspect, the rod-shaped member is such that: it is arranged in the widthwise direction; the base end section of the adjustment lever is joined therewith; it is inserted through long holes which are formed in positions of both of the support plates which are aligned with each other and which are long in the direction of an arc about the pivot shaft, and through holes formed in portions of the outer column which do not interfere with the inner column; and it increases and reduces, in response to rotation of the adjustment lever, the distance between the mutually opposing surfaces of both of the support plates.

Furthermore, the position adjustment device for a steering wheel of this aspect is provided with a curved edge, a support shaft, a pair of tilt-locking eccentric cams, and a telescoping locking eccentric cam. Among these, the curved edge is provided at least on a part of the rear end side of both of the support plates, and it has a shape of a convex arc about the pivot shaft. Moreover, the support shaft, in a state of being arranged parallel to the rod-shaped member, is supported on a part of the outer column.

Both of the tilt-locking eccentric cams are supported on both of the end sections of the support shaft. A portion of both of these tilt-locking eccentric cams which opposes to the curved edge is a tilt-locking convex arc edge, the distance of which from the center of the support shaft becomes greater with approach to the upper side, and on this tilt-locking convex arc edge, there is formed a tilt-locking serrated section. The shape of this tilt-locking serrated section is a sawtooth shape or triangular wave shape.

Moreover, the telescoping locking eccentric can is supported on the intermediate section of this support shaft. A portion of this telescoping locking eccentric cam which opposes to the outer circumferential surface of the inner column or to the surface of a member fixed on the inner column, is of a telescoping locking convex arc edge such that the distance from the center of the support shaft becomes greater with approach to the rear side, and a telescoping locking serrated section is formed in this telescoping locking convex arc edge. The shape of this telescoping locking serrated section is also a sawtooth shape or triangular wave shape.

The base section of one of the tilt-locking eccentric can and the telescoping locking eccentric cam is fixed on the support shaft so as to rotate together with this support shaft. On the other hand, the base section of the other eccentric cam is supported on this support shaft so as to allow swing displacement of a predetermined angle with respect to this support shaft.

Between the other eccentric cam and support shaft, there is provided a first spring which has an elastic force in a direction of pressing the locking serrated section provided in the other eccentric cam against its mating portion, and between the adjustment lever and the support shaft, there is provided a second spring.

It is possible, with this second spring, to give the support shaft an elastic force in the direction of pressing each of the locking serrated sections provided in each of the eccentric cams against its mating portion when the adjustment lever is swing-displaced from the state of adjusting the position of the steering wheel to the state of fixing it.

Here, "spring" refers to a member having elasticity, and in addition to a metallic spring, it includes one processed with an elastic material such as elastomer material including rubber in a required shape (rubber spring).

In the case of implementing the position adjustment device for a steering wheel according to the second aspect of the present invention, more specifically, the other eccentric cam is the telescoping locking eccentric cam. Thus in a state where for example this telescoping locking eccentric cam has entered into a slit-shaped noncontiguous section provided in a part of the outer column to enable expansion and contraction of the inner diameter of the outer column, the telescoping locking serrated section is arranged so as to oppose to the outer circumferential surface of the inner column or to the surface of a member fixed on the inner column.

Moreover, the first spring is spanned between the telescoping locking eccentric cam and the support shaft, and the base section of the pair of tilt-locking eccentric cams, which is the one eccentric cam, is externally fitted and fixed on both of the end sections of the support shaft.

In a part of one tilt-locking eccentric cam of both of the tilt-locking eccentric cams, there is formed a driven side locking arm section in a state of projecting outward in the radial direction of this tilt-locking eccentric cam. By spanning the second spring between the tip end section of this driven side locking arm section and a part of the adjustment lever, this second spring is provided between this adjustment lever and the support shaft via the one tilt-locking eccentric cam.

Furthermore, the position adjustment device for a steering wheel according to the second aspect of the present invention may be provided with a turning force transmission spring which is a joining member provided between the tilt-locking eccentric cam and the portion which is displaced in response to turning of the adjustment lever. This turning force transmission spring, which is a joining member, in a state where the adjust lever is turned in the direction of reducing the distance between both of the support plates, brings the tilt-locking eccentric cam closer to the curved edge, and in a state where this adjustment lever is turned in the opposite direction, it takes the tilt-locking eccentric cam further from the curved edge.

In this case, a stopper section is provided on the widthwise side surface of a part of the member with the support shaft installed thereon so as to project widthwise outward, and in a state where the adjustment lever is turned in the opposite direction, this tilt-locking eccentric cam and the curved edge are prevented from coming in contact with each other based on the engagement between the stopper section and a part of the tilt-locking eccentric cam.

Moreover, the position adjustment device for a steering wheel according to either one of the first aspect and the second aspect of the present invention may be provided with an elastic member and a lock release lever. This elastic member is provided between the telescoping locking eccentric cam and the outer column or a member fixed on this outer column, and it applies an elastic force to the telescoping locking eccentric cam in a direction of bringing a portion of the telescoping locking serrated section towards the front side of this telescoping locking eccentric cam, into contact with the outer circumferential surface of the inner column or the surface of the member fixed on this inner column.

Furthermore, the lock release lever has its base end section supported on the intermediate section of the rod-shaped member, and it turns together with this rod-shaped member so as to be engaged with and disengaged from the telescoping locking eccentric cam. When the adjustment lever is turned from the state of fixing the position of the steering wheel to the state of adjusting it, the lock release lever swings and displaces this telescoping locking eccentric cam in a direction of separating the front end section of the telescoping locking serrated section from the mating portion thereof.

More specifically, the elastic member is a torsion coil spring such that a coil section is externally fitted on the intermediate section of the support shaft, and one end section thereof is engaged with the lock release lever and the other end section thereof is engaged with the outer column. Moreover, the joining member is a torsion coil spring such that it has a coil section in the intermediate section thereof, and one end section thereof is engaged with the tilt-locking eccentric cam and the other end thereof is engaged with a portion which rotates together with the rod-shaped member.

Effect of the Invention

The position adjustment device for a steering wheel of the present invention is capable of adjusting the position of a steering wheel, and is capable of suppressing displacement of the position of the steering wheel in a secondary collision.

More specifically, when adjusting the position of the steering wheel, by swinging the adjustment lever in a predetermined direction, the distance between the mutually opposing surfaces of the pair of support plates which constitute a support bracket, is increased. In this state, the movement of the adjustment lever is transmitted to the support shaft via the second spring, causing this support shaft to rotate in a predetermined direction, and the tilt-locking convex arc edge is separated from the curved edge provided on the rear end edge of both of the support plates. Further, the telescoping locking convex arc edge is separated from the outer circumferential surface of the inner column or from the surface of a member fixed on this inner column. Consequently, the outer column is slid on the pair of support plates and the inner column is slid on this outer column, to adjust the position of the steering wheel. Having adjusted this steering wheel to a required position, the adjustment lever is swung in the direction opposite of the predetermined direction.

As a result of swing in this opposite direction, the distance between the mutually opposing surfaces of both of the support plates is reduced, and both of these support plates firmly clamp the outer column from widthwise both sides. As a result, movement of this outer column with respect to both of these support plates, is prevented, and the up/down position of the steering wheel is fixed. At the same time, the inner diameter of the outer column is reduced, and the inner circumferential surface of this outer column is firmly pressed against the outer circumferential surface of the inner column. Accordingly, displacement of this inner column with respect to the outer column is prevented, and the front/rear position of the steering wheel is fixed.

In this way, in a state where the adjustment lever is swung until the up/down position and the front/rear position of the steering wheel have been fixed, the support shaft is rotated by the second spring in the direction opposite of the predetermined direction, and a portion of the tilt-locking convex arc edge where the distance from the center of this support shaft is shortest, or a portion in the vicinity thereof comes in contact with the curved edge provided on the rear end edge of both of the support plates. Moreover, a portion of the telescoping locking convex arc edge where the distance from the center of this support shaft is shortest, or a portion in the vicinity thereof comes in contact with the outer circumferential surface of the inner column or with the surface of a member fixed on this inner column.

From this state, if a forward-upward impact load is applied to the inner column and the outer column in the event of a secondary collision, the tilt-locking serrated section of the tilt-locking convex arc edge interlocks with the curved edge, and the telescoping locking serrated section of the telescoping locking convex arc edge interlocks with the outer circumferential surface of the inner column or with the surface of the member fixed on this inner column. As a result, a large force acts to prevent forward-upward displacement of the steering wheel, and it is possible to effectively prevent the position of this steering wheel from being displaced. At this time, the force required for interlocking the tilt-locking serrated section with the curved edge, and the force required for interlocking the telescoping locking serrated section with the outer circumferential surface of the inner column or with the surface of the member fixed on this inner column, are respectively small in the initial stage, and they gradually become greater. This type of characteristic is preferable in terms of protecting the driver by absorbing impact energy transmitted from the steering wheel to the inner column and the outer column.

Furthermore, according to the position adjustment device for a steering wheel of the present invention, when adjusting the up/down position of the steering wheel, it is possible to realize a tilt-type steering device in which unpleasant vibration and noise do not occur. That is to say, in a state where the adjustment lever is turned to adjust the up/down position of the steering wheel, this tilt-locking eccentric cam and the curved edge do not come in contact with each other due to engagement between the tilt-locking eccentric cam and the stopper section. Therefore, this tilt-locking eccentric cam and the curved edge of the support plate do not rub against each other when the up/down position adjustment is made, and when adjusting the up/down position, unpleasant vibration and noise do not occur.

BEST MODE FOR CARRYING OUT THE INVENTION

First Example of Embodiment

Figure 1:
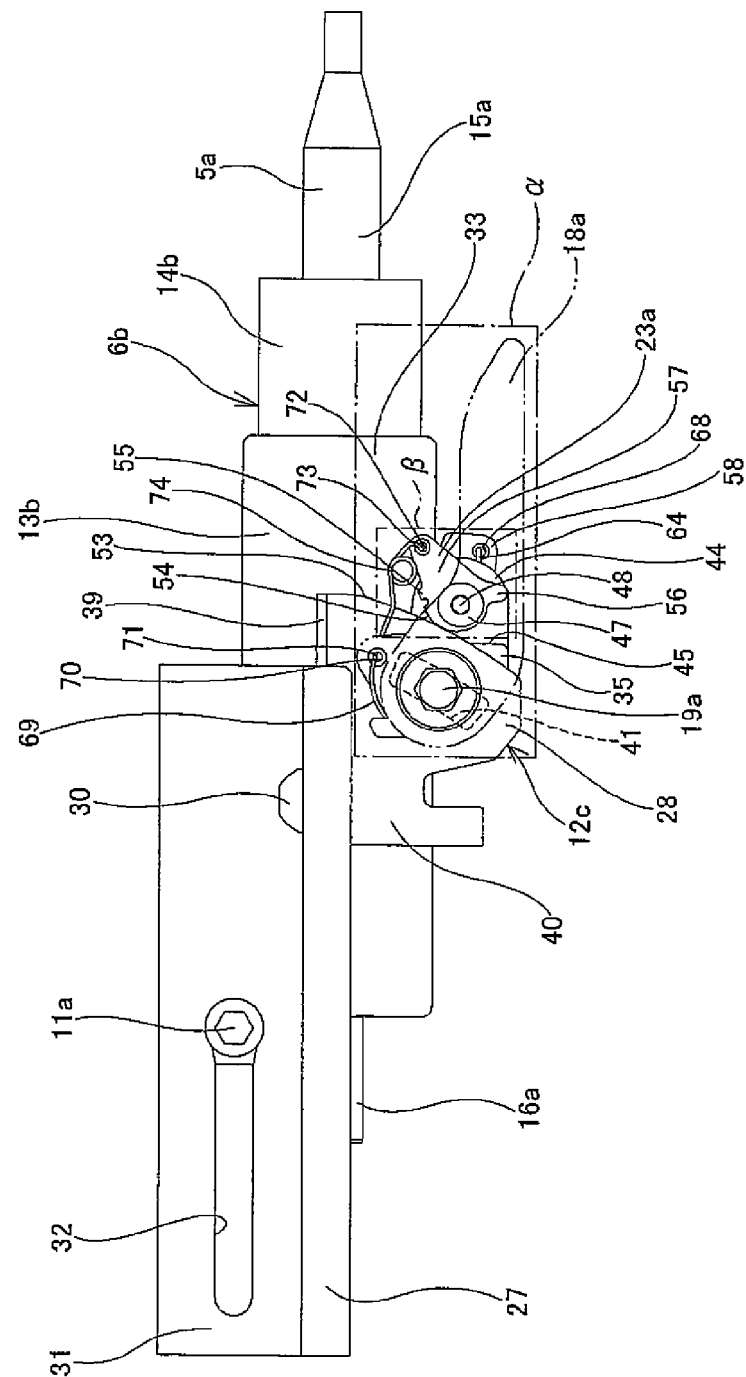
FIG. 1 is a side view showing a first example of an embodiment of the present invention.
Figure 2:
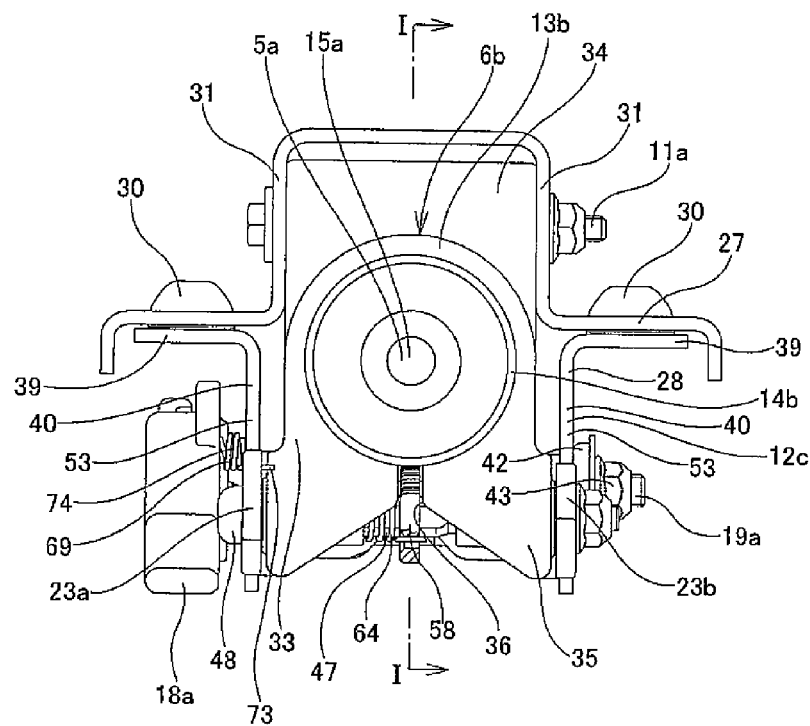
FIG. 2 is a cutaway view seen from the right side of FIG. 1 wherein a part of the first example is cut away.
Figure 3:
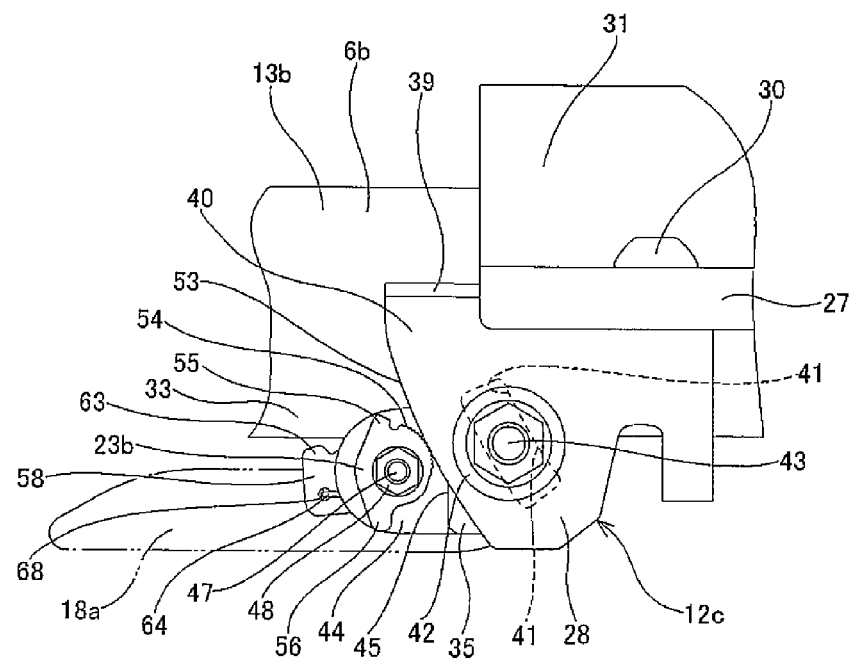
FIG. 3 is a view seen from the opposite side of FIG. 1 wherein a part of the first example is omitted.
Figure 4:
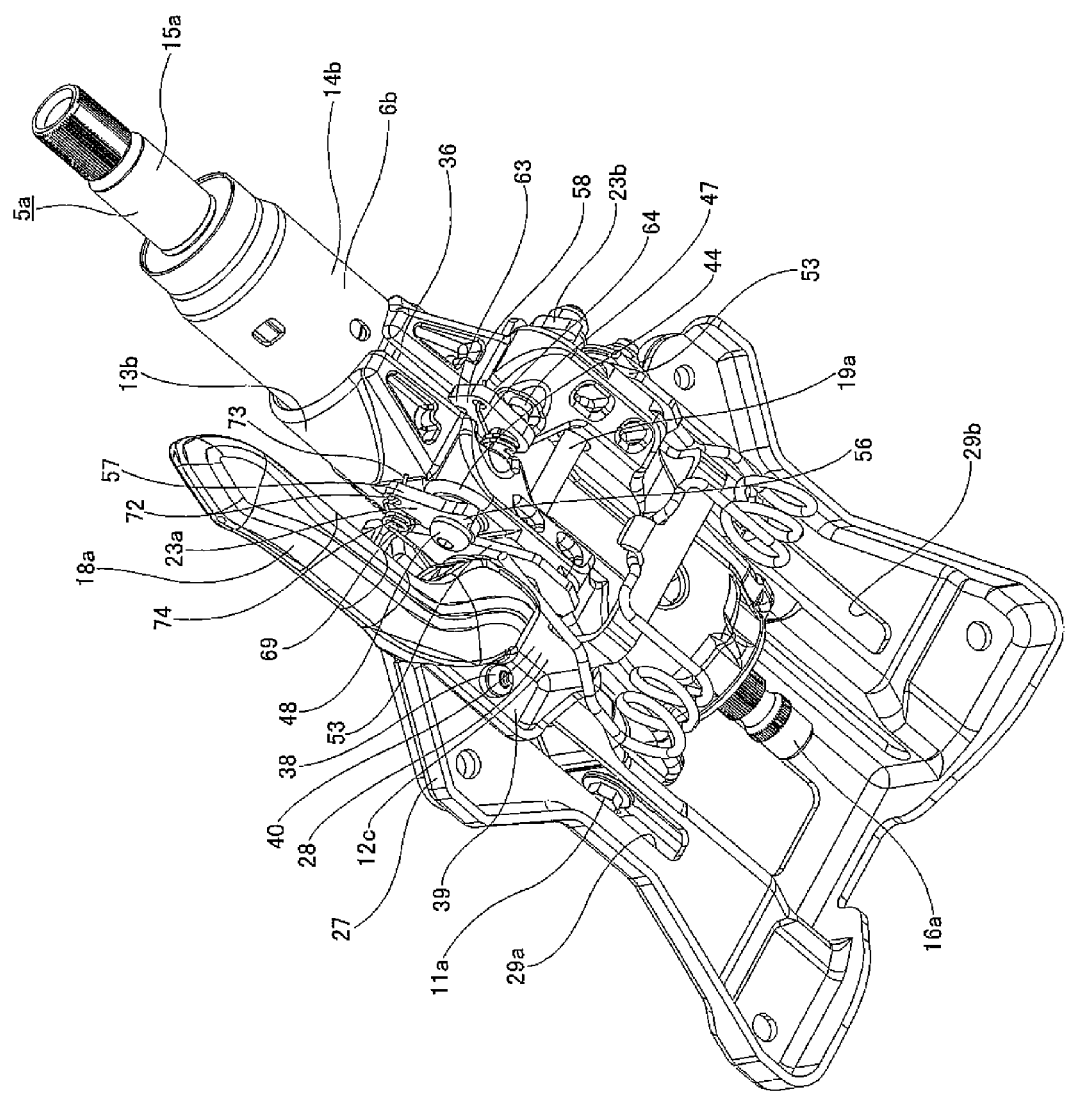
FIG. 4 is a perspective view of the first example seen from the right-underside of the near side of FIG. 1

FIGS. 1 to 19 show a first example of an embodiment of the present invention. A position adjustment device for a steering wheel of the present example, as respectively shown with an overall configuration thereof in FIG. 1 and FIG. 4, is such that an outer column 13$b$ is supported on a support bracket 12$c$ so as to be able to be swing-displaced about a pivot shaft 11$a$, to thereby enable a height position adjustment of a steering wheel 1 (refer to FIG. 25). Moreover, an inner column 14$b$ is supported on the inner diameter side of the outer column 13$b$ so as to be capable of axial displacement, and further, a steering shaft 5$a$ is rotatably supported on the inner side of this inner column 14$b$, thereby enabling an adjustment of the front/rear position of the steering wheel 1. The steering shaft 5$a$, as with the structure of FIG. 25, combines an outer shaft 15$a$ and an inner shaft 16$a$ so as to be capable of torque transmission as well as extension and retraction. This type of steering shaft 5$a$, with a combination of a single row deep groove type ball bearing and a needle bearing or the like, is supported on the inner diameter side of a steering column 6$b$ composed of the outer column 13$b$ and the inner column 14$b$, so as to be only rotatable. In this state, the steering wheel 1 can be freely fixed at a portion which projects from a rear end opening of the inner column 14b at the rear end section of the outer shaft 15a constituting the steering shaft 5a.

The support bracket 12c combines a front section element 27 and a rear section element 28 which are respectively made with a plastic-processed metallic plate such as a steel plate having sufficient strength and rigidity. These elements 27 and 28 are not relatively displaced at the time of a normal operation. However, they are configured so that the rear section element 28, with respect to the front section element 27 joined and fixed on a vehicle body, is displaced forward while absorbing impact energy when a secondary collision occurs. Therefore, in the case of the present example, into the rear end section of each of long holes 29a and 29b formed in the front/rear direction in both widthwise end side portions of the front section element 27, there is inserted from the upper side a bolt 30, and furthermore, both of these bolts 30 are inserted into both widthwise end side portions of the rear section element 28. Both of these bolts 30 are respectively screwed into a nut 38 (refer to FIG. 4), and furthermore, these bolt 30 and the nut 38 are tightened at a predetermined torque. Moreover, between the abutting surfaces of the front section element 27 and the rear section element 28, there is clamped a slide plate. Furthermore, a long hole 32 which is long in the front/rear direction is formed respectively at positions of a pair of mutually parallel side wall sections 31 provided in the upper half section of the front section element 27 which are aligned with each other.

In the case of the present example, both of end sections of the pivot shaft 11a are engaged with both of these long holes 32 so as to be capable of displacement in the front/rear direction. Moreover, between the front section element 27 and the outer column 13b, there is provided an energy absorbing member which plastically deforms in the direction of extension/retraction to thereby allow the outer column 13b to be displaced forward with respect to the front section element 27. In the case of the present example, with the type of structure described above, prevention of relative displacement of both of the elements 27 and 28 in a normal state is possible, and forward displacement of the rear section element 28 while absorbing impact energy in a secondary collision can be allowed.

Moreover, a structure in which prevention of relative displacement of both of the elements 27 and 28 in a normal state is possible, and forward displacement of the rear section element 28 while absorbing impact energy in a secondary collision can be allowed, may be configured by utilizing both of the long holes 32. In this case, both of these long holes 32 are such that the widthwise dimension of each rear end section thereof is made greater than that of the intermediate section to the front end section (the portion other than the rear end section for supporting both end sections of the pivot shaft 11a). Furthermore, both of the end sections of the pivot shaft 11a are supported at the rear end section of both of the long holes 32, and the widthwise dimension of the intermediate section to the front end section of both of these long holes 32 is made smaller than the outer diameter of both of the end sections of this pivot shaft 11a (or the sleeve section externally fitted on both of the end sections of the pivot shaft 11a). Moreover, both of the end sections of this pivot shaft 11a are supported on the intermediate section in the front/rear direction of both of the side wall sections 31 of the front section element 27 without allowing rattling in the front/rear direction and up/down direction. A specific operation is described later for both of the structures.

Figure 10:
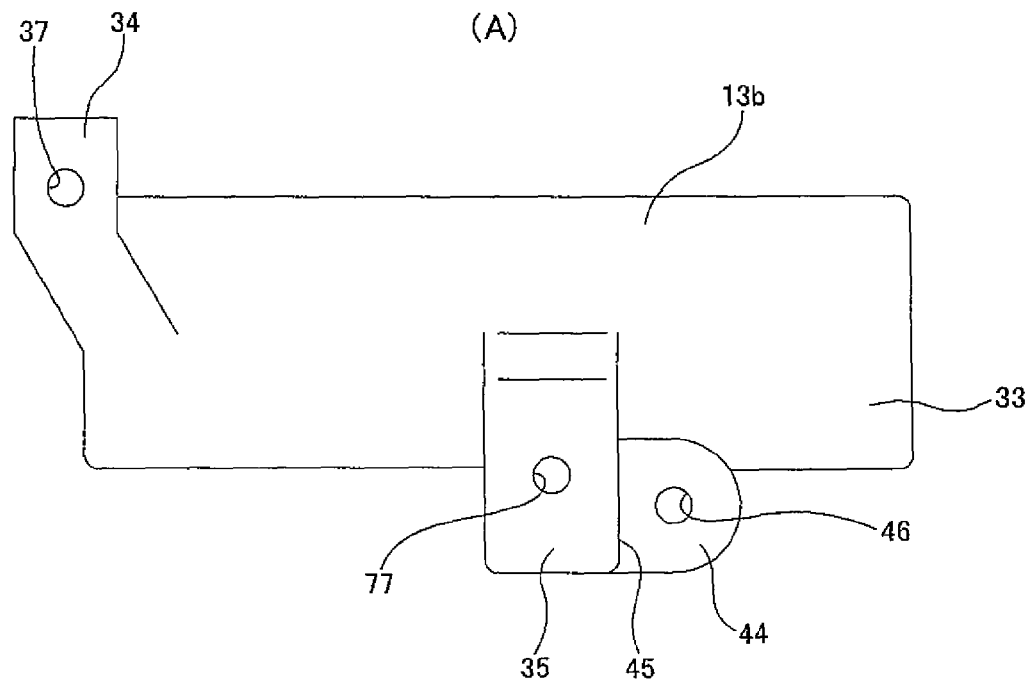
FIG. 10 includes a side view (A) of an outer column of the first example without other components, seen from the same direction as FIG. 1, and an end view (B) thereof seen from the right side of (A).
Figure 10:
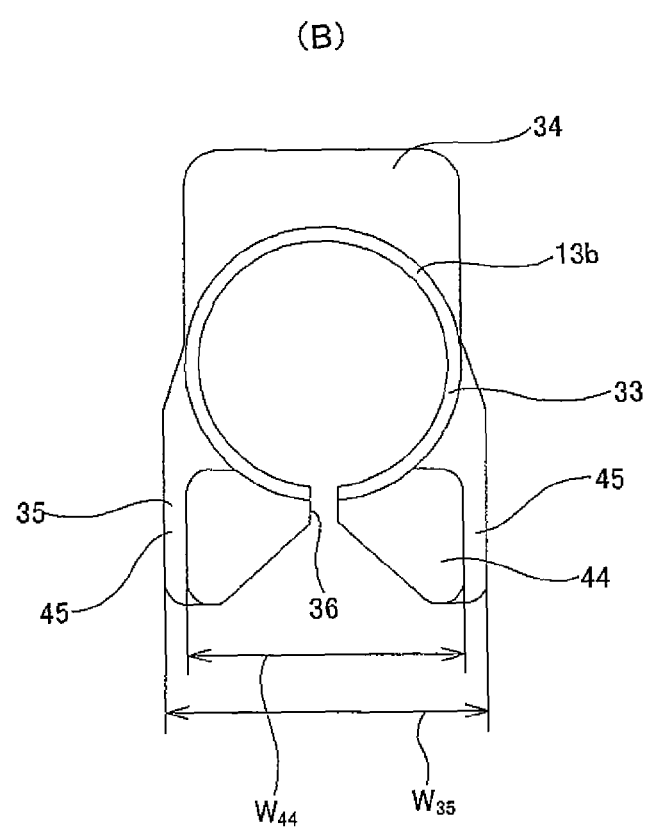

The outer column 13b is also referred to as a housing member and is fabricated by casting a light metallic material such as aluminum alloy, and it is provided with a main section 33, a pivoted section 34, and a clamped section 35 as shown in FIG. 10 for example. Among these, the main section 33 is such that in the bottom end section thereof there is provided, from the rear end section to the intermediate section in the axial direction, a slit-shaped noncontiguous section 36, and thereby the portion excluding the front end section is formed in a segmental cylinder shape. Therefore, the inner diameter of at least the rear end side portion of the main section 33 can be elastically increased and reduced. Moreover, the pivoted section 34 is provided in a state of projecting upward from the front end section of the main section 33, and both of the outer side surfaces on the left and right are parallel with each other. Furthermore, the clamped section 35 is provided on the lower surface of the intermediate section of the main section 33 so as to sandwich the noncontiguous section 36 from both left and right sides and project downward. Further, both of the left and right outer side surfaces are virtually parallel with each other, and the distance between both of these outer side surfaces is greater than the outer diameter of the main section 33. The rear end section side of the slit-shaped noncontiguous is of an open end in the example shown in the diagram. However, this noncontiguous section does not need to be formed from the rear end section of the main section of the outer column, and it may be configured with a closed slit which is axially formed from the vicinity of this rear end section.

Figure 14:
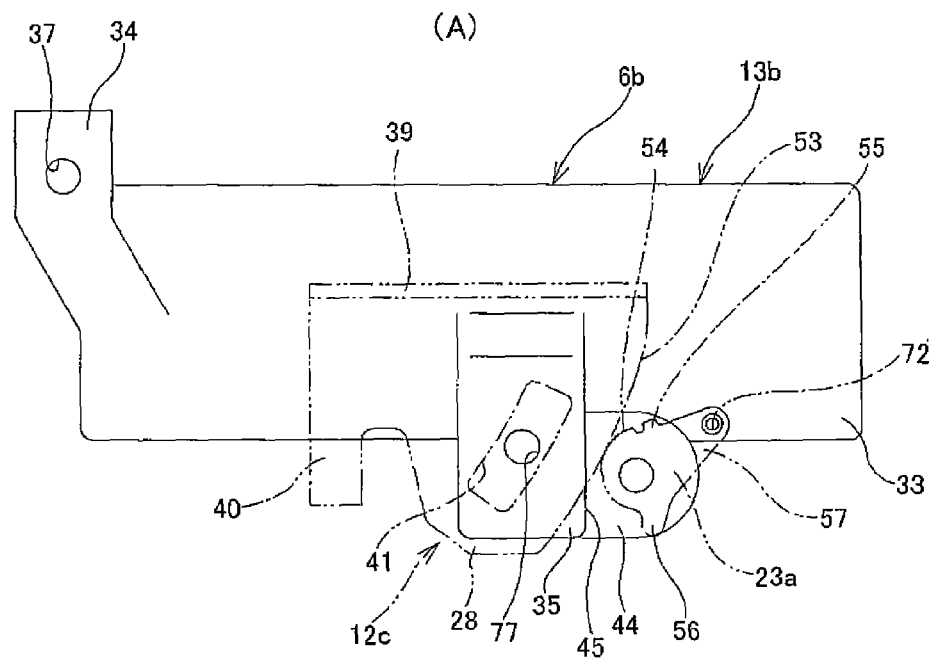
FIG. 14 is a diagram seen from the same direction as FIG. 1 for describing a stopper mechanism for preventing the tilt-locking eccentric cam from overturning, showing a state (A) of the outer column and the tilt-locking eccentric cam without other components, where this tilt-locking eccentric cam has been turned to one end, and a state (B) where it has been turned to the other end.
Figure 14:
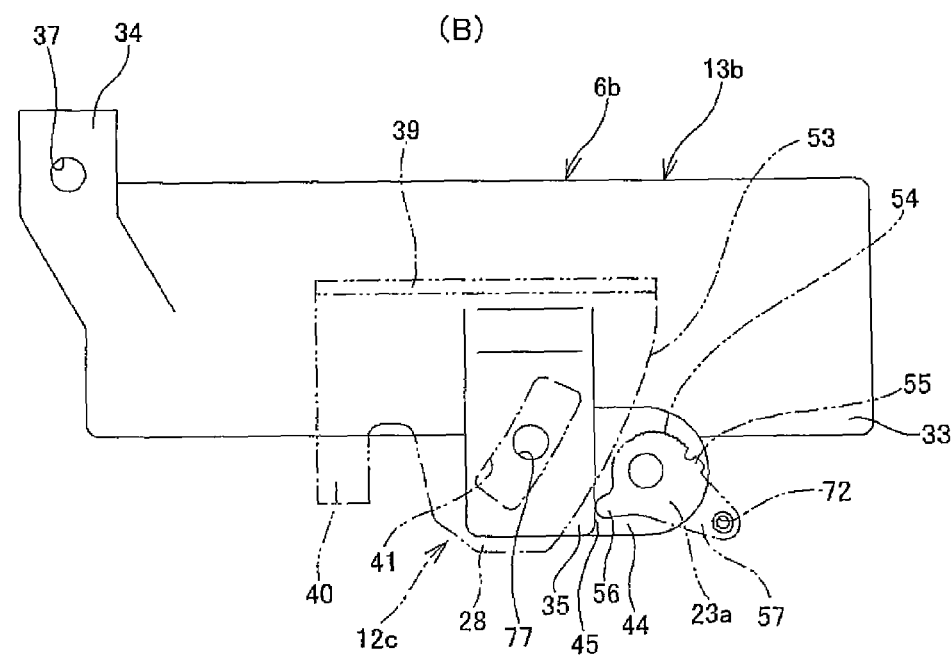
Figure 15:
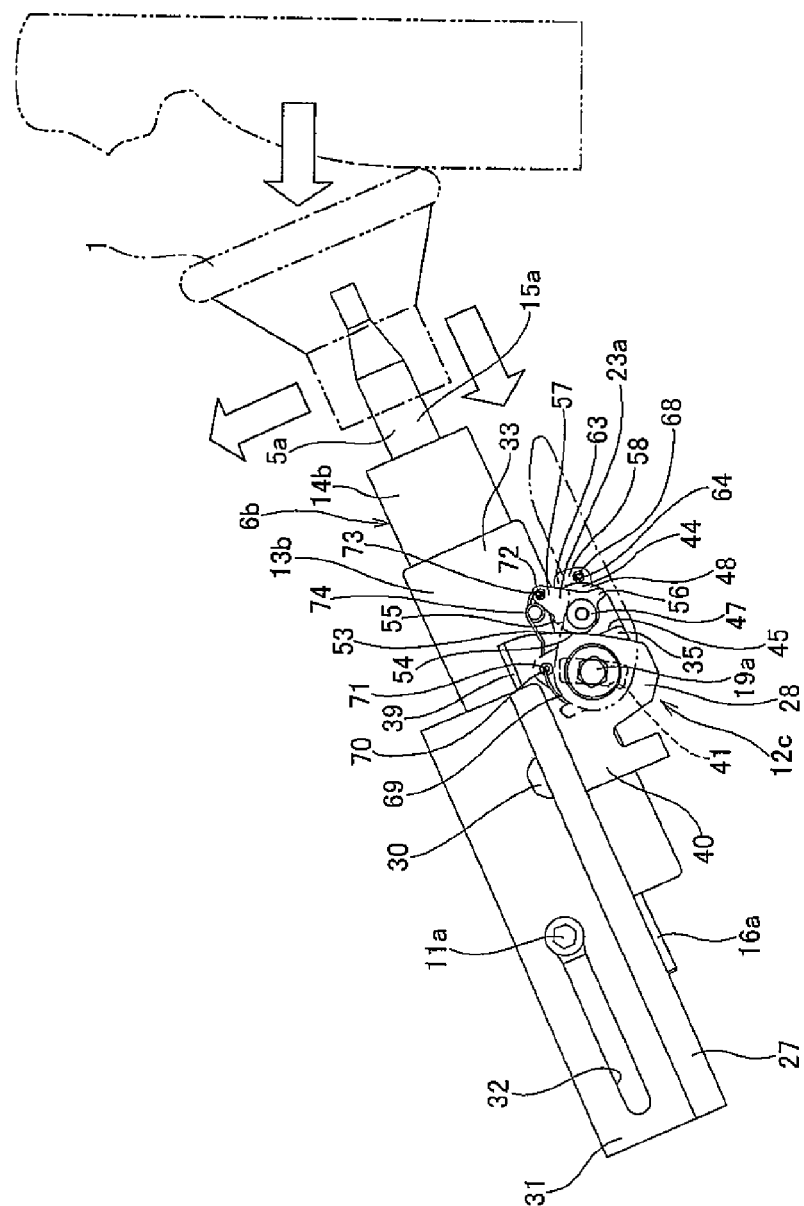
FIG. 15 is a side view of a steering device for a motor vehicle for describing the direction of an impact load applied to each section at the time of a secondary collision.

The pivot shaft 11a which is inserted into the rear end section of both of the long holes 32 at the center section of both of the side wall sections 31, is inserted into a through hole 37 provided so as to pass through the front end section of the pivoted section 34 of the outer column 13b in the widthwise direction (refer to FIG. 10 and FIG. 14). Moreover, with a head section with a large diameter provided in the base end section of the pivot shaft 11a, and a nut screwed on a tip end section thereof, this pivot shaft 11a is prevented from falling out. With this configuration, the outer column 13b is supported on the support bracket 12c so as to be capable of swing displacement about the pivot shaft 11a.

Figure 5:
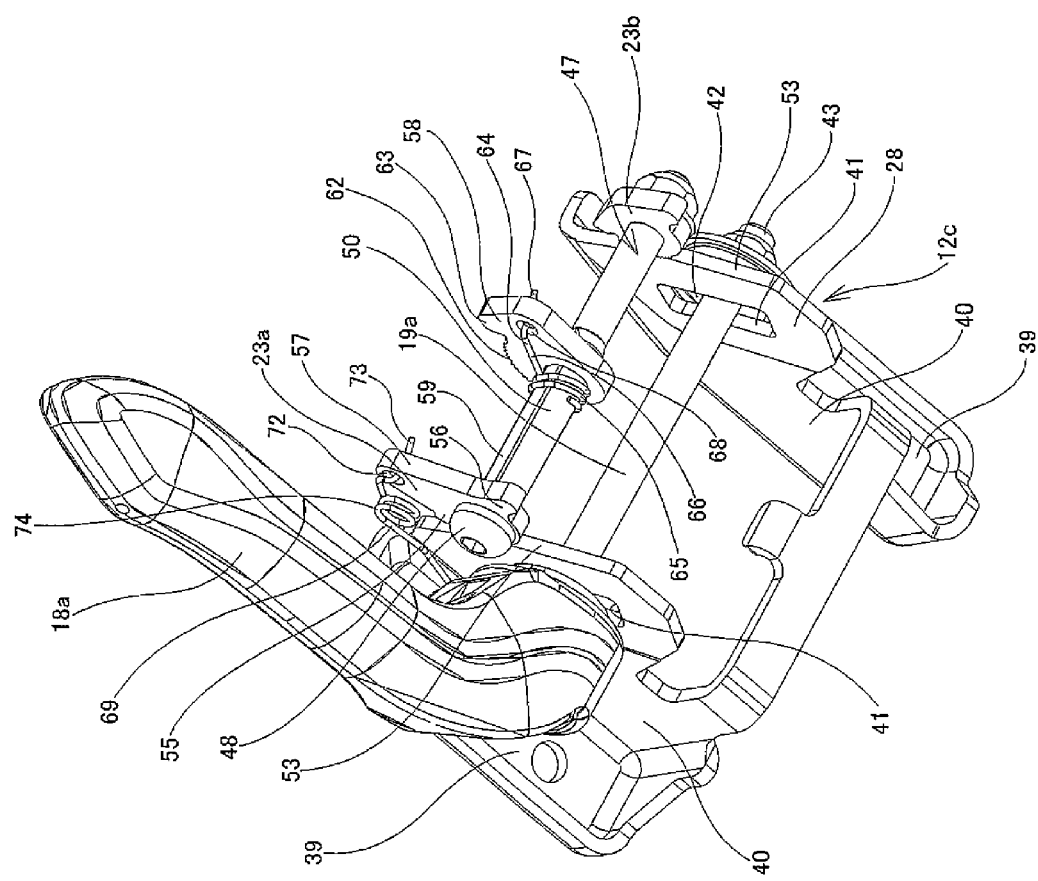
FIG. 5 is a perspective view showing some components of the first example without other components, seen from the same direction as FIG. 4.
Figure 6:
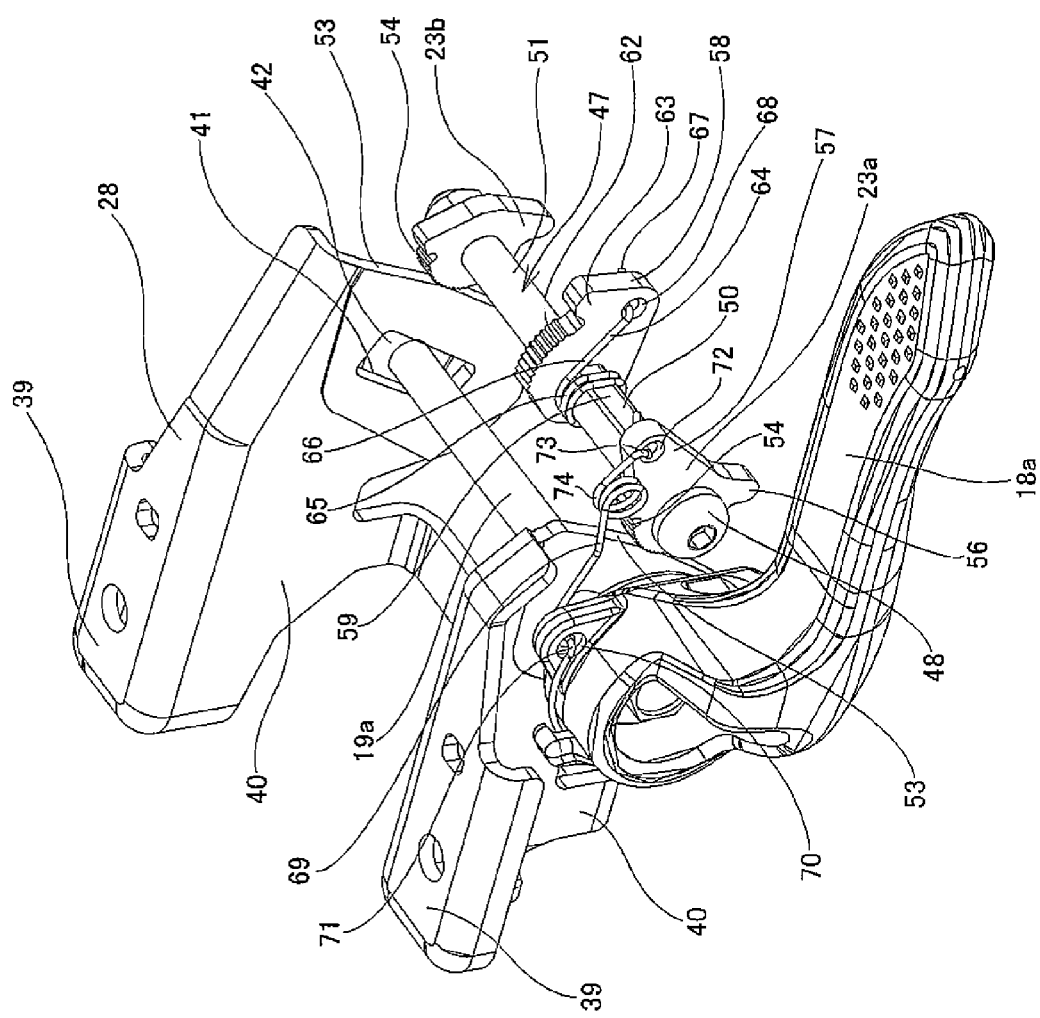
FIG. 6 is a perspective view showing some components of the first example without other components, seen from the vertically opposite direction as FIG. 5.
Figure 7:
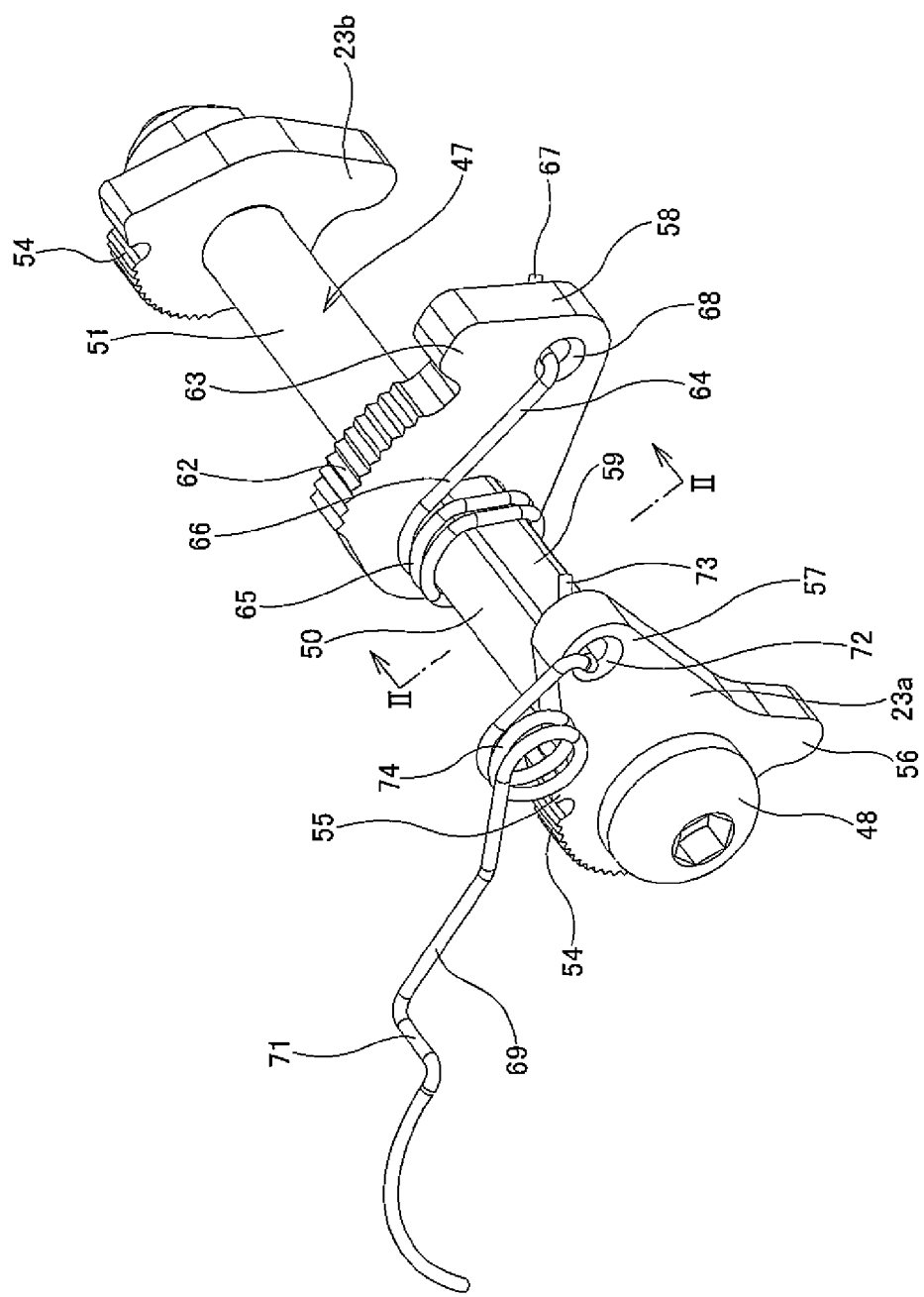
FIG. 7 is a perspective view showing some components of the first example drawn from the components shown in FIG. 6, seen from the same direction as FIG. 6.

On the other hand, the rear section element 28 is such that as shown in FIGS. 1 to 3 and 5 and 6 for example, a pair of left and right support plates 40 are provided parallel with each other in a state of hanging downward from the rear half section of a pair of attachment plate sections 39 for attaching this rear section element 28 to the rear end section lower surface of the front section element 27. In portions of both of these support plates 40 which are aligned with each other, there is respectively formed a long hole 41 which is long in a direction of an arc about the pivot shaft 11a (diagonally upward-downward direction). As shown in FIG. 4 to FIG. 6 for example, a rod-shaped member 19a is inserted through both of these long holes 41 and through holes 77 provided so as to pass through each of the clamped sections 35 of the outer column 13b in the left/right direction (refer to FIGS. 9, 10, and 14). The rod-shaped member 19a is to increase and reduce the distance between the mutually opposing surfaces of both of the support plates 40 in response to rotation, and both of the end sections thereof project from the outer side surface of both of these support plates 40. The base section of an adjustment lever 18a is joined and fixed on the base end section of the rod-shaped member 19a (left end section in FIGS. 4 to 6), and the outer side surface of a presser plate 42 externally fitted on the tip end section (right end section in FIGS. 4 to 6) is pressed with a nut 43, to thereby prevent this presser plate 42 from falling off.

Figure 13:
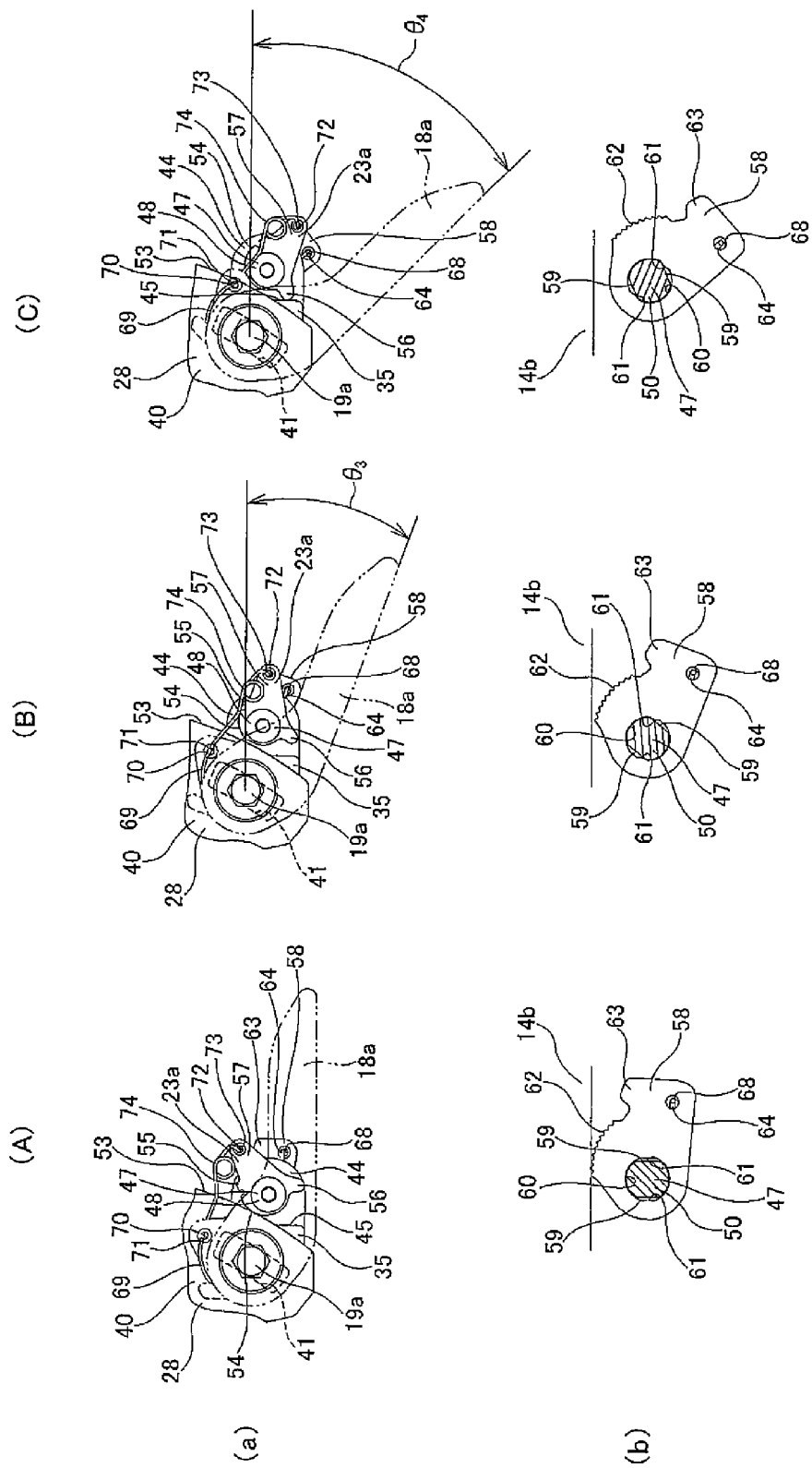
FIG. 13 includes an enlarged view (a) of a section α of FIG. 1 and a diagram (b) similar to FIG. 11 respectively shown in three ways (A) to (C), for describing the variation of positional relationship between both of the tilt-locking eccentric cam and the telescoping locking eccentric cam, and mating members thereof, with rotation of the adjustment lever.
Figure 35:
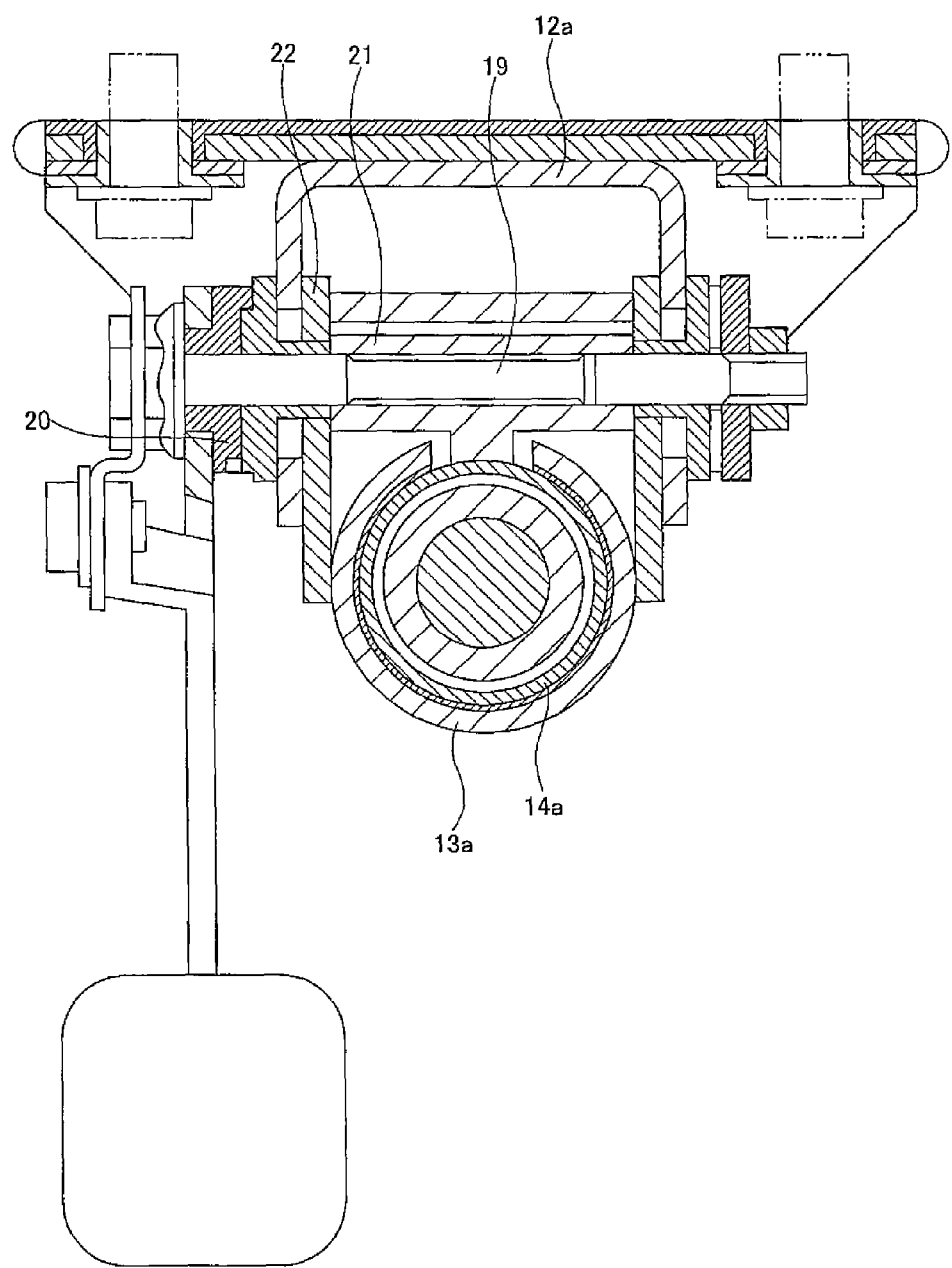
FIG. 35 is an enlarged VI-VI cross-sectional view of FIG. 34.
Figure 36:
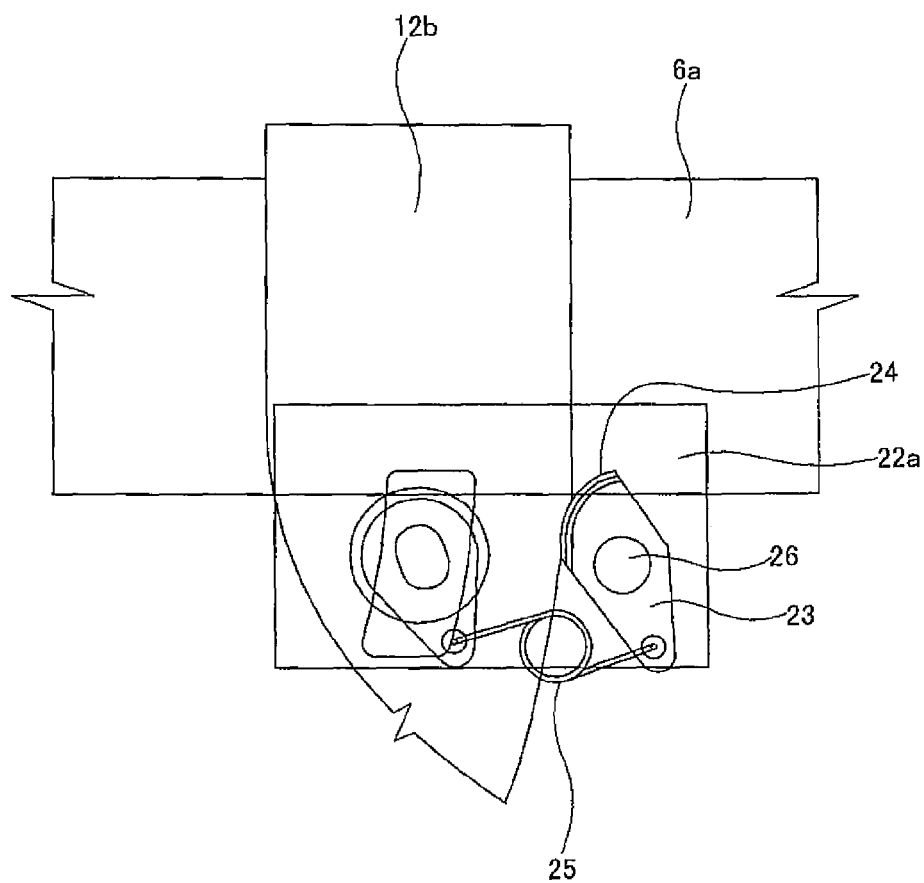
FIG. 36 is a partial side view showing an example of a conventionally known structure for preventing displacement in the position of a steering wheel.

Furthermore, a cam device 20 (refer to FIG. 35) is provided between the inner side surface of the base end section of the adjustment lever 18a and the outer side surface of one (left side in FIGS. 4 to 6) of the support plates 40, so as to be capable of increasing and reducing the distance between both of the side surfaces in response to turning of the adjustment lever 18a. When performing a position adjustment of the steering wheel 1, as shown in FIG. 13 (C) (a), the adjustment lever 18a is turned downward to thereby reduce the distance between the inner side surface of the base end section of the adjustment lever 18a and the outer side surface of the one support plate 40. Consequently, the distance between the inner side surfaces of the pair of support plates 40 is elastically increased, and the surface pressure of the contact section between the inner side surface of both of these support plates 40 and the outer side surface of the clamped section 35 of the outer column 13b is lowered or lost, making position adjustment of the steering wheel 1 possible. Having adjusted the position, if the adjustment lever 18a is turned upward as shown in FIG. 13 (A) (a), the distance between the inner side surfaces of both of the support plates 40 is reduced, instead of the distance being increased between inner side surface of the base end section of the adjustment lever 18a and the outer side surface of the one support plate 40. Accordingly, the surface pressure of the contact section between the inner side surface of both of these support plates 40 and the outer side surface of the clamped section 35 of the outer column 13b becomes greater, and the steering wheel 1 is supported at a post-adjustment position. In order to increase or reduce the above distance, it is sufficient that a pair of cam members which constitutes the cam device 20 is relatively displaced from each other in the rotation direction in response to turning of the adjustment lever 18a. The rod-shaped member 19a may rotate together with the adjustment lever 18a. However, it does not always have to rotate, and it may be only axially displaced without rotating. The structure for increasing and reducing the distance between the pair of support plates in response to rotation of the rod-shaped member, is not limited to a cam device, and various types of conventionally known devices such as screw mechanism may also be employed therefor. The above configuration and operation are similar to those of the conventionally known position adjustment device for a steering wheel.

Furthermore, in the case of the structure of the present example, as described below, displacement of the position of the steering wheel 1 at the time of a secondary collision is prevented, and in addition, unpleasant noise or vibration do not occur at the time of adjusting the position of this steering wheel 1. For this reason, as shown in FIG. 10 for example, a pivoting convex section 44 is provided on a rear end surface of the clamped section 35 of the outer column 13b, so as to project backward from this clamped section 35. Also this pivoting convex section 44 is provided in a state of sandwiching the noncontiguous section 36 from both sides in the widthwise direction. Moreover, as shown in FIG. 10 (B), the widthwise dimension $W_{44}$ of the pivoting convex section 44 is smaller than the widthwise dimension $W_{35}$ of the clamped section 35 ($W_{44} < W_{35}$). Therefore, both of the widthwise end sections of the rear end surface of this clamped section 35 are of a step surface 45. Both of these step surfaces 45 function as a stopper section.

Figure 8:
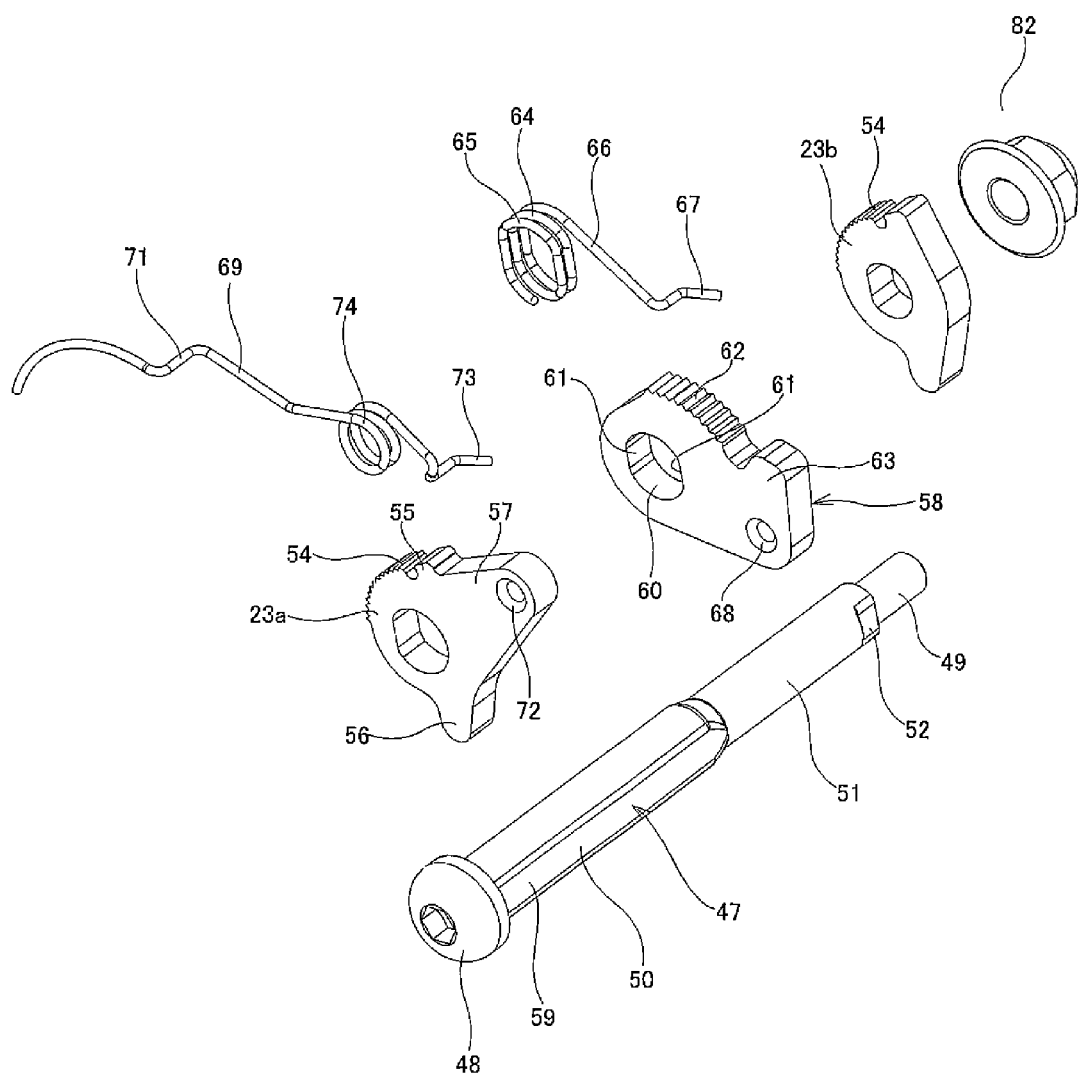
FIG. 8 is an exploded perspective view of the components shown in FIG. 7.
Figure 9:
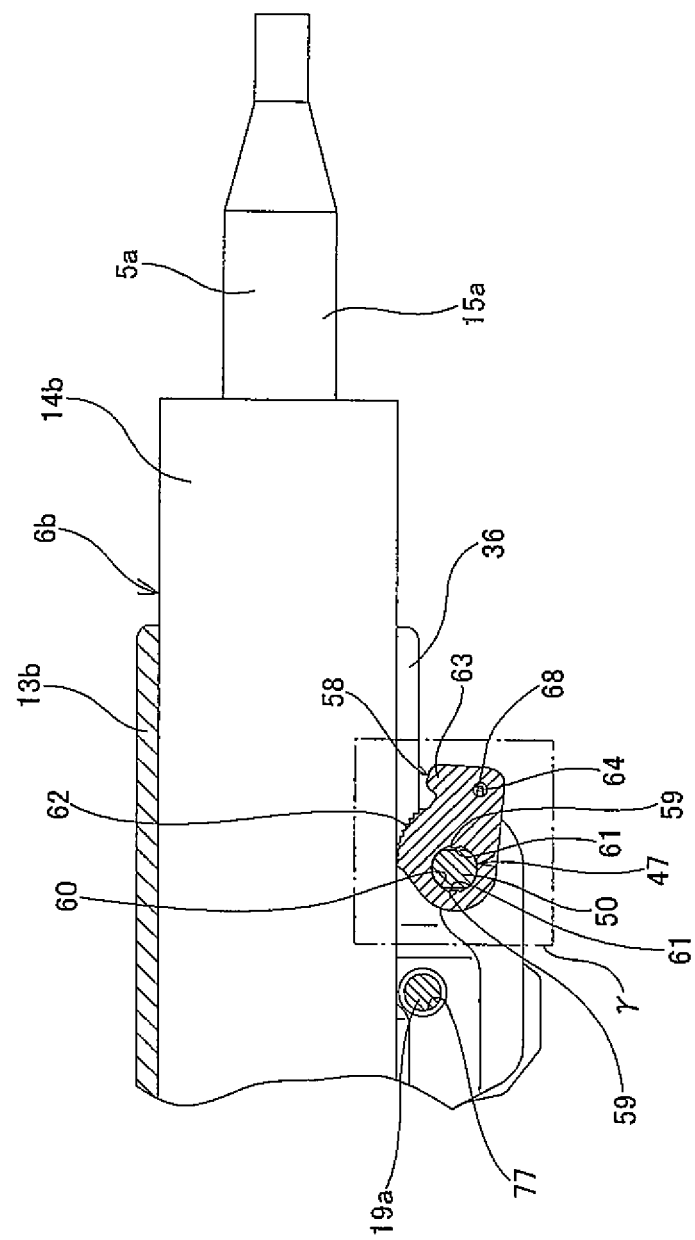
FIG. 9 is an I-I cross-sectional view of FIG. 2.

In a through hole 46 respectively formed in a state of passing in the widthwise direction through the respective pivoting convex sections 44, there is rotatably inserted a support shaft 47. This support shaft 47 is arranged parallel with the rod-shaped member 19a, and as shown in FIG. 8 for example, the base end section thereof (left end section in FIG. 8) has a head section 48 while the tip end section thereof (right end section in FIG. 8) has a male screw section 49. Moreover, the portion between the head section 48 and the male screw section 49 comprises, respectively from this head section 48 side, a large diameter side non-columnar section 50, a columnar section 51, and a small diameter non-columnar section 52. Tilt-locking eccentric cams 23a and 23b are respectively fitted externally on the large diameter side and small diameter side non-columnar sections 50 and 52, which are present on both end sections, among these respective sections 50 to 52, in a state where relative rotation with respect to the support shaft 7 is prevented, that is, where it rotates in synchronization with the support shaft 47.

Figure 16:
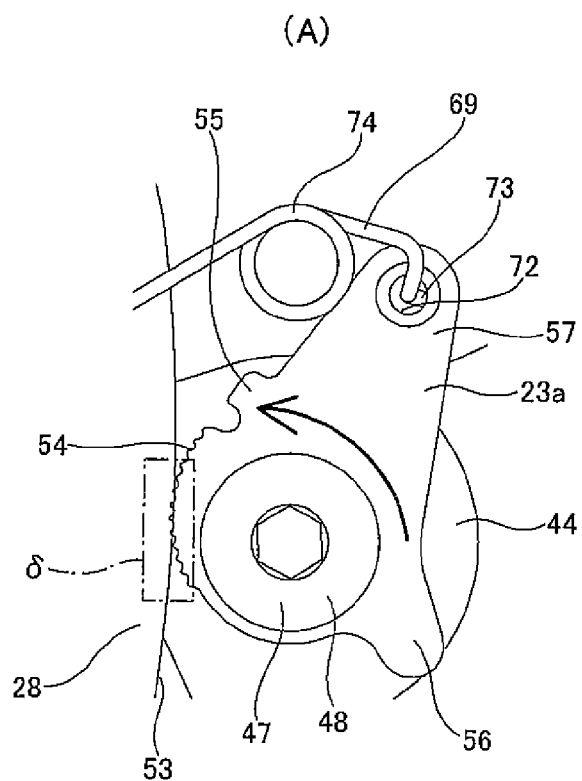
FIG. 16 includes an enlarged view (A) of a section β of FIG. 1 and an enlarged view (B) of a section δ of (A) for describing the movement of the tilt-locking eccentric cam at the time of a secondary collision.
Figure 16:
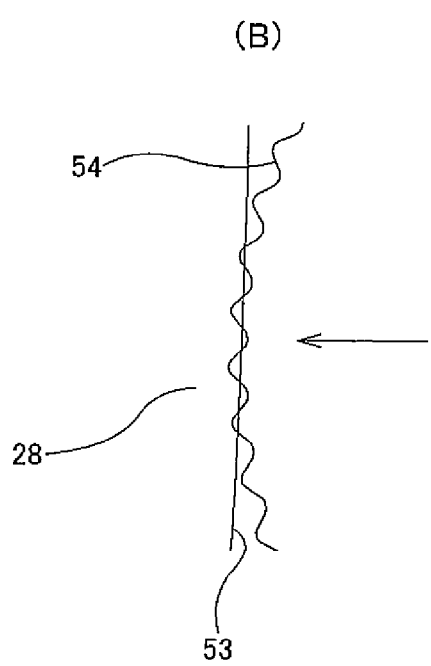

In a state where the position adjustment device for a steering wheel is assembled, a widthwise outer half section of both of the tilt-locking eccentric cams 23a and 23b is opposed to or is in contact with (the widthwise phases are matched) the rear end edge of both of the support plates 40 provided on the rear section element 28 of the support bracket 12c. The rear end edge of both of these support plates 40 is of a curved edge 53 having a shape of a convex arc about the pivot shaft 11a. Therefore, even in a case where the support shaft 47 is lifted or lowered with respect to the rear section element 28 in response to an up/down position adjustment of the steering wheel 1, the distance between this support shaft 47 and both of the curved edges 53 will not change. Moreover, a portion of the outer periphery portion of both of the tilt-locking eccentric cams 23a and 23b which opposes to both of the curved edges 53 is, as shown in FIGS. 1, 3, and 16 for example, of a tilt-locking convex arc edge angled in a direction in which the distance from the center of the support shaft 47 increases, that is, the center thereof is biased upward from the center of the support shaft 47, with upward approach, in a state where the position of the steering wheel 1 is fixed. Moreover, a tilt-locking serrated section 54 is formed on this tilt-locking convex arc edge. This tilt-locking serrated section 54 is of a sawtooth shape or triangular wave shape. Furthermore, on the outer periphery section of the one (left side in FIGS. 4 to 8) tilt-locking eccentric cam 23a, there is formed a driven arm section 57 so as to project radially outward.

Furthermore, in the case of the structure of the present example, as shown in FIGS. 1, 3, and 16 for example, in the portions of the outer periphery portion of both of the tilt-locking eccentric cams 23a and 23b which sandwich the tilt-locking serrated section 54 from both sides around the circumferential direction, there are provided a stopper 55 for preventing overturning at the time of a collision and a stopper 56 for preventing overturning at the time of an adjustment. The stopper 55 for preventing overturning at the time of a collision is provided in a portion adjacent to the upper side (large diameter side end section) of the tilt-locking serrated section 54, and the top section thereof is present at an approximate tangential position of the outer diameter side end section of this tilt-locking serrated section 54. Meanwhile, the stopper 56 for preventing overturning at the time of an adjustment is provided in a portion slightly distanced in the circumferential direction from the lower end section (small diameter side end section) of the tilt-locking serrated section 54, so as to sufficiently project from this portion. In the state where the position adjustment device for a steering wheel is assembled, a widthwise inner half section of the stopper 56 for preventing overturning at the tune of an adjustment is opposed to or is in contact with the step surface 45 (widthwise phases are matched). Both of the tilt-locking eccentric cams 23a and 23b respectively having this type of configuration are fabricated with a metallic material, such as medium carbon steel, high carbon steel, carburized steel, and bearing steel, harder than the metallic material which constitutes the rear section element 28 of the support bracket 12c such as low carbon steel and aluminum based alloy.

Figure 11:
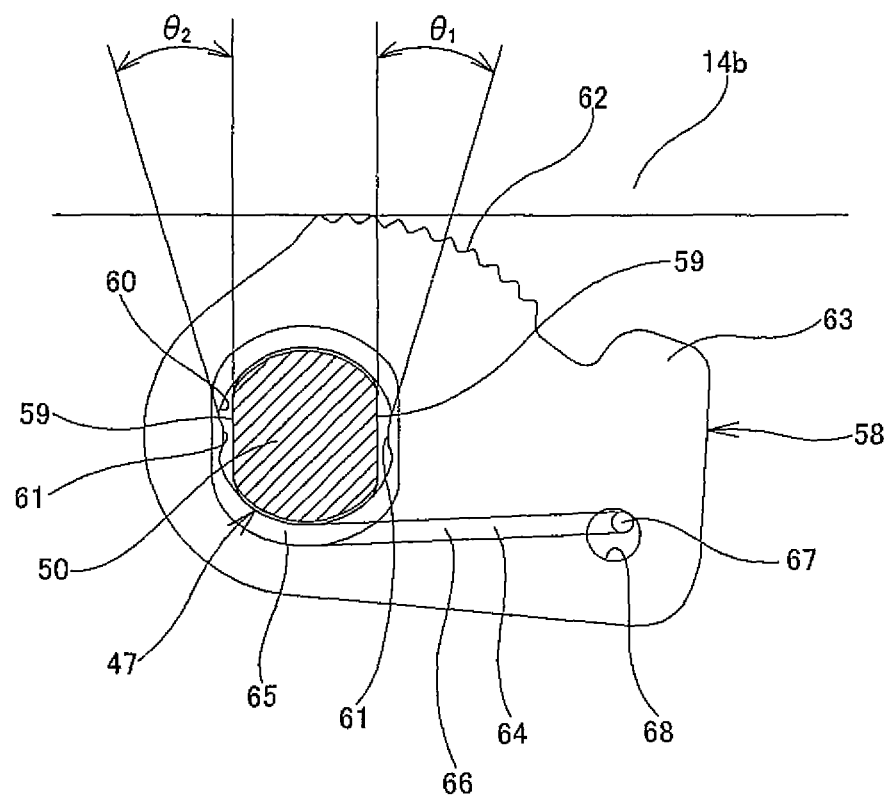
FIG. 11 is a diagram corresponding to an II-II cross-sectional view of FIG. 7 for describing a range of regulating the swing angle of a telescoping locking eccentric cam with respect to a support shaft.

On the other hand, a telescoping locking eccentric cam 58 is, at the intermediate section of the support shaft 47, externally fitted on the end section closer to the columnar section 51 of the large diameter side non-columnar section 50 with a structure shown in FIG. 11, so as to be capable of relative rotation with respect to the support shaft 47 only by a predetermined angle. In the state where the position adjustment device for a steering wheel is assembled, the telescoping locking eccentric cam 58 slots into the noncontiguous section 36 of the outer column 13b, and becomes opposed to the outer circumferential surface of the inner column 14b (lower surface in the case of the present example). In the case of the present example, the large diameter side non-columnar section 50 is of a cross-sectionally oval shape having a pair of mutually parallel flat surfaces 59. Moreover, an attachment hole 60 formed in the base section of the telescoping locking eccentric cam 58 (left section in FIG. 11) is of a noncircular shape, the basic shape of which is a circular shape, and which is formed in a state where a bank-shaped projection section 61 is formed at two positions on sides opposed to each other in the radial direction so as to project radially inward. Based on the engagement between both of these projection sections 61 and both of the flat surfaces 59, the telescoping locking eccentric cam 58 is capable of rotating about the neutral position shown in FIG. 11, with respect to the rod-shaped member 19a, only by $\theta_1$ in the counterclockwise direction and only by $\theta_2$ in the clockwise direction. Both of these angles $\theta_1$ and $\theta_2$ do not have to be the same, however, they may be the same angle.

Figure 12:
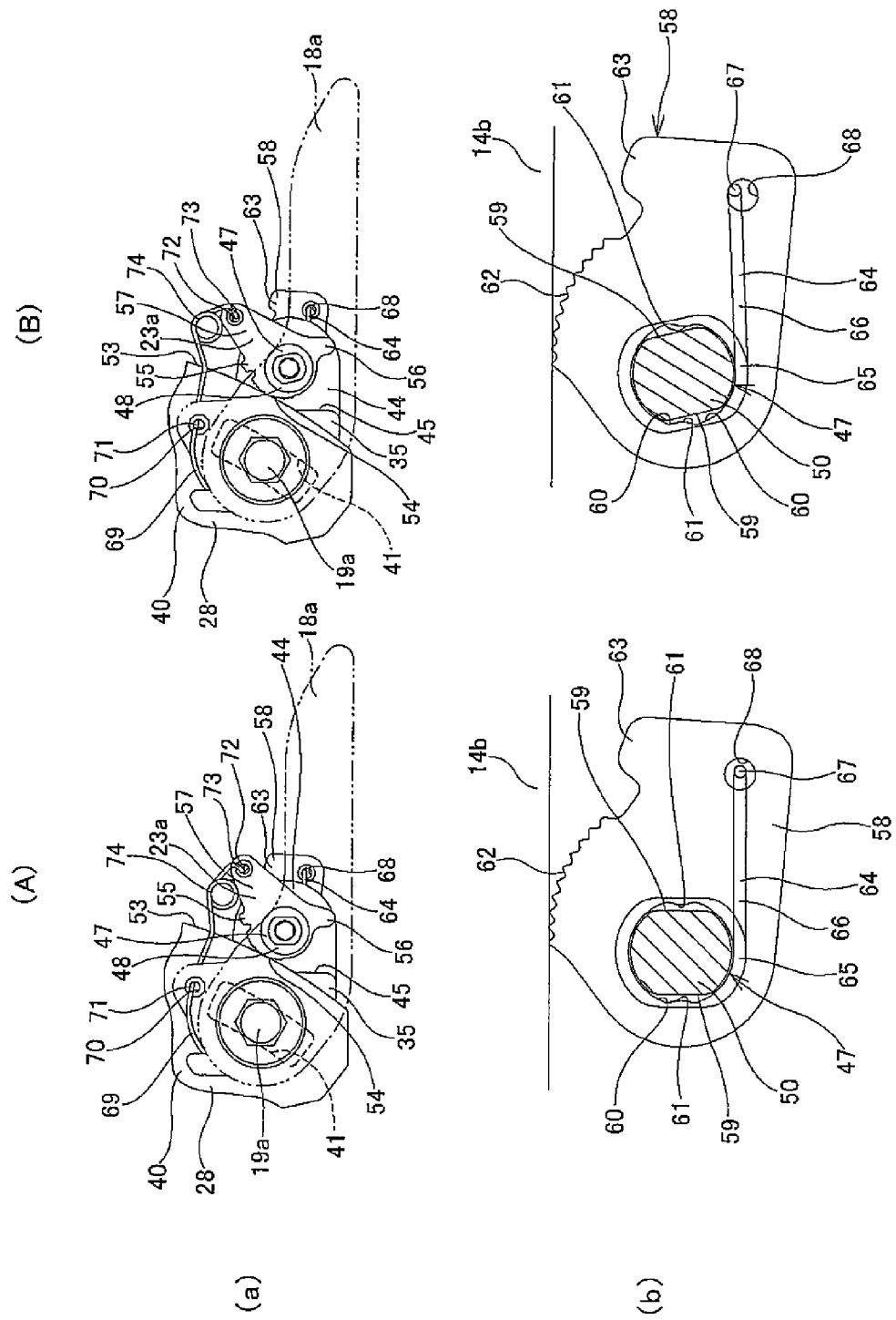
FIG. 12 includes an enlarged view (a) of a section α of FIG. 1 and a diagram (b) similar to FIG. 11 respectively shown in two ways (A) and (B), for describing a reason that errors can be absorbed by making the telescoping locking eccentric cam capable of swinging with respect to the support shaft.

In the case of the present example, by setting both of these angles $\theta_1$ and $\theta_2$, the positional relationship between the telescoping locking eccentric cam 58 and the inner column 14b can be made appropriate without the need for ensuring a high level of precision in the shape and assembly of the respective constituent members. That is to say, there is a possibility that in the state where the positional relationship between both of the tilt-locking eccentric cams 23a and 23b, and both of the curved edges 53 is appropriately restricted, the relationship between the support shaft 47 and the telescoping locking eccentric cam 58 may become as shown in FIG. 12 (A) or as shown in FIG. 12 (B). Even in this case, by setting both of the angles $\theta_1$ and $\theta_2$, positional displacement between the support shaft 47 and the telescoping locking eccentric cam 58 can be absorbed, and therefore, there is no need for ensuring a high level of precision in the shape and assembly of the respective constituent members. As a result, manufacturing cost can be suppressed.

Figure 18:
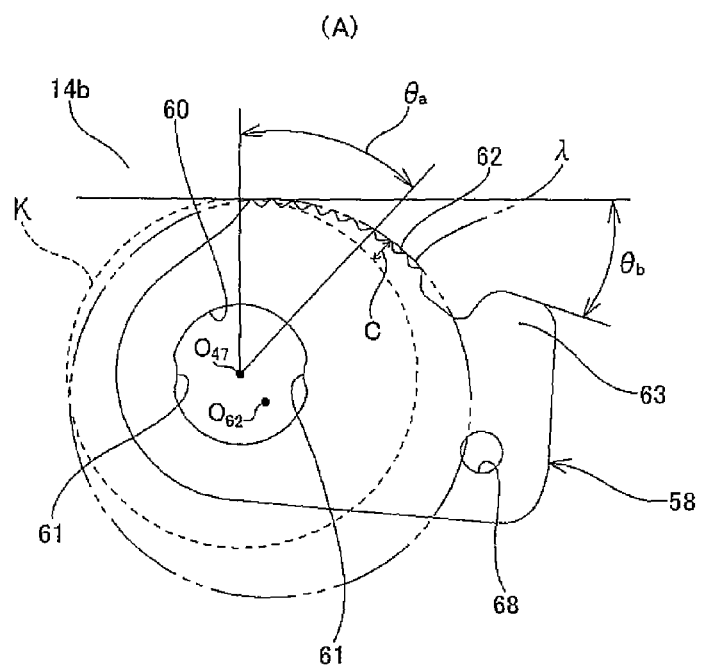
FIG. 18 includes, for describing the influence of the shape of the telescoping locking convex arc edge on the relationship between the displacement amount of the inner column and the retaining force applied in the direction of preventing the movement of this inner column at the time of a secondary collision, a diagram (A) of the telescoping locking eccentric cam seen from the same direction as FIG. 1 and a graph (B) showing a relationship between the displacement amount and the retaining force.
Figure 18:
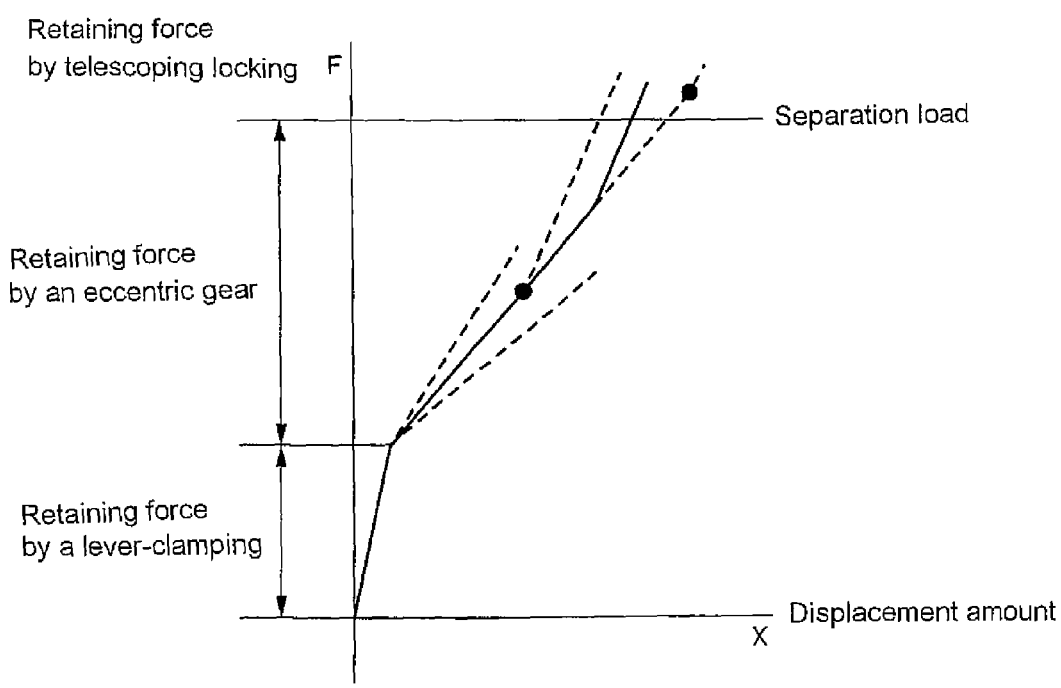

In the state where the position adjustment device for a steering wheel is assembled, the telescoping locking eccentric cam 58 slots into the noncontiguous section 36 of the outer column 13b, and becomes opposed to or comes in contact with the outer circumferential surface of the inner column 14b (lower surface in the case of the present example). A portion of the outer periphery section of this type of telescoping locking eccentric cam 58 which opposes to the outer circumferential surface of the inner column 14b, is angled in a direction in which the distance from the center of the support shaft 47 becomes greater with backward approach, and it is of a telescoping locking convex arc edge, the center $O_{62}$ of which is biased backward-downward from the center $O_{47}$ of the support shaft 47 as shown in FIG. 18. Moreover, a telescoping locking serrated section 62 is formed on the telescoping locking convex arc edge. This telescoping locking serrated section 62 is also of a sawtooth shape or triangular wave shape as with the tilt-locking serrated section 54. Furthermore, in the case of the structure of the present example, in a portion of the outer periphery portion of the telescoping locking eccentric cam 58 which departs backward from the large diameter side end section of the telescoping locking serrated section 62, there is provided a stopper 63 for preventing overturning at the time of a collision, so as to sufficiently project backward from this portion. This type of telescoping locking eccentric cam 58 is also fabricated with a metallic material, such as medium carbon steel, high carbon steel, carburized steel, and bearing steel, harder than the metallic material which constitutes the inner column 14b such as low carbon steel and aluminum based alloy.

Between the telescoping locking eccentric cam 58 and the support shaft 47 described above, as shown in FIGS. 4, 8, and 17 for example, there is provided a telescoping locking biasing spring 64, which is a first spring. This telescoping locking biasing spring 64 is formed with a bent spring steel wire rod, and it is provided with a base section 65 which can be externally fitted on the large diameter side non-columnar section 50 of the support shaft 47 in a state of preventing relative rotation and the shape of which seen in the axial direction is oval, an elastic presser section 66 which projects radially outward from this base section 65, and an engagement section 67 formed with the tip end section of this elastic presser section 66 which is bent in a crank shape. This type of telescoping locking biasing spring 64 is such that the base section 65 is externally fitted on the large diameter side non-columnar section 50, and the engagement section 67 is engaged with an engagement hole 68 formed in the rear end section of the telescoping locking eccentric cam 58, to thereby span between the telescoping locking eccentric cam 58 and the support shaft 47. In this state, this telescoping locking eccentric cam 58 is given an elastic force in a direction of turning about the support shaft 47 and pressing the telescoping locking serrated section 62 against the lower surface of the inner column 14b (counterclockwise direction in FIGS. 4 to 7, 9, 11 to 13, 16, and 17).

Furthermore, between the adjustment lever 18a and the support shaft 47, there is provided a turning force transmission spring 69 which serves as a second spring (joining member), to enable transmission of the movement of this adjustment lever 18a to the support shaft 47. In the case of the present example, the turning force transmission spring 69 is such that it is configured by bend-forming a spring steel wire rod, in a base end side portion thereof there is formed a driving side engagement section 71 to be engaged with a driving side engagement hole 70 (refer to FIGS. 1, 6, 12, and 13) provided in the base end section of the adjustment lever 18a, and in a tip end section thereof there is formed a driven side engagement section 73 to be engaged with a driven side engagement hole 72 formed in the tip end section of the driven arm section 57 of the tilt-locking eccentric cam 23a. Moreover, in the intermediate section thereof there is provided a coil section 74 for ensuring a flexible volume. By respectively engaging the driving side engagement section 71 with the driving side engagement hole 70 and engaging the driven side engagement section 73 with the driven side engagement hole 72, the adjustment lever 18a and the support shaft 47 are joined via the tilt-locking eccentric cam 23a and the turning force transmission spring 69, to thereby enable transmission of the movement of the adjustment lever 18a to the support shaft 47. The coil section 74 is provided to give an appropriate elastic force to the tilt-locking eccentric cam 23a regardless of manufacturing errors to a certain degree.

With this type of configuration, when the adjustment lever 18a is turned upward as shown in FIG. 13 (A) (a) and the position of the steering wheel 1 is fixed, the support shaft 47 is turned in the counterclockwise direction in FIGS. 4 to 7, 9, 11 to 13, 16, and 17. In response to this turning, the lower end section to the intermediate section of the tilt-locking serrated section 54 of the pair of tilt-locking eccentric cams 23a and 23b fixed on both end sections of the support shaft 47, are respectively butted on the curved edge 53 on the support bracket side, and the front end side portion of the telescoping locking serrated section 62 of the telescoping locking eccentric cam 58 supported on the intermediate section of the support shaft 47 is butted on the lower surface of the inner column 14b.

The position adjustment device for a steering wheel of the present example configured as described above operates in a manner described below, so as to enable an adjustment of the up/down position and front/rear position of the steering wheel 1, and suppress upward or forward displacement of the position of the steering wheel 1 at the time of a secondary collision, to thereby achieve enhanced protection of a driver colliding with this steering wheel 1.

First, when adjusting the position of the steering wheel 1, the adjustment lever 18a is turned from the state shown in FIG. 13 (A) (a) to the state shown in FIG. 13 (C) (a) in the clockwise direction in the same diagrams. As a result, with the operation of the cam device as described above, the surface pressure of the contact section between the inner side surface of both of the support plates 40 and the outer side surface of the clamped section 35 of the outer column 13b, is lowered or lost.

Moreover, in this state, since the support shaft 47 also turns in the clockwise direction of FIG. 13, the tilt-locking eccentric cams 23a and 23b, and the telescoping locking eccentric cam 58 supported on this support shaft 47, also turn in the clockwise direction of the same diagram. As shown in FIG. 13 (C) (a) and FIG. 14 (B), the entire tilt-locking serrated section 54 becomes separated from the curved edge 53. Furthermore, in this state, it turns beyond a stroke with which the telescoping locking biasing spring 64 loses its elastic force pressing the telescoping locking eccentric cam 58 against the lower surface of the inner column 14b. As a result, as shown in FIG. 13 (C) (b), the entire telescoping locking serrated section 62 of the telescoping locking eccentric cam 58 becomes separated from the lower surface of the inner column 14b. In this state, an adjustment of the up/down position and front/rear position of the steering wheel 1 becomes possible. An up/down position adjustment is performed by moving the rod-shaped member 19a along the long hole 41 of both of the support plates 40 while swing-displacing the outer column 13b about the pivot shaft 11a. Moreover, a front/rear position adjustment is performed by axially sliding the inner column 14b on the outer column 13b.

In the case of the present example, a stopper 56 for preventing overturning at the time of an adjustment is provided on the tilt-locking eccentric cams 23a and 23b respectively. Therefore, with the engagement between the stopper 56 for preventing overturning at the time of an adjustment and both of the step surfaces 45 serving as a stopper section, the turning amount of both of the tilt-locking eccentric cams 23a and 23b is limited. That is to say, in a state where the adjustment lever 18a is turned downward in order to make a position adjustment of the steering wheel 1, as shown in FIG. 13 (C) (a) and FIG. 14 (B), the tip end section of the stopper 56 for preventing overturning at the time of an adjustment of the tilt-locking eccentric cam 23a (23b) is butted against the step surface 45 present on the outer side surface of the outer column 13b. In this state, the entire tilt-locking eccentric cam 23a (23b) becomes separated from the curved edge 53 of the support plate 40. For this reason, even if the operating amount of the adjustment lever 18a becomes excessive, that is, even if it is excessively turned downward, both of the tilt-locking eccentric cams 23a and 23b will not be excessively turned in the clockwise direction in FIG. 13. As a result, in the state where the adjustment lever 18a is turned downward, part of both of the tilt-locking eccentric cams 23a and 23b and the curved edge 53 of both of the support plates 40 do not interfere with each other, and a smooth adjustment of the up/down position of the steering wheel 1 can be performed without giving the driver a sense of discomfort.

Having adjust the steering wheel 1 to a required position as described above, the adjustment lever 18a is swung upward in a direction opposite to the predetermined direction (in the counterclockwise direction in FIG. 13) until the adjustment lever 18a becomes substantially parallel with the outer column 13b and the inner column 14b as shown in FIG. 1 and FIG. 13 (A) (a) for example. As a result of this swing in the opposite direction, with the operation of the cam device described above, both of the support plates 40 firmly clamp the outer column 13b from both sides in the widthwise direction, and the up/down position of the steering wheel 1 is fixed. At the same time, as a result of reduction in the widthwise dimension of the noncontiguous section 36, the inner diameter of the outer column 13b is reduced, and the inner circumferential surface of this outer column 13b is firmly pressed against the outer circumferential surface of the inner column 14b. Further, relative displacement in the axial direction between both of these columns 13b and 14b is prevented, and the front/rear position of the steering wheel 1 is fixed.

As described above, in the state where the adjustment lever 18a is swung upward until the position of the steering wheel 1 is fixed, the turning force transmission spring 69 rotates the support shaft 47 in the same direction as the adjustment lever 18a (counterclockwise direction in FIG. 13). As shown in FIG. 13 (A) (a), a lower end side portion of the tilt-locking convex arc edge (tilt-locking serrated section 54) of the tilt-locking eccentric cam 23a (23b) in which the distance from the center of the support shaft 47 is shortest, comes in contact with the curved edge 53 provided on the rear end edge of both of the support plates 40. Moreover, as shown in FIG. 13 (A) (b), a front end portion of the telescoping locking convex arc edge (telescoping locking serrated section 62) of the telescoping locking eccentric cam 58 in which the distance from the center of the support shaft 47 is shortest, comes in contact with the outer circumferential surface (lower surface) of the lower end section of the inner column 14b.

In the state where the adjustment lever 18a is turned upward as shown in FIG. 13 (A) (a), the force of both of the support plates 40 clamping the outer column 13b becomes an appropriate value, and at the same time, the lower end section to intermediate section (lower end side portion) of the tilt-locking serrated section 54 of both of the tilt-locking eccentric cams 23a and 23b need to be butted against the curved edge 53 on the support bracket side. Furthermore, the front end side portion of the telescoping locking serrated section 62 of the telescoping locking eccentric cam 58 needs to be butted against the lower surface of the inner column 14b. In the above operation, the lower end section to intermediate section of the tilt-locking serrated section 54 can be easily butted against the curved edge 53 on the support bracket side while bringing the clamping force to an appropriate value, by adjusting the axial position of the presser plate 42, using the nut 43 screwed on the male screw section 49 of the tip end of the rod-shape member 19a.

However, in the case where the telescoping locking eccentric cam 58 is on the support shaft 47, a high level of precision is required in the shape, dimension, and assembly of the respective sections in order to strictly restrict also the positional relationship between the telescoping locking serrated section 62 and the inner column 14b. As a result, cost increases. In contrast, in the case of the present example, as described using FIG. 11, since the telescoping locking eccentric cam 58 is supported on the support shaft 47 while being capable of slight swing displacement, it is possible, without requiring a particularly high level of precision in the respective sections, to realize, at low cost, a position adjustment device for a steering wheel which achieves an appropriate engagement relationship between the respective members as mentioned above and which is capable of reliably obtaining required performance when fixing the position of the steering wheel 1.

Figure 19:
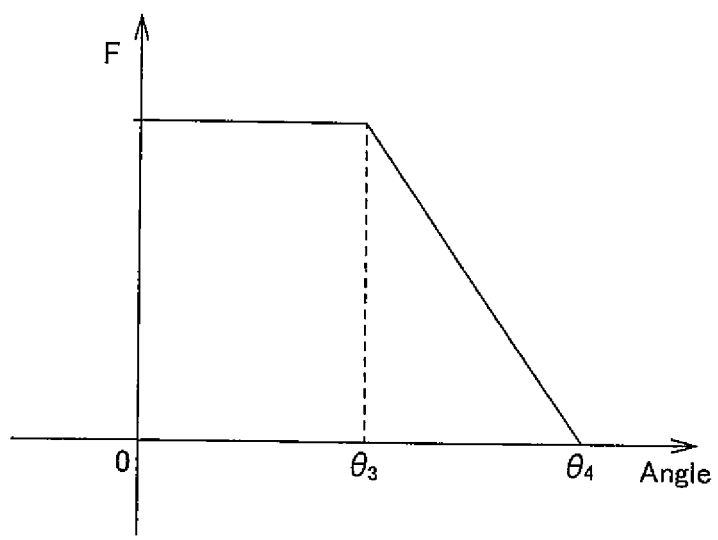
FIG. 19 is a graph for describing a relationship between the amount of turning of the adjustment lever and the force for retaining the inner column on the outer column, showing a relationship between the turning amount and the retaining force.

For example, in the state where the adjustment lever 18a is turned to $\theta_3$ ($\theta_3<\theta_4$) as shown in FIG. 13 (B) between the state shown in FIG. 13 (A) where the position of the steering wheel 1 is completely fixed (turning amount=0) and the state shown in FIG. 13 (C) where the adjustment lever 18a is turned to $\theta_4$ and a position adjustment of the steering wheel 1 is possible, it is preferable to tune the respective sections so that the position of the steering wheel 1 does not move, but the respective locking serrated sections 54 and 62 are separated from the mating surface thereof. In other words, it is preferable that the relationship between the turning amount of the adjustment lever 18a and the force of retaining the inner column 14b with respect to the outer column 13b, is made as shown in FIG. 19. In the case where the turning amount is from 0 to $\theta_3$, the respective locking serrated sections 54 and 62 are gradually separated from the mating surface thereof; however, the force of retaining the position of the steering wheel 1 remains the same. In contrast, in the case where the turning amount is from $\theta_3$ to $\theta_4$, the respective locking serrated sections 54 and 62 are further separated gradually from the mating surface thereof, and the force of retaining the position of the steering wheel 1 decreases gradually. In the case of the present example, since the telescoping locking eccentric cam 58 is supported on the support shaft 47 while being capable of slight swing displacement as described above, the type of tuning mentioned above can be easily conducted.

As shown in FIG. 1 and FIG. 13 (A) (a), if a forward-upward impact load is applied to the inner column 14b and the outer column 13b at the time of a secondary collision in a state where the position of the steering wheel 1 is fixed, displacement of the position of the steering wheel 1 is prevented as described below. First, upward displacement motion of the steering wheel 1 can be suppressed by the tilt-locking serrated section 54 provided on the tilt-locking convex arc edge of both of the tilt-locking eccentric cams 23a (23b) interlocking with the curved edge 53 of the support plate 40. That is to say, at the time of a secondary collision, if the outer column 13b tends to be displaced upward with respect to the support bracket 12c having the support plate 40 provided thereon, the tilt-locking eccentric cam 23a (23b) tends to turn about the support shaft 47 in the direction illustrated with the arrow in FIG. 16 (A), based on the interlocking between the curved edge 53 and both of the tilt-locking serrated section 54.

For this reason, a portion of the tilt-locking serrated section 54 which is interlocking with the curved edge 53, tends to move to the upper side of this tilt-locking serrated section 54, that is, it tends to move to the portion in which the distance from the center of the support shaft section 47 is long. As a result, as shown in FIG. 16 (B), the depth of interlocking of the tilt-locking serrated section 54 with respect to the curved edge 53 gradually becomes greater. Since large resistance acts with respect to the depth of interlocking becoming greater in this way, it is possible to suppress upward displacement of the steering wheel 1. If the level of impact load in a secondary collision is high and the turning amount of the tilt-locking eccentric cam 23a (23b) is high, the stopper 55 for preventing overturning at the time of a collision is butted against the curved edge 53, and the tilt-locking eccentric cam 23a (23b) will not turn any further. In this state, the force of suppressing upward displacement of the steering wheel 1 becomes sufficiently large, and the steering wheel 1 will not be displaced upward any further. The material of the tilt-locking eccentric cam 23a (23b) is harder than that of the rear section element 28, and therefore, this type of interlocking is performed reliably.

Figure 17:
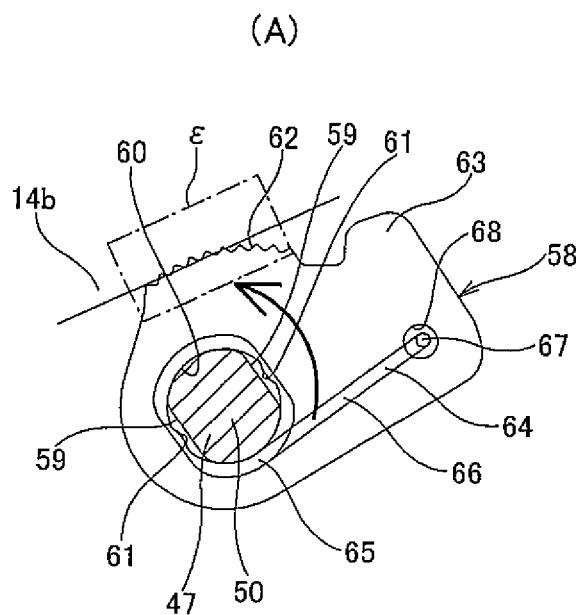
FIG. 17 includes an enlarged view (A) of a section γ of FIG. 9 and an enlarged view (B) of a section ε of (A) for describing the movement of the telescoping locking eccentric cam at the time of a secondary collision.
Figure 17:
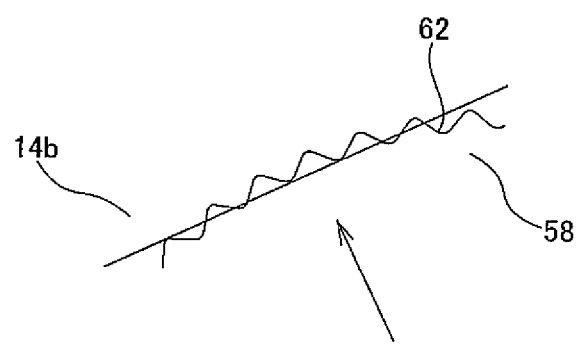

Moreover, when the inner column 14b tends to be displaced forward, a portion of the telescoping locking serrated section 62 which is interlocking with the lower surface of the inner column 14b, tends to move to the rear side of this telescoping locking serrated section 62, that is, it tends to move to the portion in which the distance from the center of the support shaft section 47 is long. As a result, as shown in FIG. 17 (B), the depth of interlocking of the telescoping locking serrated section 62 with respect to the lower surface of the inner column 14b gradually becomes greater. Since large resistance acts with respect to the depth of interlocking becoming greater in this way, it is possible to suppress forward displacement of the steering wheel 1. If the level of impact load in a secondary collision is high and the turning amount of the telescoping locking eccentric cam 58 is high, the stopper 63 for preventing overturning at the time of a collision is butted against the lower surface of the inner column 14b, and the telescoping locking eccentric cam 58 will not turn any further. In this state, the force of suppressing forward displacement of the steering wheel 1 becomes sufficiently large, and the steering wheel 1 will not be displaced forward any further. The material of the telescoping locking eccentric cam 58 is harder than that of the inner column 14b, and therefore, this type of interlocking is performed reliably.

As a result, a large force acts to prevent forward-upward displacement of the steering wheel 1, and it is possible to effectively prevent the position of this steering wheel 1 from being displaced. At this time, the force required for interlocking the tilt-locking serrated section 54 of the tilt-locking ride arc edge with the curved edge 53, and the force required for interlocking the telescoping locking serrated section 62 of the telescoping locking convex arc edge with the lower surface of the inner column 14b, are respectively small in the initial stage and gradually become greater. This type of characteristic is preferable in terms of protecting the driver by absorbing impact energy transmitted from the steering wheel 1 to the inner column 14b and the outer column 13b. That is to say, it is advantageous from the viewpoint that; while suppressing an impact applied to the body of the driver to a low level at the moment of secondary collision occurrence, the force of supporting the body of this driver can be gradually increased, and the level of freedom in tuning for enhanced driver protection can be ensured.

As described above, the magnitude of the force which acts in the direction of stopping the movement of the steering wheel 1 in the initial step of a secondary collision can be adjusted based on the degree of changes in the diameter of the respective tilt-locking serrated section 54 and telescoping locking serrated section 62. This point is described with reference to FIG. 18, taking an example of the telescoping locking serrated section 62. In this FIG. 18 (A), the broken line arc κ passes the tooth top of the small diameter side end section of the telescoping locking serrated section 62, taking the center $O_{47}$ of the support shaft 47 as the center thereof. Moreover, the chain line arc λ which passes all of the tooth tops of the telescoping locking serrated section 62 takes the point $O_{62}$ as the center thereof. The distance C between the broken line are κ and the change line arc λ in the state where the telescoping locking eccentric cam 58 is turned only by $\theta_a$ in the counterclockwise direction in FIG. 18 (A) in response to a secondary collision, can be arbitrarily adjusted based on the eccentricity amount of between both of the centers $O_{47}$ and $O_{62}$, and the difference in the diameter between both of the arcs κ and λ. Moreover, the turning amount $\theta_b$ from the moment of the start of the secondary collision to the moment at which the stopper 63 for preventing overturning at the time of a collision is butted against the lower surface of the inner column 14b and the telescoping locking eccentric cam 58 is not turned any further, can be arbitrarily adjusted based on the dimension and shape of the stopper 63 for preventing overturning at the time of a collision.

For example, the solid line in FIG. 18 (B) shows a relationship, in a state where a standard distance C and a turning amount $\theta_b$ is set, between the forward displacement amount (movement amount) X of the inner column 14b in response to a secondary collision, and the resistance (retaining force) F with respect to this forward displacement of the inner column 14b. The retaining force in the initial step is obtained by friction between the inner side surface of both of the support plates 40 and the outer side surface of the clamped section 35, which occurs in response to tightening of the adjustment lever 18a. The retaining force on the right side to the first bending point, which is the next step, is obtained by, in addition to this friction, resistance against the progress of interlocking between the telescoping locking serrated section 62 and the lower surface of the inner column 14b. The degree of this type of increase in the retaining force on the next step can be adjusted based on the relationship between the rotation angle $\theta_a$ and the distance C. The retaining force on the right side to the second bending point, which is the further next step, is obtained by, in addition to the above friction, resistance with respect to the telescoping locking serrated section 62 interlocked with the lower surface of the inner column 14b, shaving off the surface layer portion of this inner column 14b. The position of the second bending point can be adjusted based on the turning amount $\theta_b$.

In any case, the retaining force increases as described above, and if it exceeds the supporting force (breakaway load) of the rear section element 28 with respect to the front section element 27, this rear section element 28 starts to be displaced forward together with the outer column 13b regardless of the interlocking between the telescoping locking serrated section 62 and the lower surface of the inner column 14b. At this time, the energy absorbing member spanning between the front section element 27 and the outer column 13b is extended. Alternatively, while increasing the widthwise dimension of the intermediate section to the front end section of both of long holes 32 by both end sections of the pivot shaft 11a, the outer column 13b is displaced forward together with this pivot shaft 11a. In any case, the steering wheel 1 is displaced forward while mitigating the impact energy applied to the body of the driver collided with the steering wheel 1.

In the present invention, as opposed to the illustrated example, the telescoping locking eccentric cam may be fixed on the intermediate section of the support shaft, and the pair of tilt-locking eccentric cams may be supported on both of the end sections of this support shaft so as to be capable of swing displacement with respect to this support shaft. In this case, a rotational force transmission spring serving as the second spring is spanned between the adjustment lever and the telescoping locking eccentric Cain, and a tilt-locking biasing spring serving as the first spring is provided between both of the tilt-locking eccentric cams and the support shaft.

Moreover, as for the structure for adjusting the up/down position and front/rear position of the steering wheel, it is not limited to the structure illustrated in the diagram, and various types of conventionally known structures may be employed therefor. Furthermore, in a case where the outer column is arranged on the rear side and the inner column is arranged on the front side, the telescoping locking serrated section may be engaged with part of the outer circumferential surface of the outer column.

Second Example of Embodiment

Figure 20:
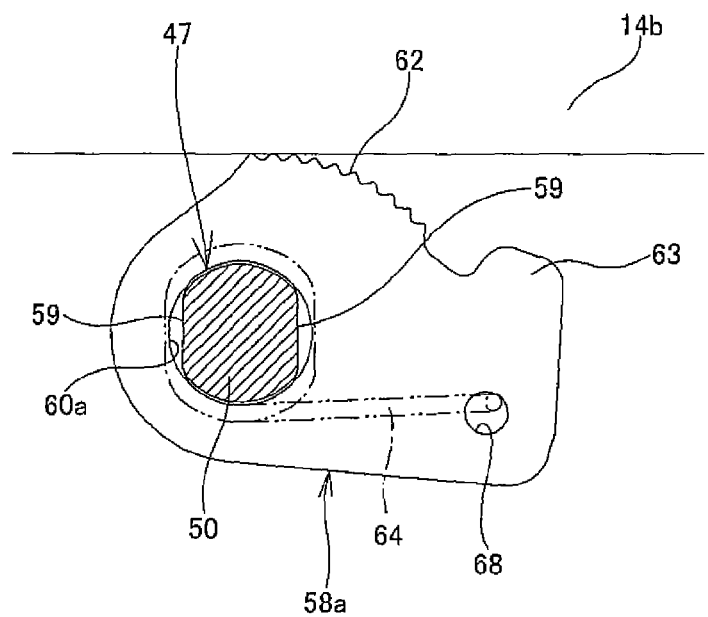
FIG. 20 is a diagram similar to FIG. 11, showing a second example of the embodiment of the present invention.

FIG. 20 shows a second example of the embodiment of the present invention. In the case of the present example, a circular attachment hole 60a provided in the base section of a telescoping locking eccentric cam 58a is rotatably engaged with the support shaft 47. A telescoping locking biasing spring 64 serving as a first spring restricts the turning amount of the telescoping locking eccentric cam 58a with respect to the support shaft 47. That is to say, in the state where the adjustment lever 18a is turned downward in order to perform a position adjustment of the steering wheel 1, the telescoping locking biasing spring 64 separates the telescoping locking serrated section 62 of the telescoping locking eccentric cam 58a from the lower surface of the inner column 14b.

In this type of structure of the present example, only the telescoping locking biasing spring 64 restricts the turning amount of the telescoping locking eccentric cam 58a with respect to the support shaft 47. Therefore, in order to reliably engage or disengage the telescoping locking serrated section 62 with or from the lower surface of the inner column 14b, it is necessary to ensure precision (shape precision and elastic deformation amount) of the telescoping locking biasing spring 64. However, as long as this precision is ensured, the operation of inserting the support shaft 47 into the attachment hole 60a becomes easy, and it is therefore possible to achieve cost reduction by improving the level of assemblability. The structure and operation of other portions are similar to those of the first example of the embodiment, and illustration and description of the similar portions are therefore omitted.

Third Example of Embodiment

Figure 21:
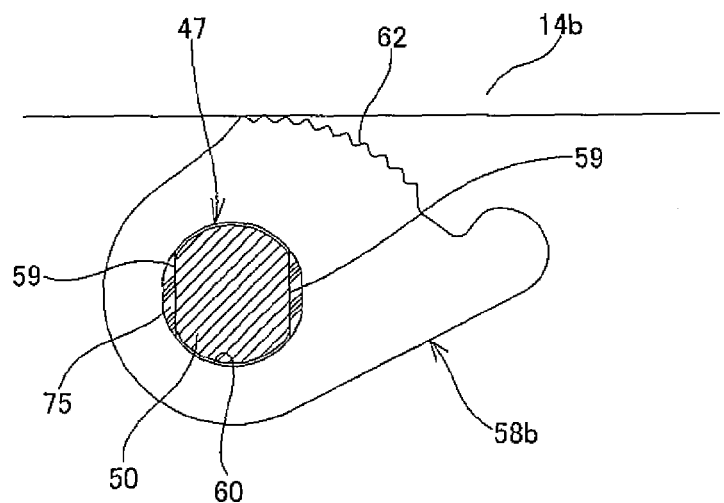
FIG. 21 is a diagram similar to FIG. 11, showing a third example of the embodiment of the present invention.

FIG. 21 shows a third example of the embodiment of the present invention. In the case of the present example, an elastic material 75 composed of rubber, elastomer, or the like intervenes between the inner circumferential surface of the attachment hole 60 provided in the base section of a telescoping locking eccentric cam 58b, and the outer circumferential surface of the support shaft 47, instead of the telescoping locking biasing spring 64 serving as the first spring. Both of these circumferential surfaces are of a cross-sectional oval shape having flat surfaces parallel with each other, and the telescoping locking eccentric cam 58b can be swing-displaced only by a predetermined angle with respect to the support shaft 47, while elastically deforming a portion of the elastic material 75 present between the flat surfaces parallel with each other. This type of structure of the present example is such that not only the telescoping locking biasing spring 64 can be omitted, but also a portion which engages with the end section of this telescoping locking biasing spring 64 does not need to be provided on the end section of the telescoping locking eccentric cam 58b. As a result, it is possible to reduce the size, weight, and cost of the position adjustment device for a steering wheel. Furthermore, the cross-sectional shape of the circumferential surface of any one of both of the circumferential surfaces may be a circular shape, and this circumferential surface and the elastic material 75 may be adhered to each other by means of baking or the like. The structure and operation of other portions are similar to those of the first example of the embodiment, and illustration and description of the similar portions are therefore omitted.

Fourth Example of Embodiment

Figure 22:
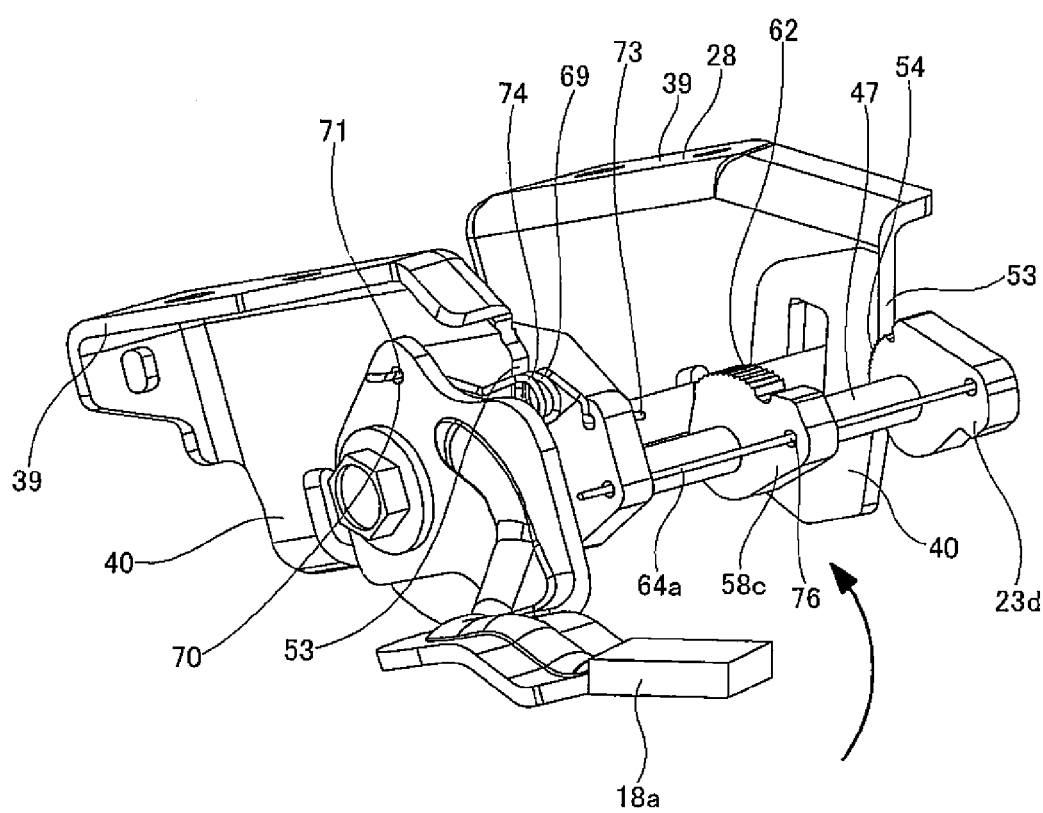
FIG. 22 shows a fourth example of the embodiment of the present invention being a perspective view showing a state seen from the oblique rear side of some components without other components.
Figure 23:
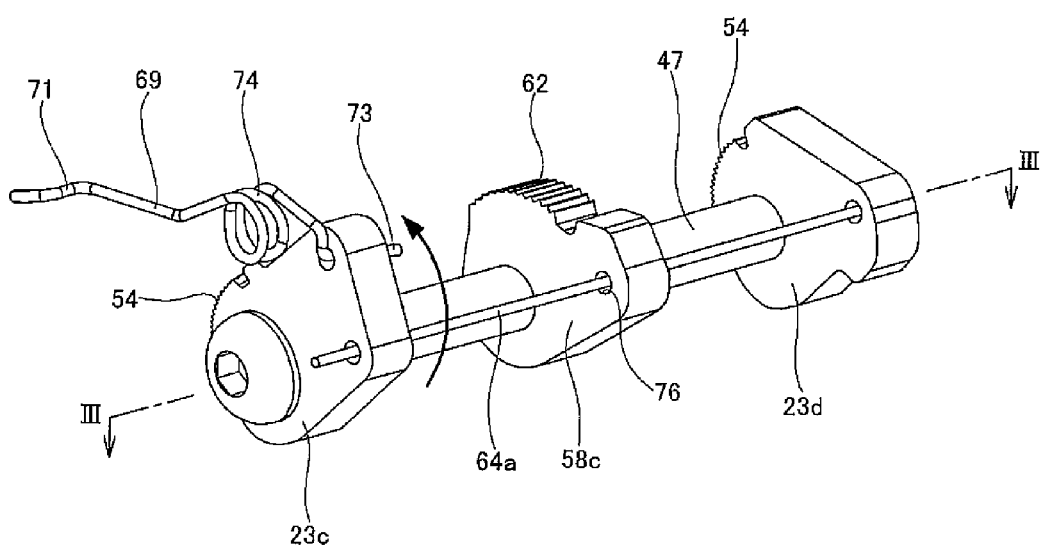
FIG. 23 is a perspective view showing some components drawn from the components showing in FIG. 22, seen from the same direction as FIG. 22.
Figure 24:
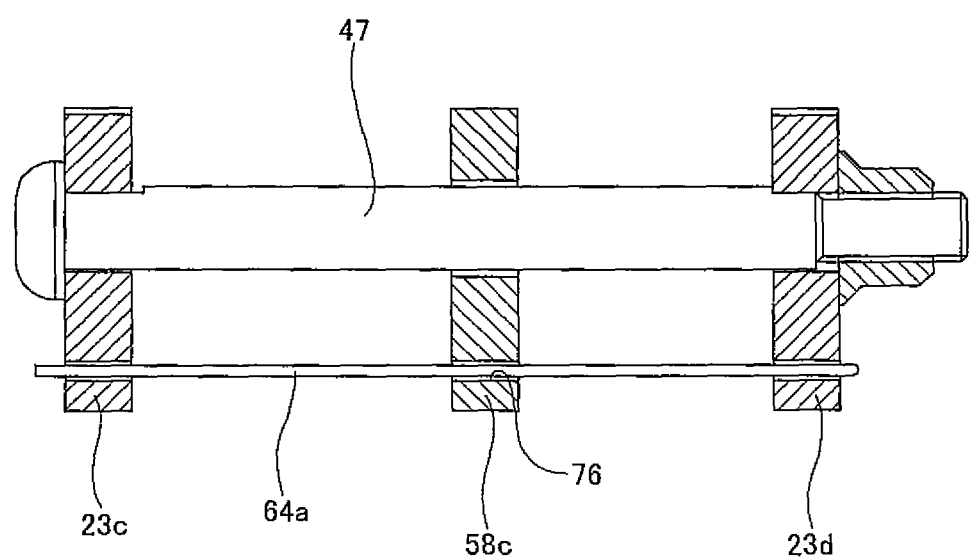
FIG. 24 is a cross-sectional view of FIG. 23.

FIGS. 22 to 24 show a fourth example of the embodiment of the present invention. In the case of the present example, a telescoping locking biasing spring 64a serving as the first spring is spanned between the tip end sections of tilt-locking eccentric cams 23c and 23d externally fitted on both end sections of the support shaft 47. This telescoping locking biasing spring 64a is a spring steel-made linear wire rod, and the intermediate section thereof is inserted into a small through hole 76 formed in the tip end section of a telescoping locking eccentric cam 58c. In a state where the support shaft 47 is swung in a direction of the arrow in FIG. 22 and FIG. 23 as the adjustment lever 18a is turned upward in order to fix the position of the steering wheel 1, this type of telescoping locking biasing spring 64a is bent in a curvature direction to thereby press the telescoping locking serrated section 62 provided on the telescoping locking eccentric cam 58c against the lower surface of the inner column 14b. That is to say, in the case of the present example, the telescoping locking biasing spring 64a is provided, via both of the tilt-locking eccentric cams 23c and 23d, between the telescoping locking eccentric cam 58c and the support shaft 47. The structure and operation of other portions are similar to those of the first example of the embodiment described above, and illustration and description of the similar portions are therefore omitted.

Fifth Example of Embodiment

Figure 25:
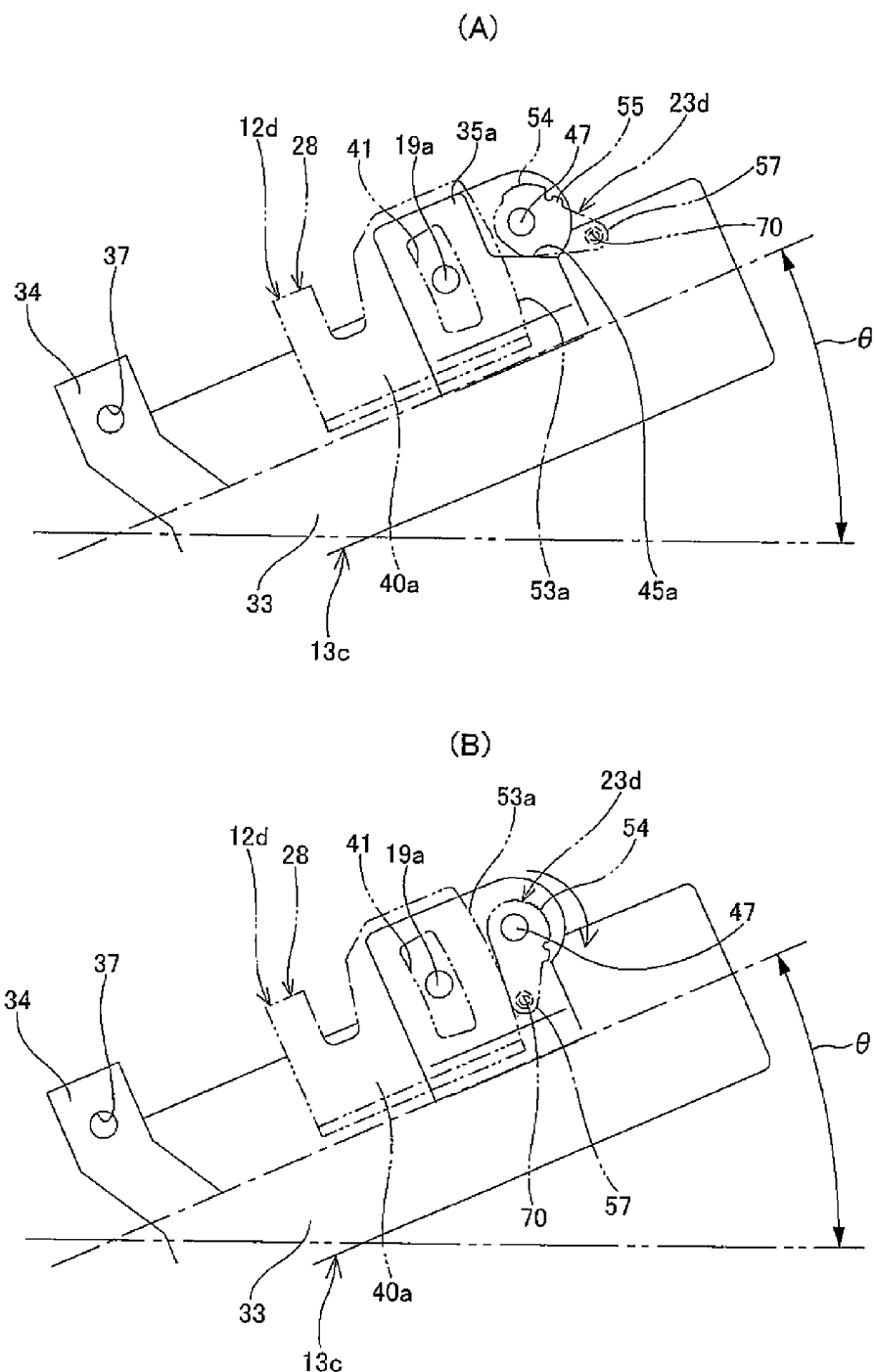
FIG. 25 includes side views for respectively describing a fifth example (A) of the embodiment of the present invention, and a problem (B) which occurs in the case where the present invention is not applied.

FIG. 25 (A) shows a fifth example of the embodiment of the present invention. In the case of the present example, a clamped section 35a is provided on the upper surface of an outer column 13c, and respective members, including the rod-shaped member 19a and the support shaft 47, for controlling whether or not a position adjustment of the steering wheel 1 can be made, are arranged above the outer column 13c. This type of structure is effective from the viewpoint that the portion largely projecting downward from part of this outer column 13c is eliminated to thereby protect the knee part of the driver in the event of a collision accident. However, in this type of structure, as shown in FIG. 25 (B), in the state where the adjustment lever 18a is turned downward in order to perform a position adjustment of the steering wheel 1, the tilt-locking eccentric cam 23d, due to its own weight, is likely to come in contact with a curved edge 53a of a support plate 40a of a support bracket 12d, depending on the angle θ of assembly to the vehicle and the arrangement of the tilt-locking eccentric cam 23d. Consequently, in the case of the structure of the present example, a portion in which the base section of the tilt-locking eccentric cam 23d is pivoted on both left and right side surfaces of the clamped section 35a, is indented in the widthwise direction, and below this portion, there is provided a step surface 45a which functions as a stopper section. In the state where the adjustment lever 18a is turned downward, the downward turning amount of the tilt-locking eccentric cam 23d is limited based on the engagement with the step surface 45a, to thereby prevent this tilt-locking eccentric cam 23d from coming in contact with the curved edge 53a. The configuration and operation of other portions are similar to those of the first example of the embodiment except that the direction of displacement of each section is restricted in accordance with the above respective members being arranged above the outer column 13c, and therefore, illustration and description of the similar portions are omitted.

Sixth Example of Embodiment

Figure 26:
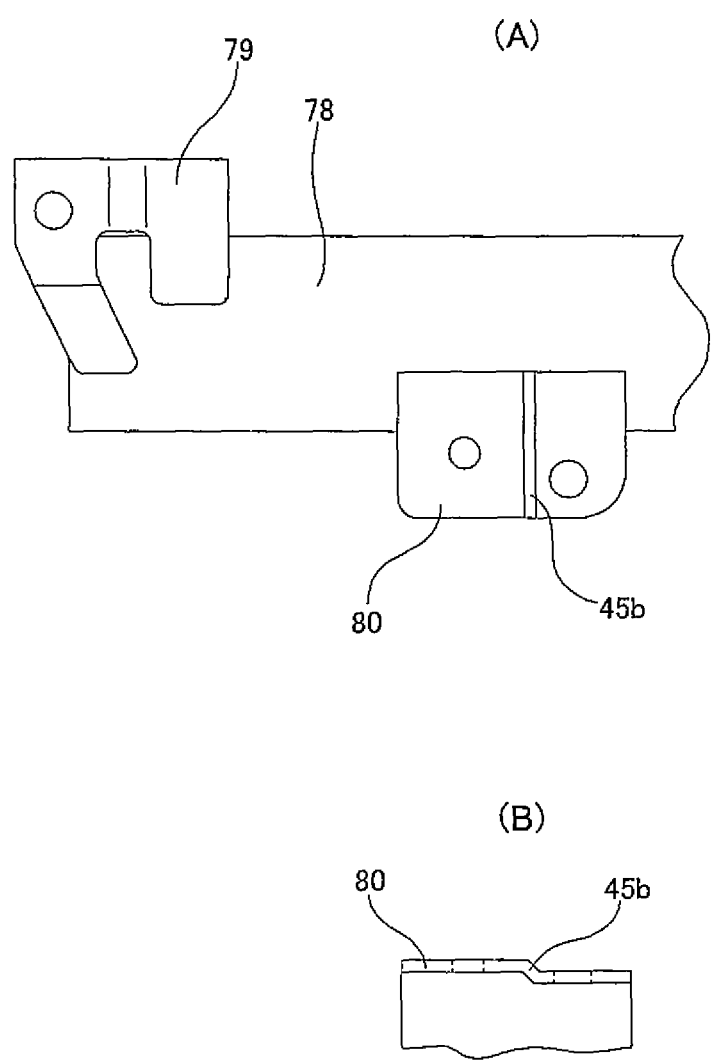
FIG. 26 includes a side view (A) and a partial view (B) seen from the underside of (A), showing a sixth example of the embodiment of the present invention.

FIG. 26 shows a sixth example of the embodiment of the present invention. Whereas the outer columns 13b and 13c are fabricated by casting a light alloy material in both of the first example of the embodiment and the fifth example of the embodiment, in the case of the present example, it is fabricated by fastening by means of welding, soldering, or the like, components made by bend-forming a metallic plate such as a steel plate or an aluminum alloy plate to each other. That is to say, a cylindrical steering column main body 78, a pivot bracket 79, which serves as a pivoted section, and a lifting and lowering bracket 80, which serves as a clamped section, are all fabricated by bend-forming a metallic plate. A pivot bracket 79 is join-fixed on the upper surface of a front end section of the steering column main body 78, and the lifting and lowering bracket 80 is join-fixed on the lower surface of an intermediate section of the same. At the same time, a step surface 45b which serves as a stopper section for regulating turning of the tilt-locking eccentric can 23d when making a position adjustment of the steering wheel 1, is fabricated by bend-forming the metallic plate constituting the lifting and lowering bracket 80 in a cross-sectionally crank shape. The structure of the present example is intend to be practiced in a structure which has only a tilt function and does not have a telescoping function. However, it may be provided with a telescoping function by making the diameter of a part of the steering column main body 78 increasable and reducable. The structure and operation of other portions are similar to those of the fifth example of the embodiment, and illustration and description of the similar portions are therefore omitted.

Seventh Example of Embodiment

Figure 27:
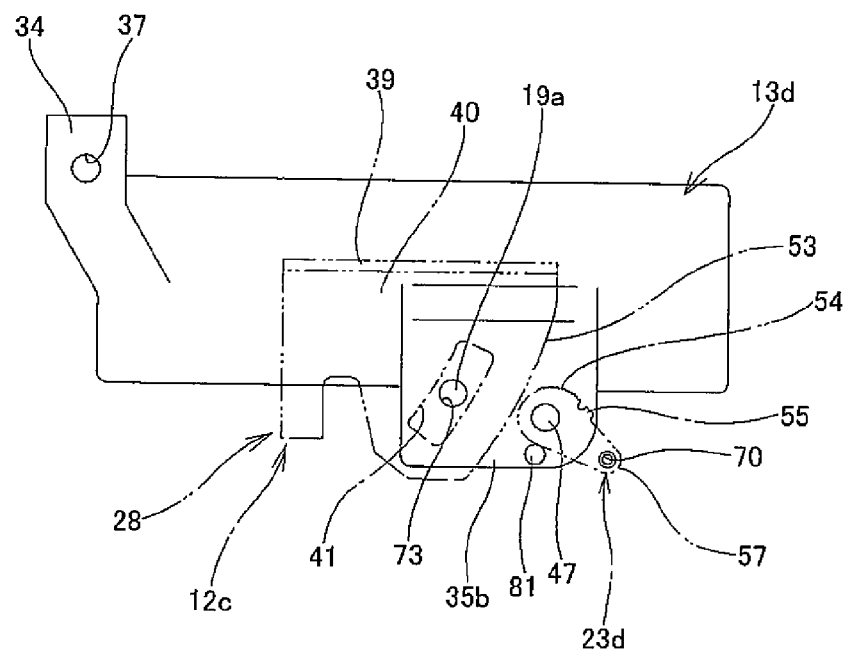
FIG. 27 is a side view showing a seventh example of the embodiment of the present invention.

FIG. 27 shows a seventh example of the embodiment of the present invention. In the case of the present example, a projection section 81 is provided on both side surfaces of a clamped section 35b of an outer column 13d, so as to serve as a stopper section which restricts turning of the tilt-locking eccentric cam 23c when performing a position adjustment of the steering wheel 1. The projection section 81 may be integrally formed with this outer column 13d when casting the outer column 13d, and in addition, it may also be formed by driving in a pin or screwing it in afterwards. Moreover, the projection section 81 may be of a shape such as hemispherical shape or a truncated cone shape in addition to a columnar shape, as long as it is capable of restricting turning of the tilt-locking eccentric cam 23d by its engagement therewith. The structure and operation of other portions are similar to those of the fifth example of the embodiment, and illustration and description of the similar portions are therefore omitted.

Eighth Example of Embodiment

FIGS. 29 to 32 show an eighth example of the embodiment of the present invention. A telescopic steering device of the present example is, in addition to a telescopic mechanism for adjusting the front/rear position of the steering wheel 1 (refer to FIG. 33), provided with a tilt mechanism for adjusting the up/down position.

Figure 33:
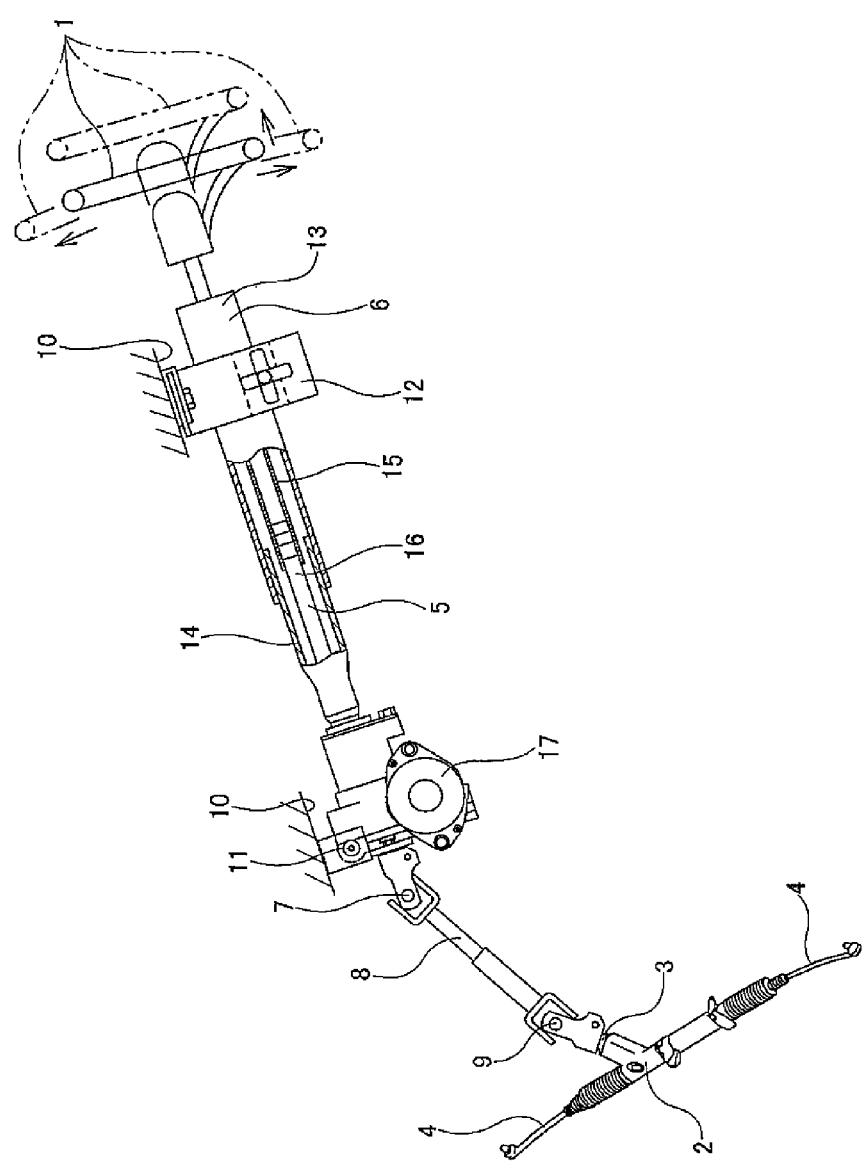
FIG. 33 is a partial cutaway side view showing an example of a steering device for a motor vehicle with the position adjustment device for a steering wheel incorporated therein.
Figure 34:
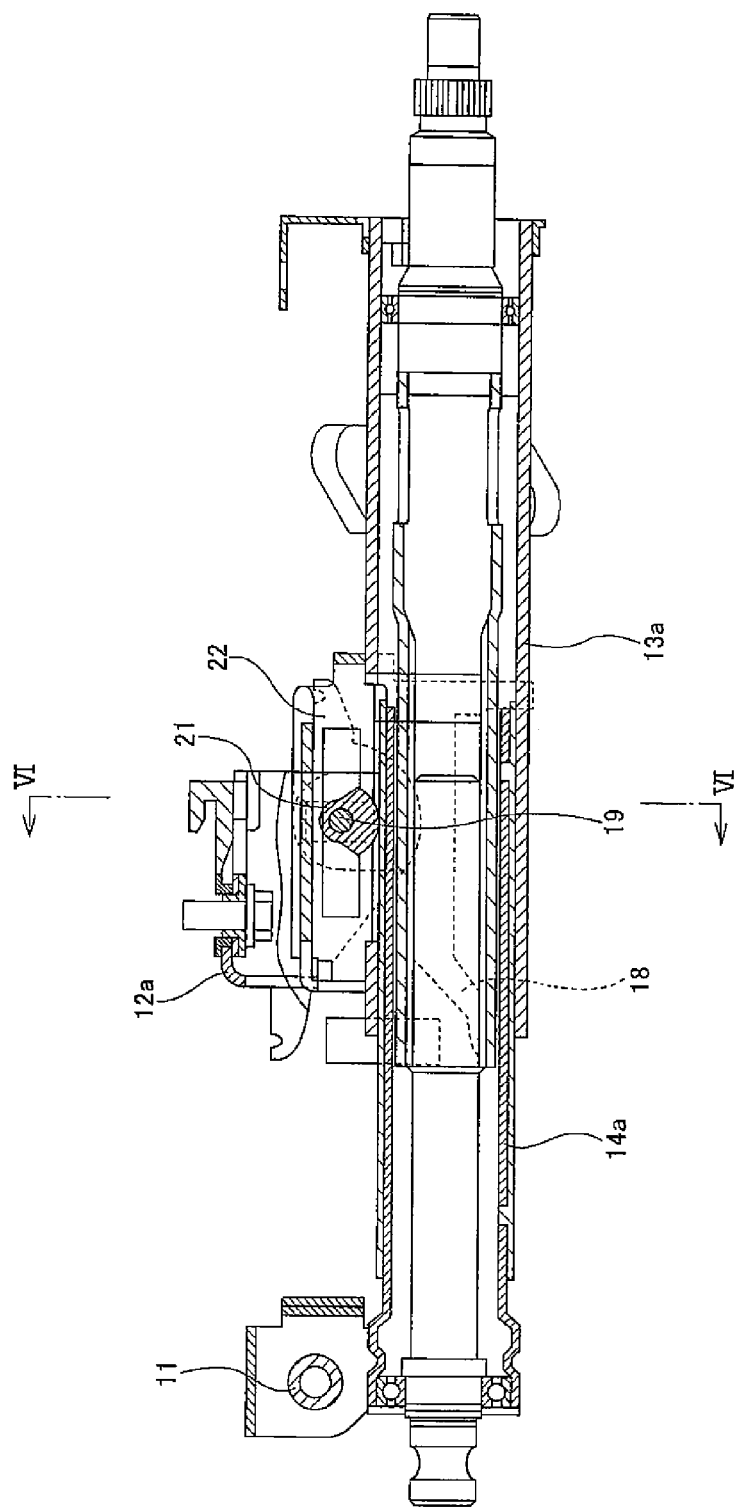
FIG. 34 is a longitudinal sectional side view showing an example of a conventionally known position adjustment device for a steering wheel.

In the case of the present example, in order to configure the telescopic mechanism, in the inner diameter side of an outer column 13e, which is generally referred to as the housing section, there is inserted a rear half section of an inner column 14c capable of extending and retracting itself, so as to be capable of displacement in the axial direction (diagonally front/rear direction). This inner column 14c is such that a rear end section of a cylindrical front half element 83 having a comparatively small diameter, and a front end section of a cylindrical rear half element 84 having a comparatively large diameter are fitted together in a telescopic shape so as to be capable of displacement in the axial direction, and it is thus capable of extension and retraction. A pivot bracket 79a is fixed on a front end section of this type of inner column 14c, and this pivot bracket 79a is supported on the vehicle body so as to be capable of swing displacement about the pivot shaft 11 arranged in the widthwise direction (refer to FIGS. 33 and 34). Further, the height position of the steering wheel 1 can be adjusted based on this swing displacement. That is to say, in the case of the present example, a telescopic mechanism, and a so-called swing tilt mechanism in which swing motion is performed about the front end section of an entire steering column, are combined.

Figure 31:
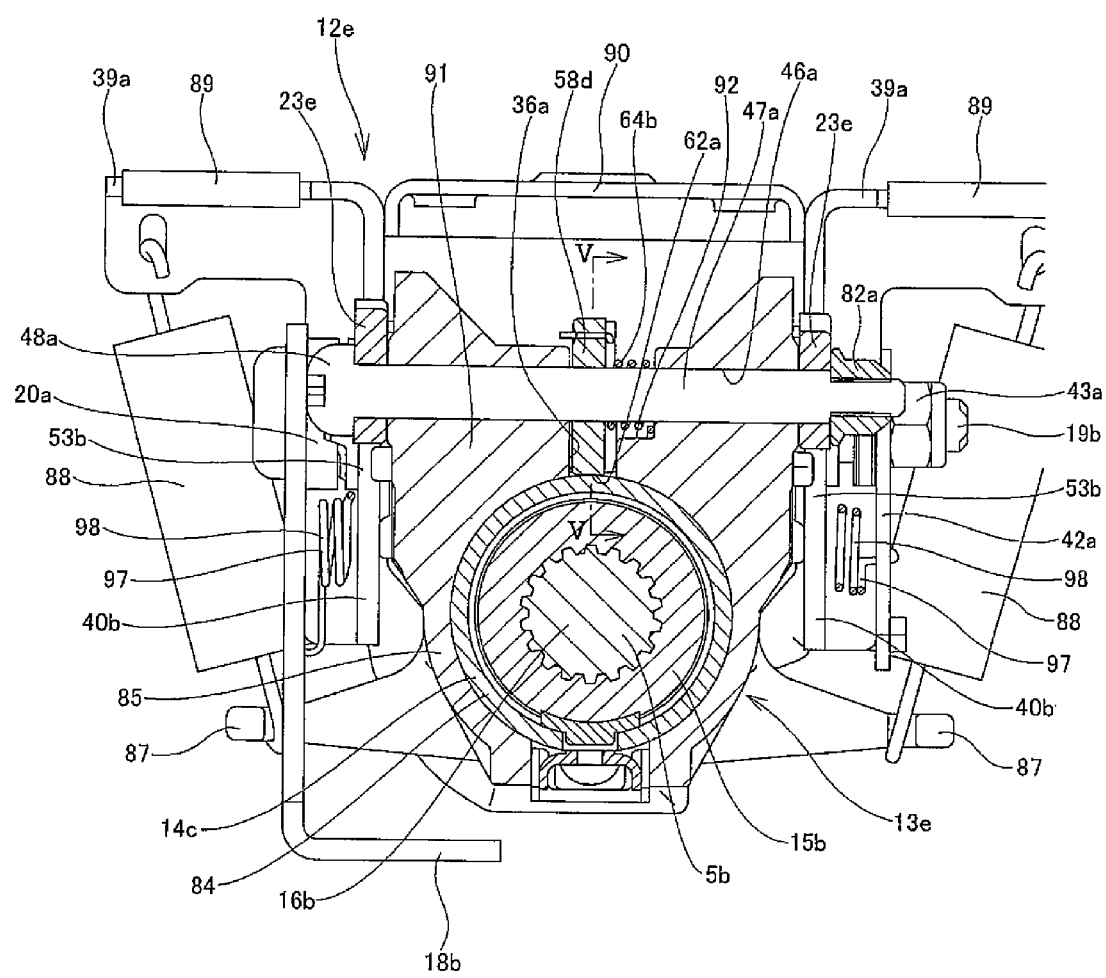
FIG. 31 is a IV-IV cross-sectional view of FIG. 28.

In order to configure the telescopic mechanism, the inner column 14c is made capable of extension and retraction, and in addition to this, a steering shaft 5b rotatably supported inside this inner column 14c is made capable of extension and retraction, thereby enabling adjustment of the front/rear position of the steering wheel 1. As with the structure of FIG. 33, the steering shaft 5b combines an outer shaft 15b and an inner shaft 16b as shown in FIG. 31 so as to be capable of torque transmission, extension and retraction, and with a combination of a single row deep groove type ball bearing and a needle bearing or the like, it is supported on the inner diameter side of the inner column 14c so as to be only rotatable. In this state, the steering wheel 1 can be freely fixed at a portion which projects from a rear end opening of the inner column 14c at the rear end section of the outer shaft 15b constituting the steering shaft 5b.

On the other hand, the outer column 13e is fabricated by casting a light metallic material such as aluminum alloy, and it is provided with a main section 85, a clamped section 86, and a pair of left and right engagement arm sections 87. Among these, the main section 85 is such that in the upper end section thereof there is provided, from the rear end section to the intermediate section in the axial direction, a slit-shaped noncontiguous section 36a, and thereby the portion excluding the front end section is formed in a segmental cylinder shape. Therefore, the inner diameter of at least the rear end side portion of the main section 85 can be elastically increased and reduced. Furthermore, the clamped section 86 is provided on the upper surface of the intermediate section of the main section 85 so as to sandwich the noncontiguous section 36a from both left and right sides and project upward. Further, both of the left and right outer side surfaces of the clamped section 86 are virtually parallel with each other, and the distance between both of these outer side surfaces is greater than the outer diameter of the main section 85. Furthermore, both of the engagement arm sections 87 are provided to be engaged with the lower end section of a tension spring 88 which is spanned between this engagement arm sections 87 and a support bracket 12e described next. Also in the present example, the noncontiguous section may be configured a closed slit formed from the vicinity of the rear end section of the main section of the outer column in the axial direction.

The outer column 13e described above is supported on the supported bracket 12e supported on the vehicle body, so as to be capable of ascending and descending. This support bracket 12e is made of a metallic plate such as a steel plate having a sufficient level of strength and rigidity, and it is provided with a pair of left and right attachment plate sections 39a and a pair of left and right support plates 40b. The support bracket 12e is such that the attachment plate sections 39a thereof are supported on the vehicle body respectively by a slide plate 89 and a bolt not shown in the diagram, so as to be capable of forward separation based on a large impact load applied in the event of a secondary collision. Moreover, both of the support plates 40b are bent at a right angle downward from both of the attachment plate sections 39a, and are parallel with each other. Further, at a position where they are aligned with each other, there is provided a long hole 41a serving as a vehicle side through hole, which is long in the direction of an arc (diagonally upward-downward direction) about the pivot shaft pivoting the pivot bracket 79a. In the example illustrated in the diagram, a joining plate 90 is weld-fixed on the upper end section of both of the support plates 40b, to join and fix the pair of left and right attachment plate sections 39a and the pair of left and right support plates 40b.

The outer column 13e is supported between both of the support plates 40b constituting the support bracket 12e described above, so as to be capable of ascending and descending. Therefore, in the state where the clamped section 86 is arranged between both of these support plates 40b, a rod-shaped member 19b is inserted through both of the long holes 41a, and through a through hole 77a serving as a column side through hole, which is provided in a state of passing through this clamped section 86 in the left-right direction. This rod-shaped member 19b is to increase and reduce the distance between the mutually opposing surfaces of both of the support plates 40b in response to rotation, and both of the end sections thereof project from the outer side surface of both of these support plates 40b. The base section of the adjustment lever 18b is joined and fixed on the base end section of the rod-shaped member 19b (left end section in FIGS. 28 to 30), and the outer side surface of the base section of a presser plate 42a externally fitted on the tip end section (right end section in FIGS. 28 to 30) is pressed with a nut 43a in a state of preventing rotation with respect to the rod-shaped member 19b, to thereby prevent this presser plate 42a from falling off.

Furthermore, a cam device 20a is provided between the inner side surface of the base end section of the adjustment lever 18b and the outer side surface of one (left side in FIGS. 28 to 30) of the support plates 40b, so as to be capable of increasing and reducing the distance between both of the side surfaces in response to rotation of the adjustment lever 18b. When performing a position adjustment of the steering wheel 1, the adjustment lever 18b is turned downward (clockwise direction in FIGS. 28 to 30, and 32) to thereby reduce the distance between the inner side surface of the base end section of the adjustment lever 18b and the outer side surface of the one support plate 40b. Consequently, the distance between the inner side surfaces of the pair of support plates 40b is elastically increased, and the surface pressure of the contact section between the inner side surface of both of these support plates 40b and the outer side surface of the clamped section 86 of the outer column 13e is lowered or lost. At the same time, the inner diameter of the outer column 13e is elastically increased, and contact pressure between the inner circumferential surface of this outer column 13e and the outer circumferential surface of the rear half element 84 of the inner column 14c is reduced, thereby enabling displacement of this rear half element 84 in the front/rear direction. As a result, an adjustment of the up/down position and front/rear position of the steering wheel 1 becomes possible.

In this state, both of the tension springs 88 spanned between the support bracket 12e and both of the engagement arm sections 87 support all or part of the weight of the portion which is raised or lowered together with the steering wheel 1. Therefore, there is no need for supporting this weight using the hands when adjusting the up/down position of this steering wheel 1, and this adjustment operation can be easily performed. Having adjusted the position, if the adjustment lever 18b is turned upward (in the counterclockwise direction in FIGS. 28 to 30, and 32), then instead of the distance being increased between the inner side surface of the base end section of this adjustment lever 18b and the outer side surface of one of the attachment plate sections 39a, the distance between the inner side surfaces of both of the support plates 40b is reduced. Accordingly, surface pressure of the contact section between the inner side surface of both of these support plates 40b and the outer side surface of the clamped section 86 becomes greater, and the steering wheel 1 is supported at a post-adjustment position. Moreover, in order to increase or reduce the above distance, it is sufficient that a pair of cam members which constitute the cam device 20a are relatively displaced from each other in the rotation direction. The rod-shaped member 19b may rotate together with the adjustment lever 18b. However, it does not always have to rotate, and it may only be axially displaced without rotating.

Figure 30:
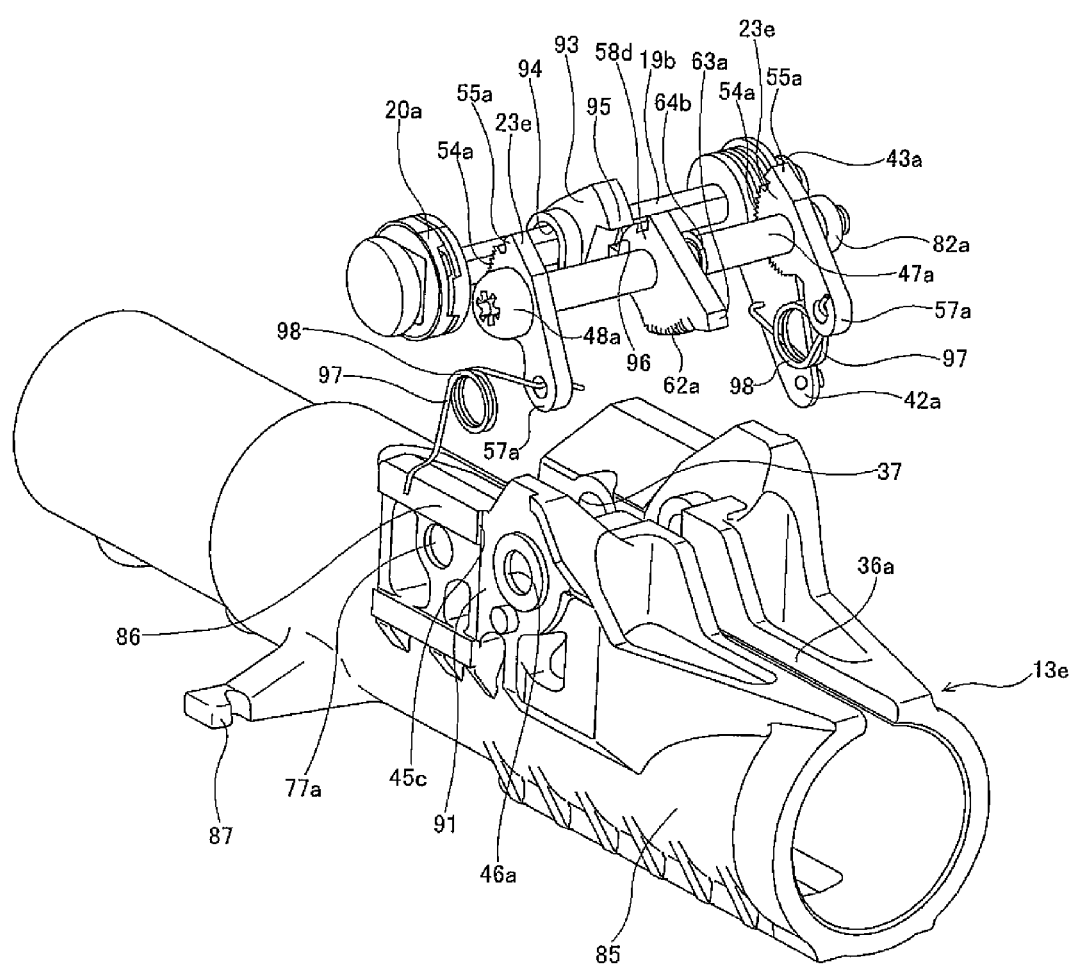
FIG. 30 is an exploded perspective view showing some components of the eighth example without other components.

Furthermore, in the case of the structure of the present example, a projection portion 91 which projects upward as with the clamped section 86, is provided also in a portion which projects backward from both of the support plates 40b at the rear side section of the outer column 13e. As with the clamped section 86, this projection portion 91 is also provided in a state of sandwiching the noncontiguous section 36a from both of the left and right sides. Moreover, the widthwise dimension of the projection portion 91 is made slightly smaller than that of the clamped section 86, and between these projection portion 91 and the clamped section 86, a step surface 45c facing the rear side as shown in FIG. 30 is provided on each of both left and right side surfaces of the outer column 13e.

Moreover, a support shaft 47a is inserted through a through hole 46a formed in a state of passing through the above-described projection portion 91 in the widthwise direction. This support shaft 47a is arranged parallel with the rod-shaped member 19b, and it has a head section 48a provided on the base end section thereof (left end section in FIGS. 28 to 30), and a nut 82a screwed on a male screw section provided on the tip end section thereof (right end section in FIGS. 28 to 30). Furthermore, a telescoping locking eccentric cam 58d is externally fitted on a center section between these head section 48a and the nut 82a, and two tilt-locking eccentric cams 23e are externally fitted on both end sections, so as to be respectively capable of relative rotation with respect to the support shaft 47a.

Among the telescoping locking eccentric cam 58d and both of the tilt-locking eccentric cams 23e, the telescoping locking eccentric cam 58d provided in the center section slots into the noncontiguous section 36a of the outer column 13e and opposes to the upper surface of the inner column 14c. A portion of the outer periphery section of this type of telescoping locking eccentric cam 58d, which opposes to the outer circumferential surface of this inner column, is of a telescoping locking convex arc edge angled in a direction in which the distance from the center of the support shaft 47a increases with approach to the rear side. Moreover, a telescoping locking serrated section 62a is formed on this telescoping locking convex arc edge. Furthermore, in the case of the structure of the present example, in a portion of the outer periphery portion of the telescoping locking eccentric cam 58d, which departs backward from the large diameter side end section of the telescoping locking serrated section 62a, there is provided a stopper 63a for preventing overturning at the time of a collision, so as to sufficiently project backward from this portion. This type of telescoping locking eccentric cam 58d is fabricated with a metallic material, such as medium carbon steel, high carbon steel, carburized steel, and bearing steel, harder than the metallic material which constitutes the inner column 14c such as low carbon steel and aluminum based alloy.

Between the telescoping locking eccentric cam 58d and the outer column 13e described above, there is provided a telescoping locking biasing spring 64b, which is an elastic member. This telescoping locking biasing spring 64b is a torsion coil spring bend-formed with a spring steel wire rod, and in the state where the coil section is externally fitted on the support shaft 47a, one end thereof (upper end in FIG. 32) is engaged with part of the telescoping locking eccentric cam 58d, and the other end thereof is engaged with an engagement concave section 92. In this state, an elastic force in a direction of butting the telescoping locking serrated section 62a against the upper surface of the inner column 14c (clockwise direction in FIG. 32), is given to the telescoping locking eccentric cam 58d.

In the state of being opposed to this type of telescoping locking eccentric cam 58d, a lock release lever 93 is provided in the center section of the rod-shaped member 19b so as to rotate in synchronization with this rod-shaped member 19b. That is to say, a cross-sectionally noncircular (oval in the illustrated example) attachment hole 94 formed in the base end section of this lock release lever 93, and a non-columnar portion formed in the center section of the rod-shaped member 19b, are fitted together without allowing rattling preferably by means of an interference fitting. A tip end section 95 of this type of lock release lever 93 opposes to a catch-step surface 96 which is provided facing upward on the outer circumferential surface of the base section of the telescoping locking eccentric cam 58d.

Figure 32:
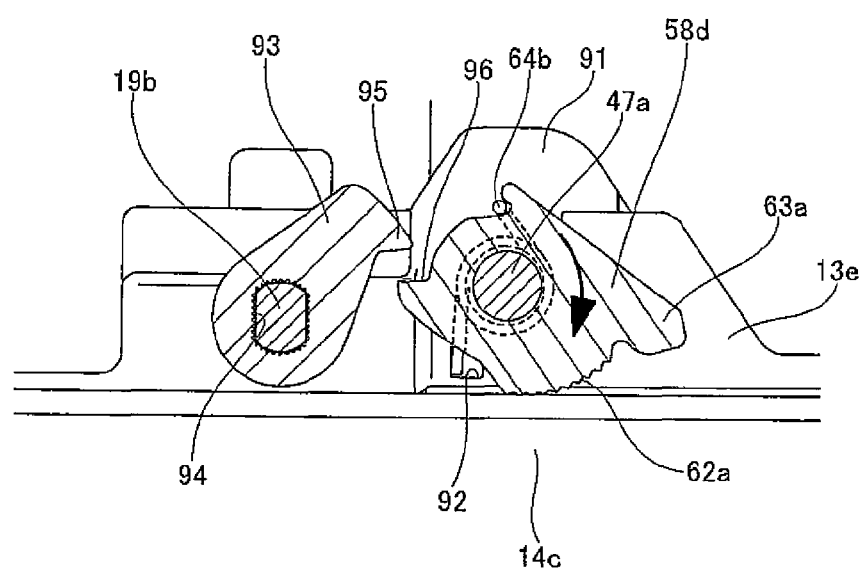
FIG. 32 includes V-V cross-sectional views of FIG. 31 respectively showing a state (A) where the position of the steering wheel is fixed, and a state (B) where a position adjustment is performed.
Figure 32:
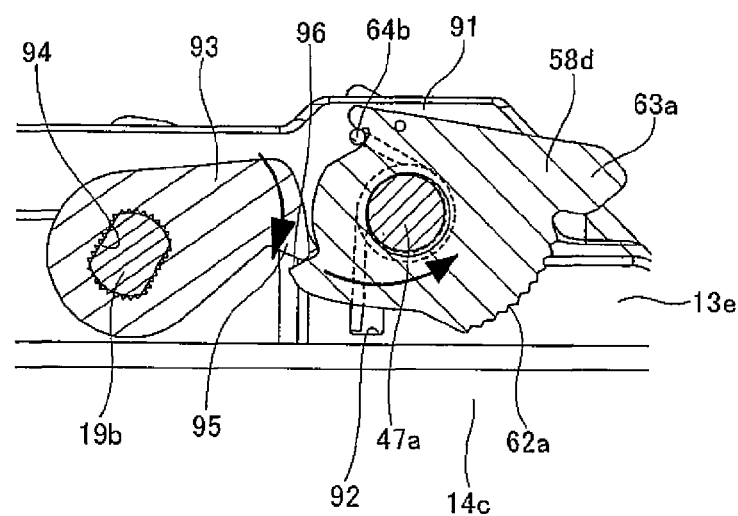

In the state where the adjustment lever 18b is turned downward and the rod-shaped member 19b is turned in the clockwise direction in FIG. 32 in order to enable a position adjustment of the steering wheel 1, the catch step surface 96 is pressed downward by the tip end section 95, to thereby turn the telescoping locking eccentric cam 58d against the elastic force of the telescoping locking biasing spring 64b in the counterclockwise direction of FIG. 32 as shown in FIG. 32 (A) to FIG. 32 (B). In the case of the present example, despite the structure in which the telescoping locking eccentric cam 58d is arranged above the outer column 13e, by providing this type of lock release lever 93, then in the state of performing a position adjustment of the steering wheel 1, the telescoping locking serrated section 62a and the upper surface of the inner column 14c are reliably separated as shown in FIG. 32 (B), and thereby an adjustment of the front/rear position of the steering wheel 1 can be smoothly performed.

Meanwhile, both of the tilt-locking eccentric cams 23e oppose to or come in contact with the rear end edge of both of the support plates 40b provided on the support bracket 12e (phases in the widthwise direction are aligned). The rear end edge of both of these support plates 40b is of a curved edge 53b in a shape of a convex arc about the pivot shaft 11 which pivots the pivot bracket 79a. Therefore, even in a case where the support shaft 47a is raised or lowered with respect to the support bracket 12e in response to an up/down position adjustment of the steering wheel 1, the distance between this support shaft 47a and both of the curved edges 53b will not change. Moreover, a portion of the outer periphery portion of both of the tilt-locking eccentric cams 23e, which opposes to both of the curved edges 53b is of a tilt-locking convex arc edge angled in a direction in which the distance from the center of the support shaft 47a increases, that is, the center thereof is biased forward-upward from the center of the support shaft 47a, with upward approach, in a positional relationship where the position of the steering wheel 1 is fixed. Moreover, a tilt-locking serrated section 54a is formed on this tilt-locking convex arc edge. Furthermore, in both of the tilt-locking eccentric cams 23e, a portion on the opposite side of the support shaft 47a to the tilt-locking convex arc edge, is extended radially outward, and it serves as a driven arm section 57a.

Furthermore, in the case of the structure of the present example, on an upper side portion of the tilt-locking serrated section 54a of the outer periphery portion of both of the tilt-locking eccentric cams 23e, there is provided a stopper 55a for preventing overturning at the time of a collision. The top section of this stopper 55a for preventing overturning at the time of a collision is present at an approximate tangential position of the outer diameter side end section of the tilt-locking convex arc edge. Both of the tilt-locking eccentric cams 23e respectively having this type of configuration are fabricated with a metallic material, such as medium carbon steel, high carbon steel, carburized steel, and bearing steel, harder than the metallic material which constitutes the support bracket 12e such as low carbon steel and aluminum based alloy.

Furthermore, between the adjustment lever 18b and the presser plate 42a, and both of the tilt-locking eccentric cams 23e, there are provided tilt-locking engagement and disengagement springs 97 respectively serving as a joining member for separating from each other the tilt-locking serrated section 54a and the curved edge 53b serving as the tilt-locking ridge edge. Further, they are capable of transmitting the movement of the rod-shaped member 19b which turns together with the adjustment lever 18b, to both of the tilt-locking eccentric cams 23e. In the case of the present example, both of the tilt-locking engagement and disengagement springs 97 are respectively configured by bend-forming a spring steel wire rod, and one end section thereof is engaged with the base end of the adjustment lever 18b or the tip end section of the presser plate 42a, and the other end section thereof is engaged with the tip end section of the driven arm section 57a of the tilt-locking eccentric cam 23e. Moreover, in the intermediate section thereof there is provided a coil section 98 for ensuring a flexible volume. The coil section 98 is provided to give an appropriate elastic force to both of the tilt-locking eccentric cams 23e regardless of manufacturing errors to a certain degree.

Figure 28:
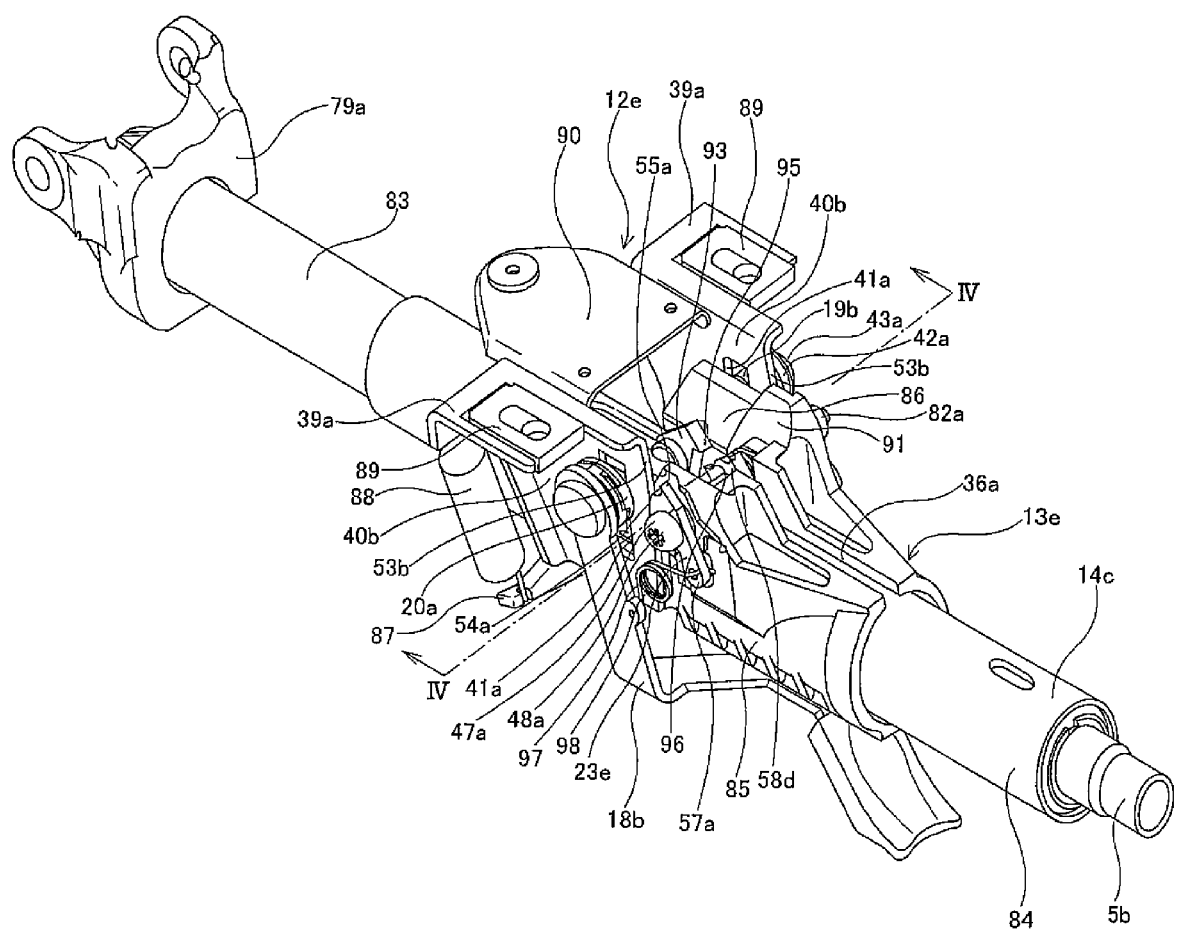
FIG. 28 is a perspective view showing an eighth example of the embodiment of the present invention.
Figure 29:
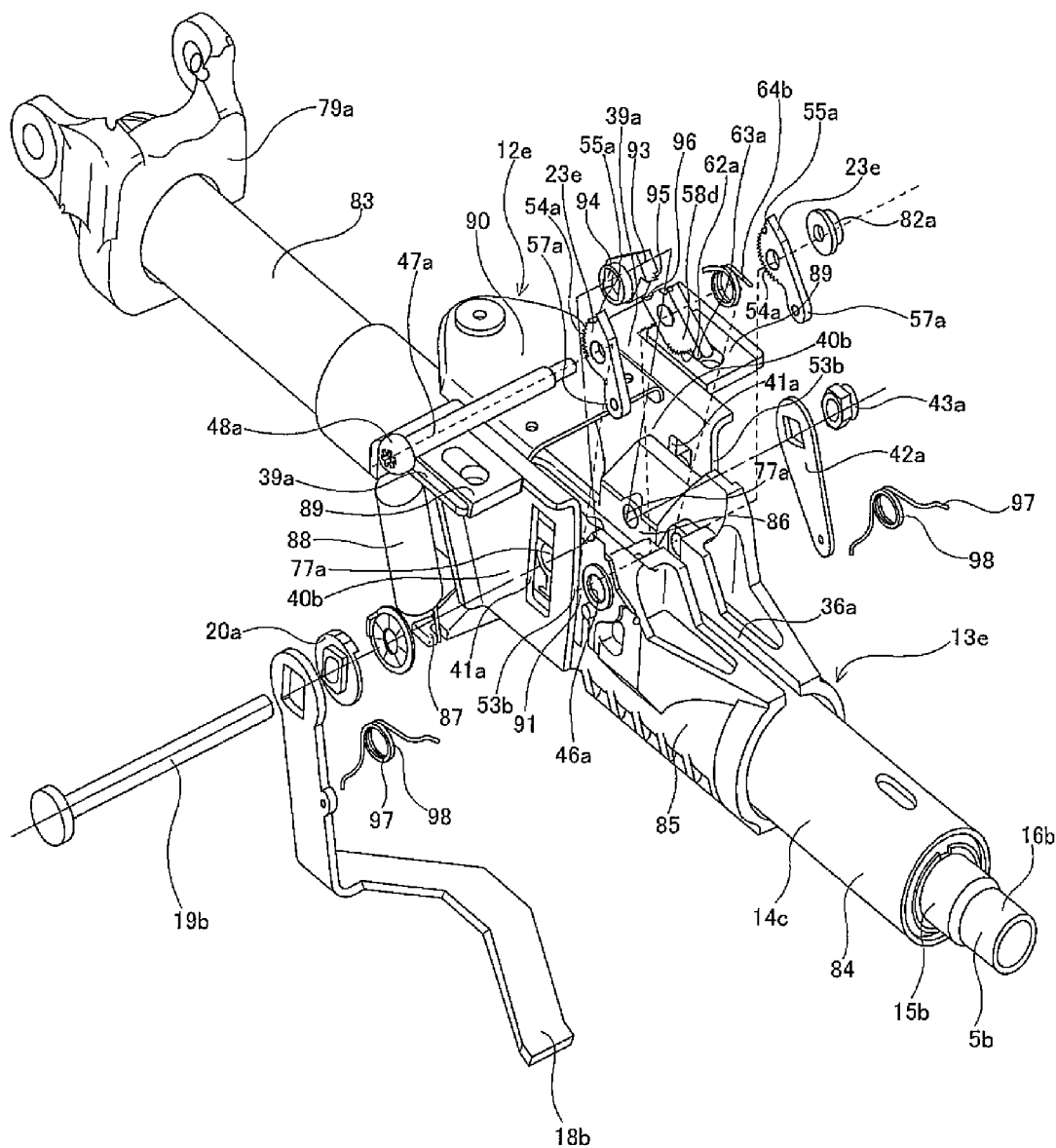
FIG. 29 is an exploded perspective view of the eighth example.

With the configuration described above, both of the tilt-locking eccentric cams 23e are turned in the counterclockwise direction in FIGS. 28 to 30 as the adjustment lever 18b is turned upward and the position of the steering wheel 1 is fixed. Then, upon this turning, the lower end section to intermediate section of the tilt-locking serrated section 54a of both of these tilt-locking eccentric cams 23e are butted against the curved edge 53b on the support bracket 12e side. In this state, the shape and dimension of each constituent are restricted so that the front end section of the telescoping locking serrated section 62a of the telescoping locking eccentric cam 58d is butted against the upper surface of the inner column 14c.

The telescopic steering device of the present example configured as described above operates in a manner described below, so as to enable an adjustment of the front/rear position and up/down position of this steering wheel 1, and suppress forward or upward displacement of the position of the steering wheel 1 at the time of a secondary collision, to thereby achieve enhanced protection of a driver colliding with this steering wheel 1.

First, when adjusting the position of this steering wheel 1, the adjustment lever 18b is turned downward. As a result, with the operation of the cam device, the surface pressure of the contact section between the inner side surface of both of the attachment plate sections 39a and the outer side surface of the clamped section 86 of the outer column 13e, is lowered or lost.

In this state, the front/rear position of the steering wheel 1 can be adjusted. In the case of the present example, the rear half element 84 of the inner column 14c is slid on the outer column 13e, and thereby the front/rear position can be adjusted. At this time, the inner column 14c extends or retracts. When performing this type of front/rear position adjustment operation, the upper surface of the inner column 14c and the telescoping locking eccentric cam 58d are completely separated from each other as shown in FIG. 32 (B), and therefore, the adjustment operation can be smoothly performed. Furthermore, in the case of the present example, in addition to this, the up/down position of this steering wheel 1 can also be adjusted in a manner described below. That is to say, when the adjustment lever 18b is turned downward, as described above, surface pressure of the contact section between the inner side surface of both of the support plates 40b and the outer side surface of the clamped section 86 of the outer column 13e, is reduced or lost. Moreover, both of the tilt-locking eccentric cams 23e are turned in the clockwise direction in FIG. 28 to FIG. 30, and then the tilt-locking serrated section Ma of both of these tilt-locking eccentric cams 23e is separated from both of the curved edges 53b. In this state, by moving the rod-shaped member 19b along the long hole 41a of both of the support plates 40b, the up/down position of the steering wheel 1 can be adjusted.

Having adjusted the steering wheel 1 to a required position as described above, the adjustment lever 18b is turned upward in a direction opposite to the predetermined direction (counterclockwise direction in FIGS. 28 to 30), until this adjustment lever 18b has become substantially parallel with the outer column 13e and the inner column 14c. As a result of this turning in the opposite direction, with the operation of the cam device, both of the support plates 40b firmly clamp the outer column 13e from both sides in the widthwise direction, and the up/down position of the steering wheel 1 is fixed. At the same time, as a result of reduction in the widthwise dimension of the noncontiguous section 36a, the inner diameter of the outer column 13e is reduced, and the inner circumferential surface of this outer column 13e is firmly pressed against the outer circumferential surface of the inner column 14c. Further, relative displacement in the axial direction between both of these columns 13e and 14c is prevented, and the front/rear position of the steering wheel 1 is fixed.

In this manner, in the state where the adjustment lever 18b is turned upward until the position of the steering wheel 1 has been fixed, the tip end section 95 of the lock release lever 93 is separated from the catch step surface 96 of the telescoping locking eccentric cam 58d. As a result, this telescoping locking eccentric cam 58d is turned in the clockwise direction in FIG. 32 by the elastic force of the telescoping locking biasing spring 64b, and as shown in FIG. 32 (A), the small diameter side end section to intermediate section of the telescoping locking serrated section 62a of this telescoping locking eccentric cam 58d comes in contact with the upper surface of the inner column 14c. Furthermore, both of the tilt-locking eccentric cams 23e are pulled by the tilt-locking engagement and disengagement spring 97, and approach both of the curved edges 53b. The lower end section of the tilt-locking serrated section 54a of both of these tilt-locking eccentric cams 23e, in which the distance from the center of the support shaft 47a becomes shortest, comes in contact with the curved edge 53b provided on the rear end edge of both of the support plates 40b.

If a forward-upward impact load is applied to the inner column 14c and the outer column 13e at the time of a secondary collision in a state where the position of the steering wheel 1 is fixed in this way, displacement of the position of the steering wheel 1 is prevented as described below. First, when the inner column 14c tends to be displaced forward, a portion of the telescoping locking serrated section 62a, which is interlocking with the upper surface of the inner column 14c, tends to move to the rear side of this telescoping locking serrated section 62a, that is, it tends to move to the portion in which the distance from the center of the support shaft 47a is longer. As a result, the depth of interlocking of the telescoping locking serrated section 62a with respect to the upper surface of the inner column 14c, gradually becomes greater. Since a large resistance acts with respect to the depth of interlocking becoming greater in this way, it is possible to suppress forward displacement of the steering wheel 1. If the level of impact load in a secondary collision is high and the turning amount of the telescoping locking eccentric cam 58d is high, the stopper 63a for preventing overturning at the time of a collision is butted against the upper surface of the inner column 14c, and the telescoping locking eccentric cam 58d will not turn any further (in the clockwise direction in FIGS. 28 to 30, and 32). In this state, the force of suppressing forward displacement of the steering wheel 1 becomes sufficiently large, and this steering wheel 1 will not be displaced forward any further. The material of the telescoping locking eccentric cam 58d is harder than that of the inner column 14c, and therefore, interlocking is performed reliably.

Moreover, upward displacement motion of the steering wheel 1 can be achieved by the tilt-locking serrated section 54a provided on the tilt-locking convex arc edge of both of the tilt-locking eccentric cams 23e, interlocking with the curved edge 53b of the support plate 40b. That is to say, at the time of a secondary collision, if the outer column 13e tends to be displaced upward with respect to the support bracket 12e having both of the support plates 40b provided thereon, the tilt-locking eccentric cam 23e tends to turn about the support shaft 47a in the counterclockwise direction in FIGS. 28 to 30, based on the interlocking between both the curved edges 53b and both of the tilt-locking serrated sections 54a.

For this reason, a portion of the tilt-locking serrated section 54a which is interlocking with both of the curved edges 53b, tends to move above this tilt-locking serrated section 54a, that is, it tends to move to the portion in which the distance from the center of the support shaft 47a is longer. As a result, the depth of interlocking of the tilt-locking serrated section 54a with respect to both of the curved edges 53b, gradually becomes greater. Since a large resistance acts with respect to the depth of interlocking becoming greater in this way, it is possible to suppress upward displacement of the steering wheel 1. If the level of impact load in a secondary collision is high and the turning amount of the tilt-locking eccentric cam 23e is high, the stopper 55a for preventing overturning at the time of a collision is butted against both of the curved edges 53b, and the tilt-locking eccentric cam 23e will not turn any further. In this state, the force of suppressing upward displacement of the steering wheel 1 becomes sufficiently large, and this steering wheel 1 will not be displaced upward any further. The material of the tilt-locking eccentric cam 23e is harder than that of the support bracket 12e, and therefore, interlocking is performed reliably.

As a result, a large force acts to prevent forward-upward displacement of the steering wheel 1, and it is possible to effectively prevent the position of this steering wheel 1 from being displaced. At this time, the force required for interlocking the tilt-locking serrated section 54a of the tilt-locking ride arc edge with both of the curved edges 53b, and the force required for interlocking the telescoping locking serrated section 62a of the telescoping locking convex arc edge with the upper surface of the inner column 14c, are respectively small in the initial stage and gradually become greater. This type of characteristic is preferable in terms of protecting the driver by absorbing impact energy transmitted from the steering wheel 1 to the inner column 14c and the outer column 13b. That is to say, it is advantageous from the viewpoint that; while suppressing an impact applied to the body of the driver to a low level at the moment of secondary collision occurrence, the force of supporting the body of this driver can be gradually increased, and the level of freedom in tuning for enhanced driver protection can be ensured.

The present example may also be applied to any one of a structure in which the telescoping locking serrated section is engaged with the upper surface of the inner column, and a structure in which the telescoping locking serrated section is engaged with the lower surface of the inner column. Moreover, in the case of the present example, there has been described a structure which combines a telescopic mechanism and a swing tilt mechanism. However, the telescopic mechanism may also be combined with a so-called head swing tilt mechanism which adjusts the height position of a steering wheel based on swing displacement about a contiguous section between the outer column and the inner column. Furthermore, in any case, there may be employed a structure in which the center of tilting, that is, a pivot shaft for swing displacement is provided on the front end section of the outer column.

INDUSTRIAL APPLICABILITY

A position adjustment device for a steering wheel of the present invention may be suitably applied to any one of a tilt-telescopic device, which adjusts both of the up/down position and front/rear position of a steering wheel, and a telescopic steering device, which does not have a tilt mechanism. With application of the present invention, there may be provided at low cost a steering device for a motor vehicle, with which even if a steering wheel tends to be displaced upward at the time of a secondary collision, this displacement is prevented, and further, unpleasant vibration and noise are prevented when performing an up/down position adjustment of the steering wheel.

DESCRIPTION OF REFERENCE SYMBOLS

1 Steering wheel
2 Steering gear unit
3 Input shaft
4 Tie rod
5, 5a, 5b Steering shaft
6, 6a, 6b Steering column
7 Universal joint
8 Intermediate shaft
9 Universal joint
10 Vehicle body
11, 11a Pivot shaft
12, 12a, 12b, 12c, 12d, 12e Support bracket 13, 13a, 13b, 13c, 13d, 13e Outer column
14, 14a, 14b, 14c Inner column
15, 15a, 15b Outer shaft
16, 16a, 16b Inner shaft
17 Electric motor
18, 18a, 18b Adjustment lever
19, 19a, 19b Rod-shaped member
20, 20a Cain device
21 Cam member
22, 22a Movable side bracket
23, 23a, 23b, 23c, 23d, 23e Tilt-locking eccentric cam
24 Tilt-locking serrated section
25 Coil spring
26 Support shaft
27 Front section element
28 Rear section element
29a, 29b Long hole
30 Bolt
31 Side wall section
32 Long hole
33 Main section
34 Pivoted section
35, 35a, 35b Clamped section
36, 36a Noncontiguous section
37 Pivot through hole
38 Nut
39, 39a Attachment plate section
40, 40a, 40b Support plate
41, 41a Long hole
42, 42a Presser plate
43, 43a Nut
44 Pivoting ridge section
45, 45a, 45b, 45c Step surface
46, 46a Through hole
47, 47a Support shaft
48, 48a Head section
49 Male screw section
50 Large diameter side non-columnar section
51 Columnar section
52 Small diameter side non-columnar section
53, 53a, 53b Curved edge
54, 54a Tilt-locking serrated section
55, 55a Stopper for preventing overturning at the time of a collision
56 Stopper for preventing overturning at the time of an adjustment
57, 57a Driven arm section
58, 58a, 58b, 58c, 58d Telescoping locking eccentric cam
59 Flat surface
60, 60a Attachment hole
61 Projection section
62, 62a Telescoping locking serrated section
63, 63a Stopper for preventing overturning at the time of a collision
64, 64a, 64b Telescoping locking biasing spring
65 Base section
66 Elastic presser section
67 Engagement section
68 Engagement hole
69 Turning force transmission spring
70 Driving side engagement hole
71 Driving side engagement section
72 Driven side engagement hole
73 Driven side engagement section
74 Coil section
75 Elastic material
76 Small through hole
77, 77a Rod-shaped member through hole
78 Steering hole column main body
79, 79a Pivot bracket
80 Lifting and lowering bracket
81 Projection section
82, 82a Nut
83 Front half element
84 Rear half element
85 Main section
86 Clamped section
87 Engagement arm section
88 Tension spring
89 Slide plate
90 Joining plate
91 Projection portion
92 Engagement concave section
93 Lock release lever
94 Attachment hole
95 Tip end section
96 Catch step surface
97 Tilt-locking engagement and disengagement spring
98 Coil section

The invention claimed is:

1. A position adjustment device for a steering wheel comprising: a cylindrical outer column in which at least the inner diameter of a part in the axial direction can be expanded and contracted; a cylindrical inner column which is fitted and supported on the inner diameter side of this outer column so as to be capable of axial displacement; a steering shaft which is rotatably supported on the inner diameter side of this inner column, and which fixes a steering wheel on a rear end section thereof projecting to the rear side of a rear end opening section of this inner column; a pair of supporting plate sections which is provided on a support bracket supported on a vehicle body, in a state of sandwiching, from widthwise both sides, a portion of the outer column where the inner diameter can be expanded and contracted; a rod-shaped member arranged in the widthwise direction which is inserted through first through holes formed in positions of both of the support plates which align with each other, and through second through holes formed in portions of a part of the outer column and do not interfere with the inner column, and which, as it rotates, increases or reduces the distance between mutually opposing surfaces of both the support plates; and an adjustment lever, a base end section of which is joined and fixed on this rod-shaped member in order to rotate this rod-shaped member, the device further comprising: a support shaft, in a state of being arranged parallel with the rod-shaped member, supported on part of the outer column; and a telescoping locking eccentric cam, a base section of which is supported on an intermediate section of this support shaft;

a portion of the telescoping locking eccentric cam, which opposes to an outer circumferential surface of the inner column or to a surface of a member fixed on this inner column, being of a telescoping locking convex arc edge in which the distance from the center of the support shaft becomes greater with approach to the rear side, a telescoping locking serrated section being formed on this telescoping locking convex arc edge, a spring being provided between the adjustment lever and the support shaft, and the spring allowing, as this adjustment lever being swing displaced from a state of adjusting the position of the steering wheel to a state of fixing it, for giving the support shaft an elastic force in a direction of pressing the telescoping locking serrated section against the outer circumferential surface of the inner column, or against the surface of a member fixed on the inner column.

2. A position adjustment device for a steering wheel comprising:

a cylindrical outer column in which a front section thereof is supported, directly or through another member, on a portion to be fixed on a vehicle body, so as to be capable of swing displacement about a pivot shaft installed in the widthwise direction, and at least the inner diameter of a part in the axial direction can be expanded and contracted; a cylindrical inner column which is fitted and supported on the inner diameter side of this outer column so as to be capable of axial displacement;

a steering shaft which is rotatably supported on the inner diameter side of this inner column, and which fixes a steering wheel on a rear end section thereof projecting to the rear side of a rear end opening section of this inner column;

a pair of supporting plate sections which is provided on a support bracket supported on a vehicle body, in a state of sandwiching, from widthwise both sides, a portion of the outer column where the inner diameter can be expanded and contracted;

a rod-shaped member arranged in the widthwise direction, which is inserted through long holes which are formed in a position of both of the support plates which align with each other and which are long in a direction of an arc about the pivot shaft, and through holes formed in a portion of the outer column and do not interfere with the inner column, and which, as it rotates, increases or reduces the distance between mutually opposing surfaces of both the support plates;

an adjustment lever, the base end section of which is joined and fixed on this rod-shaped member;

a curved edge in the shape of an arc about the pivot shaft, which is provided at least on a part of the rear end edge of the support plates; a support shaft supported, in a state of being arranged parallel with the rod-shaped member, on a part of the outer column;

a tilt-locking eccentric cam supported on this support shaft;

a telescoping locking eccentric cam supported on this support shaft;

a portion of the tilt-locking eccentric cam, which opposes to the curved edge, being of a tilt-locking convex arc edge in which the distance from the center of the support shaft becomes greater with approach to the rear side, and a tilt-locking serrated section being formed on this tilt-locking convex arc edge, a portion of the telescoping locking eccentric cam, which opposes to the outer circumferential surface of the inner column or to the surface of a member fixed on this inner column, being of a telescoping locking convex arc edge, in which the distance from the center of the support shaft becomes greater with approach to the rear side, and a telescoping locking serrated section being formed on this telescoping locking convex arc edge, the base section of one of the tilt-locking eccentric cam and telescoping locking eccentric cam, being fixed on the support shaft so as to rotate together with this support shaft, the base section of the other eccentric cam being supported on this support shaft so as to be capable of swing displacement with respect to this support shaft by a predetermined angle, between the other eccentric cam and support shaft, there being provided a first spring having an elastic force in a direction of pressing a locking serrated section provided in the other eccentric cam, against a mating portion thereof, between the adjustment lever and the support shaft, there being provided a second spring allowing for giving the support shaft an elastic force in a direction of pressing the locking serrated section provided on each of the eccentric cams, against the mating portion thereof, as the adjustment lever being swing-displaced from a state of adjusting the position of the steering wheel, to a state of fixing it.

3. A position adjustment device for a steering wheel according to claim 2, wherein: the other eccentric cam is a telescoping locking eccentric cam; in a state where this telescoping locking eccentric cam has entered a slit-shaped noncontiguous section provided in a part of the outer column in order to enable expansion and contraction of the inner diameter of the outer column, the telescoping locking serrated section opposes to or comes in contact with the outer circumferential surface of the inner column or the surface of a member fixed on the inner column; the first spring is provided so as to span between the telescoping locking eccentric cam and the support shaft; the base section of a pair of tilt-locking eccentric cams, which serve as the one eccentric cam, is externally fitted and fixed on both end sections of the support shaft; a driven side engagement arm section is formed in a part of one tilt-locking eccentric cam among both of those tilt-locking eccentric cams, so as to project radially outward of the tilt-locking eccentric cam; and the second spring is provided, as a rotational force transmission spring spanned between the tip end section of the driven side engagement arm section and a part of the adjustment lever, via the one tilt-locking eccentric cam, between the adjustment lever and the support shaft.

4. A position adjustment device for a steering wheel according to claim 3, wherein based on non-circular engagement between the inner circumferential surface of an attachment hole provided in the base section of the telescoping locking eccentric cam, and the outer circumferential surface of the support shaft, the telescoping locking eccentric cam is supported on the support shaft, so as to be capable of relative displacement only by a predetermined angle.

5. A position adjustment device for a steering wheel according to claim 3, wherein a circular attachment hole provided in the base section of the telescoping locking eccentric cam and the support shaft are rotatably engaged with each other, and the turning amount of the telescoping locking eccentric cam with respect to this support shaft, is restricted by the first spring.

6. A position adjustment device for a steering wheel according to claim 3, wherein an elastic material, which functions as the first spring, intervenes between the inner circumferential surface of the attachment hole provided in the base section of the telescoping locking eccentric cam and the outer circumferential surface of the support shaft, and thereby, the telescoping locking eccentric cam is supported on the support shaft, while restricting the turning amount thereof.

7. A position adjustment device for a steering wheel according to claim 2, wherein: the one eccentric cam is a telescoping locking eccentric cam; this telescoping locking eccentric cam is supported on the intermediate section of the support shaft, so as to be capable of turning with respect to the support shaft; in a state where this telescoping locking eccentric cam has entered the slit-shaped noncontiguous section provided in a part of the outer column in order to enable expansion and contraction of the inner diameter of the outer column, the telescoping locking serrated section opposes to the outer circumferential surface of the inner column or the surface of a member fixed on the inner column; the base section of a pair of tilt-locking eccentric cams, which serve as the other eccentric cam, is externally fitted and fixed on both end sections of the support shaft; a driven side engagement arm section is formed in a part of one tilt-locking eccentric cam among both of those tilt-locking eccentric cams, so as to project radially outward of the tilt-locking eccentric cam; the second spring is provided, as a rotational force transmission spring spanned between the tip end section of the driven side engagement arm section and a part of the adjustment lever, via the one tilt-locking eccentric cam, between the adjustment lever and the support shaft; and the intermediate section of the first spring provided to span between both of the tilt-locking eccentric cams, is engaged with a part of the telescoping locking eccentric cam.

8. A position adjustment device for a steering wheel according to claim 2, wherein: the one eccentric cam is a pair of tilt-locking eccentric cams; in a state where the adjustment lever is turned in a direction of reducing the distance between both of the support plates, the second spring causes the tilt-locking eccentric cam to approach the curved edge, and in a state where the adjustment lever is turned in the opposite direction, it causes the tilt-locking eccentric cam to move away from the curved edge; a stopper section is provided, in a state of projecting widthwise outward, on a widthwise side surface of a part of a member having the support shaft installed thereon; and in a state where the adjustment lever is turned in the opposite direction, contact between the tilt-locking eccentric cam and the curved edge is prevented based on engagement between the stopper and part of the tilt-locking eccentric cam.

9. A position adjustment device for a steering wheel according to claim 1, wherein the device further comprising: an elastic member which is provided between the telescoping locking eccentric cam and the outer column or a member fixed on the outer column, and which has an elastic force in a direction of bringing a front side portion of the telescoping locking serrated section, into contact with the outer circumferential surface of the inner column or the surface of a member fixed on this inner column; and a lock release lever, which has its base end section supported on the intermediate section of the rod-shaped member, turns together with this rod-shaped member so as to be engaged with and disengaged from the telescoping locking eccentric cam, and causes the telescoping locking eccentric cam to be swing-displaced in a direction of separating the front end section of the telescoping locking serrated section from the mating portion thereof, when the adjustment lever is turned from a state of fixing the position of the steering wheel to a state of adjusting it.

10. A position adjustment device for a steering wheel according to claim 2, wherein there are further provided: an elastic member which is provided between the telescoping locking eccentric cam and the outer column or a member fixed on the outer column, and which has an elastic force in a direction of bringing a front side portion of the telescoping locking serrated section, into contact with the outer circumferential surface of the inner column or the surface of a member fixed on this inner column; and a lock release lever, which has its base end section supported on the intermediate section of the rod-shaped member, turns together with this rod-shaped member so as to be engaged with and disengaged from the telescoping locking eccentric cam, and causes the telescoping locking eccentric cam to be swing-displaced in a direction of separating the front end section of the telescoping locking serrated section from the mating portion thereof, when the adjustment lever is turned from a state of fixing the position of the steering wheel to a state of adjusting it.

11. A position adjustment device for a steering wheel according to claim 10, wherein the device further comprising a joining member for separating the tilt-locking serrated section and the arc edge section from each other, in the state where the adjustment lever is turned to a state of adjusting the position of the steering wheel.

12. A position adjustment device for a steering wheel according to claim 11, wherein: the elastic member is a torsion coil spring such that a coil section thereof is externally fitted on the intermediate section of the support shaft, and one end section thereof is engaged with the lock release lever and the other end section thereof is engaged with the outer column; and the joining member is a torsion coil spring such that it has a coil section in the intermediate section thereof, and one end section thereof is engaged with the tilt-locking eccentric cam and the other end section thereof is engaged with a portion which rotates together with the rod-shaped member.

13. A telescopic steering device according to claim 10, wherein the support shaft, the telescoping locking eccentric cam, the elastic member, and the lock release lever are provided above the outer column.

\* \* \* \* \*